US010289085B2

(12) United States Patent
Jeong et al.

(10) Patent No.: US 10,289,085 B2
(45) Date of Patent: May 14, 2019

(54) ELECTRONIC DEVICE AND METHOD FOR PROVIDING INFORMATION IN ELECTRONIC DEVICE

(71) Applicant: Samsung Electronics Co., Ltd., Gyeonggi-do (KR)

(72) Inventors: Mi-Hyun Jeong, Seoul (KR); Eun-Seok Kim, Gyeonggi-do (KR); Do-Hyeong Park, Seoul (KR); Pyo-Je Cho, Gyeonggi-do (KR); Jin-A Choe, Seoul (KR); Jin-Soo Ha, Seoul (KR); Dong-Il Son, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 123 days.

(21) Appl. No.: 15/469,089

(22) Filed: Mar. 24, 2017

(65) Prior Publication Data

US 2017/0293272 A1 Oct. 12, 2017

(30) Foreign Application Priority Data

Mar. 24, 2016 (KR) .................. 10-2016-0035473

(51) Int. Cl.
*F16M 11/08* (2006.01)
*G05B 15/02* (2006.01)
(Continued)

(52) U.S. Cl.
CPC ............. *G05B 15/02* (2013.01); *F16M 11/08* (2013.01); *G06F 3/017* (2013.01); *G06F 3/0412* (2013.01);
(Continued)

(58) Field of Classification Search
CPC ......... F16M 11/08; G05B 15/02; G06F 3/017; G06F 3/0412; G06F 3/16; H02P 31/00
See application file for complete search history.

(56) References Cited

U.S. PATENT DOCUMENTS

2008/0122796 A1* 5/2008 Jobs ...................... G06F 3/0488
345/173
2013/0250034 A1* 9/2013 Kang ...................... H04W 4/02
348/14.02
(Continued)

FOREIGN PATENT DOCUMENTS

KR 1020120084132 7/2012
KR 10-1573364 12/2015

OTHER PUBLICATIONS

International Search Report dated Jul. 6, 2017 issued in counterpart application No. PCT/KR2017/003227, 11 pages.

*Primary Examiner* — Yuhui R Pan
(74) *Attorney, Agent, or Firm* — The Farrell Law Firm, P.C.

(57) ABSTRACT

An electronic device is provided. The electronic device includes a main body including a rotating member, a rotation supporting member supporting the rotating member, and a driving device moving the rotating member, a display coupled onto a surface of the rotating member, a processor configured to control the driving module to move the rotating member, and a memory configured to store instructions executed by the processor, wherein the processor is further configured to control a movement of the rotating member so that the display or a screen of the display faces in a first direction where an external object is positioned, identify the external object positioned in the first direction using at least one sensor, configure an operational condition related to the identified external object and at least one operation control function associated with the operational condition based on information received according to an interaction with the identified external object, and provide information related to the configured operational condition and the at least one configured operation control function.

20 Claims, 48 Drawing Sheets

(51) Int. Cl.
*G06F 3/01* (2006.01)
*G06F 3/041* (2006.01)
*G06F 3/16* (2006.01)
*H02P 31/00* (2006.01)

(52) U.S. Cl.
CPC ............... *G06F 3/16* (2013.01); *H02P 31/00* (2013.01); *G05B 2219/2642* (2013.01)

(56) References Cited

U.S. PATENT DOCUMENTS

2014/0191945 A1   7/2014   Wang et al.
2014/0277735 A1   9/2014   Breazeal
2015/0317120 A1   11/2015   Kim et al.

\* cited by examiner

ELECTRONIC DEVICE AND METHOD FOR PROVIDING INFORMATION IN ELECTRONIC DEVICE

PRIORITY

This application claims the benefit under 35 U.S.C. § 119(a) to a Korean Patent Application filed on Mar. 24, 2016 in the Korean Intellectual Property Office and assigned Serial No. 10-2016-0035473, the entire content of which is incorporated herein by reference.

BACKGROUND

1. Field of the Disclosure

The present disclosure relates generally to electronic devices and methods for providing information in electronic devices and more particularly, to an electronic device and a method for providing information in an electronic device which controls driving of a rotations member.

2. Description of the Related Art

Various types of electronic devices are being used in the house and technical advances are leading to the development of further such electronic devices for use in the home.

A home device, which is in the form of, e.g., a smart home device, may transmit and receive information to/from other electronic devices, user mobile devices, or external communication devices through a communication network in the house.

Such home device-type electronic devices provide users with a diversity of services necessary for home life and relevant information that allows users to notice various pieces of information and circumstances arising in the house which the users themselves would otherwise fail to do so.

As set forth above, such a home device-type electronic device may communicate information with objects or user devices through a home network and provide resultant information to users.

However, if providing useful information to a user through an interaction with an object or the user, the electronic device provides only input information, so that a target to be interacted with may not be clearly recognized. Accordingly, in order to precisely determine whether the information provided from the electronic device is information for the user or another person, the user should move in a display direction in which the information is displayed and check the corresponding information. When the user cannot move to a location of the display of the electronic device to check the information, the user may have difficulty in rapidly and precisely identifying the provided information.

SUMMARY

Various embodiments of the present disclosure provide electronic devices for providing useful information to external objects through interactions with the external objects and methods for providing information in the electronic devices.

According to an embodiment of the present disclosure, there an electronic device is provided. The electronic device includes a main body including a rotating member, a rotation supporting member supporting the rotating member, and a driving device moving the rotating member; a display coupled onto a surface of the rotating member; a processor configured to control the driving device to move the rotating member; and a memory configured to store instructions executed by the processor, wherein the processor is further configured to control a movement of the rotating member so that the display or a screen of the display faces in a first direction where an external object is positioned, identify the external object positioned in the first direction using at least one sensor, configure an operational condition related to the identified external object and at least one operation control function associated with the operational condition based on information received according to an interaction with the identified external object, and provide information related to the configured operational condition and the at least one configured operation control function.

According to an embodiment of the present disclosure, a method for providing information in an electronic device including a rotating member, a rotation supporting member supporting the rotating member, and a driving module moving the rotating member is provided. The method includes controlling, by a processor, a movement of the rotating member so that a display coupled onto a surface of the rotating member or a screen of the display faces in a first direction where an external object is positioned; identifying, by the processor, the external object positioned in the first direction using at least one sensor; configuring, by the processor, an operational condition related to the identified external object and at least one operation control function based on information received according to an interaction with the identified external object; and providing, by the processor, information related to the configured operational condition and the at least one configured operation control function.

BRIEF DESCRIPTION OF THE DRAWINGS

The above and other aspects, features, and advantages of the present disclosure will become more apparent from the following detailed description, taken if in conjunction with the accompanying drawings, wherein.

DETAILED DESCRIPTION OF EMBODIMENTS OF THE PRESENT DISCLOSURE

Figure 1:
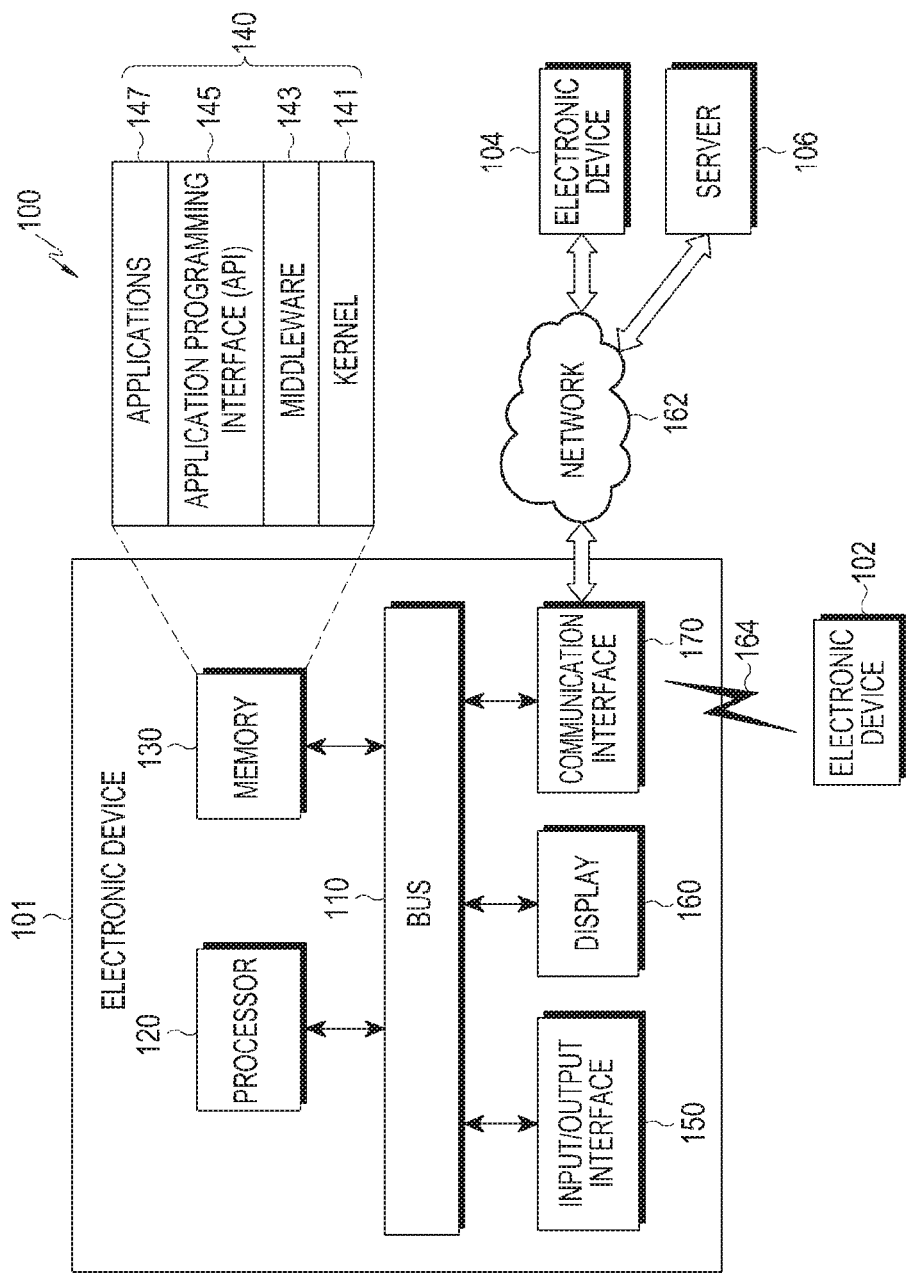
FIG. 1 illustrates a network environment according to an embodiment of the present disclosure.

Hereinafter, various embodiments of the present disclosure are described with reference to the accompanying drawings. However, it should be understood that the present disclosure is not limited to the embodiments, and all changes and/or equivalents or replacements thereto also belong within the scope of the present disclosure. The same or similar reference denotations may be used to refer to the same or similar elements throughout the specification and the drawings.

As used herein, the terms "have," "may have," "include," and "may include" a feature (e.g., a number, a function, an operation, or a component such as a part) indicate the existence of the feature and do not exclude the existence of other features.

As used herein, the terms "A or B," "at least one of A and/or B," and "one or more of A and/or B" may include all possible combinations of A and B. For example, "A or B," "at least one of A and B," and "at least one of A or B" may indicate all of (1) including at least one A, (2) including at least one B, or (3) including at least one A and at least one B.

As used herein, the terms "first" and "second" may modify various components regardless of the importance and/or order and are used to distinguish components from each other without limiting the components in any way. For example, a first user device and a second user device may simply indicate different user devices from each other regardless of the relative order or importance of the devices. For example, a first component may be referred to as a second component, and vice versa without departing from the scope of the present disclosure.

It will be understood that if an element (e.g., a first element) is referred to as being (operatively or communicatively) "coupled with/to," or "connected with/to" another element (e.g., a second element), the element can be coupled or connected with/to the other element directly or via a third element. In contrast, it will be understood that if an element (e.g., a first element) is referred to as being "directly coupled with/to" or "directly connected with/to" another element (e.g., a second element), no other element (e.g., a third element) may intervene between the first element and the second element.

As used herein, the terms "configured (or set) to" may be interchangeably used with the terms "suitable for," "having the capacity to," "designed to," "adapted to," "made to," or "capable of", depending on circumstances. The term "configured (or set) to" does not necessarily mean "specifically designed in hardware to." Rather, the term "configured to" may mean that a device can perform an operation together with another device or parts. For example, the term "processor configured (or set) to perform A, B, and C" may mean a generic-purpose processor (e.g., a CPU or application processor) that may perform the operations by executing one or more software programs stored in a memory device or a dedicated processor (e.g., an embedded processor) for performing the operations.

The terms used herein are provided merely to describe certain embodiments of the present disclosure, but do not limit the scope of other embodiments of the present disclosure. It is to be understood that the singular forms "a," "an," and "the" include plural references unless the context clearly dictates otherwise. The terms including technical and scientific terms used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and should not be interpreted in an idealized or overly formal sense unless expressly so defined herein.

For example, examples of the electronic device according to embodiments of the present disclosure may include at least one of a smartphone, a tablet personal computer (PC), a mobile phone, a video phone, an e-book reader, a desktop PC, a laptop computer, a netbook computer, a workstation, a server, a personal digital assistant (PDA), a portable multimedia player (PMP), a MP3 player, a mobile medical device, a camera, or a wearable device. According to an embodiment of the present disclosure, the wearable device may include at least one of an accessory-type device (e.g., a watch, a ring, a bracelet, an anklet, a necklace, glasses, contact lenses, or a head-mounted device (HMD)), a fabric- or clothes-integrated device (e.g., electronic clothes), a body attaching-type device (e.g., a skin pad or tattoo), or a body implantable device (e.g., an implantable circuit).

According to an embodiment of the present disclosure, the electronic device may be a home appliance. Examples of the home appliance may include at least one of a television, a digital video disk (DVD) player, an audio player, a refrigerator, an air conditioner, a cleaner, an oven, a microwave oven, a washer, a drier, an air cleaner, a set-top box, a home automation control panel, a security control panel, a TV box (e.g., Samsung HomeSync®, Apple TV®, or Google TV®), a gaming console (Xbox® PlayStation®), an electronic dictionary, an electronic key, a camcorder, or an electronic picture frame.

According to an embodiment of the present disclosure, examples of the electronic device may include at least one of various medical devices (e.g., diverse portable medical measuring devices (e.g., a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global navigation satellite system (GNSS) receiver, an event data recorder (EDR), a flight data recorder (FDR), an automotive infotainment device, a sailing electronic device (e.g., a sailing navigation device or a gyro compass), avionics, security devices, vehicular head units, industrial or home robots, automated teller machines (ATMs), point of sales (POS) devices, or Internet of Things (IoT) devices (e.g., a light bulb, various sensors, an electric or gas meter, a sprinkler, a fire alarm, a thermostat, a street light, a toaster, fitness equipment, a hot water tank, a heater, or a boiler).

According to various embodiments of the disclosure, examples of the electronic device may include at least one of part of a piece of furniture or building/structure, an electronic board, an electronic signature receiving device, a projector, or various measurement devices (e.g., devices for measuring water, electricity, gas, or electromagnetic waves). According to an embodiment of the present disclosure, the electronic device may be one or a combination of the above-listed devices. According to an embodiment of the present disclosure, the electronic device may be a flexible electronic device. The electronic device disclosed herein is not limited to the above-listed devices, and may include new electronic devices depending on the development of technology.

Hereinafter, electronic devices are described with reference to the accompanying drawings, according to various embodiments of the present disclosure. As used herein, the term "user" may denote a human or another device (e.g., an artificial intelligent electronic device) using the electronic device.

FIG. 1 is a network environment 100 according to an embodiment of the present disclosure.

Referring to FIG. 1, according to an embodiment of the present disclosure, an electronic device 101 is within a network environment 100. The electronic device 101 includes a bus 110, a processor 120, a memory 130, an input/output interface 150, a display 160, and a communication interface 170. The electronic device 101 may exclude at least one of the components or may add another component.

The bus 110 may include, for example, a circuit for connecting the components 110 to 170 with one another and transferring communications (e.g., control messages and/or data) between the components.

The processor 120 may include one or more of a central processing unit (CPU), an application processor (AP), or a communication processor (CP). The processor 120 may perform control over at least one of the other components of the electronic device 101, and/or perform an operation or data processing relating to communication.

The memory 130 may include a volatile and/or a non-volatile memory. For example, the memory 130 may store commands or data related to at least one other component of the electronic device 101. The memory 130 may store software and/or a program 140. The program 140 may include, e.g., a kernel 141, middleware 143, an application programming interface (API) 145, and/or an application programs (or "applications") 147. At least a portion of the kernel 141, middleware 143, or API 145 may be denoted an operating system (OS).

For example, the kernel 141 may control or manage system resources (e.g., the bus 110, processor 120, or a memory 130) used to perform operations or functions implemented in other programs (e.g., the middleware 143, API 145, or application program 147). The kernel 141 may provide an interface that allows the middleware 143, the API 145, or the application 147 to access the individual components of the electronic device 101 to control or manage the system resources.

The middleware 143 may function as, for example, a relay to allow the API 145 or the application 147 to communicate data with the kernel 141, for example.

Further, the middleware 143 may process one or more task requests received from the application program 147 in order of priority. For example, the middleware 143 may assign at least one of application programs 147 with priority for using system resources (e.g., the bus 110, processor 120, or memory 130) of at least one electronic device 101. For example, the middleware 143 may perform scheduling or load balancing on the one or more task requests by processing the one or more task requests according to the priority assigned to the at least one application program 147.

The API 145 is an interface allowing the application 147 to control functions provided from the kernel 141 or the middleware 143. For example, the API 133 may include at least one interface or function (e.g., a command) for filing control, window control, image processing or text control.

The input/output interface 150 may serve as an interface that may, e.g., transfer commands or data input from a user or other external devices to other component(s) of the electronic device 101. Further, the input/output interface 150 may output commands or data received from other component(s) of the electronic device 101 to the user or the other external device.

The display 160 may include, e.g., a liquid crystal display (LCD), a light emitting diode (LED) display, an organic light emitting diode (OLED) display, or a microelectromechanical systems (MEMS) display, or an electronic paper display. The display 160 may display, e.g., various contents (e.g., text, images, videos, icons, or symbols) to a user. The display 160 may include a touchscreen and may receive, e.g., a touch, a gesture, a proximity or a hovering input using an electronic pen or a part of the body of the user.

For example, the communication interface 170 may set up communication between the electronic device 101 and an external electronic device (e.g., a first electronic device 102, a second electronic device 104, or a server 106). For example, the communication interface 170 may be connected with the network 162 through wireless or wired communication to communicate with the external electronic device.

Wireless communication may use at least one of, e.g., long term evolution (LTE), long term evolution-advanced (LTE-A), code division multiple access (CDMA), wideband code division multiple access (WCDMA), universal mobile telecommunication system (UMTS), wireless broadband (WiBro), or global system for mobile communication (GSM), as a cellular communication protocol. Further, the wireless communication may include, e.g., short-range communication 164. The short-range communication 164 may include at least one of, e.g., wireless fidelity (Wi-Fi), Bluetooth, near-field communication (NFC), ZigBee, z-wave, or a global navigation satellite system (GNSS). The GNSS may include at least one of, e.g., global positioning system (GPS), the Russian global navigation satellite system (Glonass), the Chinese navigation satellite system (hereinafter, "Beidou") or the European global satellite-based navigation system (Galileo). Hereinafter, the terms "GPS" and the "GNSS" may be interchangeably used herein. The wired connection may include at least one of, e.g., universal serial bus (USB), high definition multimedia interface (HDMI), recommended standard (RS)-232, or plain old telephone service (POTS). The network 162 may include at least one communication network, e.g., a computer network (e.g., local area network (LAN) or wide area network (WAN)), the Internet, or a telephone network.

The first and second external electronic devices 102 and 104 each may be a device of the same or a different type from the electronic device 101. According to an embodiment of the present disclosure, the server 106 may include a group of one or more servers. All or some of operations executed on the electronic device 101 may be executed on another or multiple other electronic devices (e.g., the electronic devices 102 and 104 or server 106). ifIf the electronic device 101 performs some function or service automatically or at a request, the electronic device 101, instead of executing the function or service on its own, may request another device (e.g., electronic devices 102 and 104 or server 106) to perform at least some functions associated therewith. The other electronic device (e.g., electronic devices 102 and 104 or server 106) may execute the requested functions or additional functions and transfer the result of the execution of those functions to the electronic device 101. The electronic device 101 may provide the requested function or service by providing the received result as it is or performing additional processing itself. Cloud computing, distributed computing, or client-server computing technique may also be used, for example.

Various embodiments of the present disclosure are now described with reference to the accompanying drawings.

FIGS. 2A, 2B, 2C, 2D, 2E, and 2F are views illustrating examples of the external and/or internal configurations of an electronic device 200 according to an embodiment of the present disclosure.

Figure 2A:
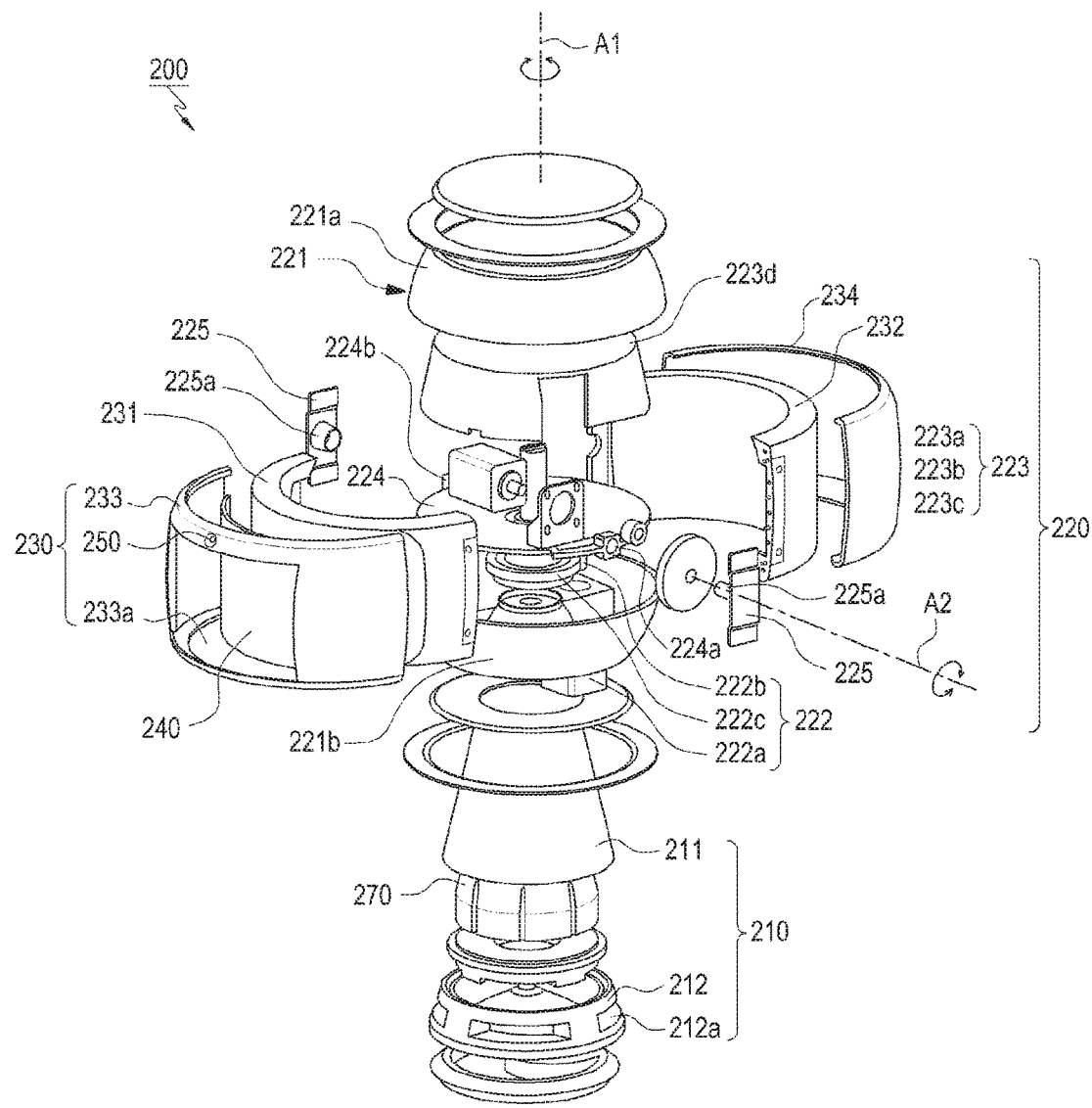
FIGS. 2A, 2B, 2C, 2D, 2E, and 2F are views illustrating examples of the external configuration of an electronic device according to various embodiments of the present disclosure.
Figure 2B:
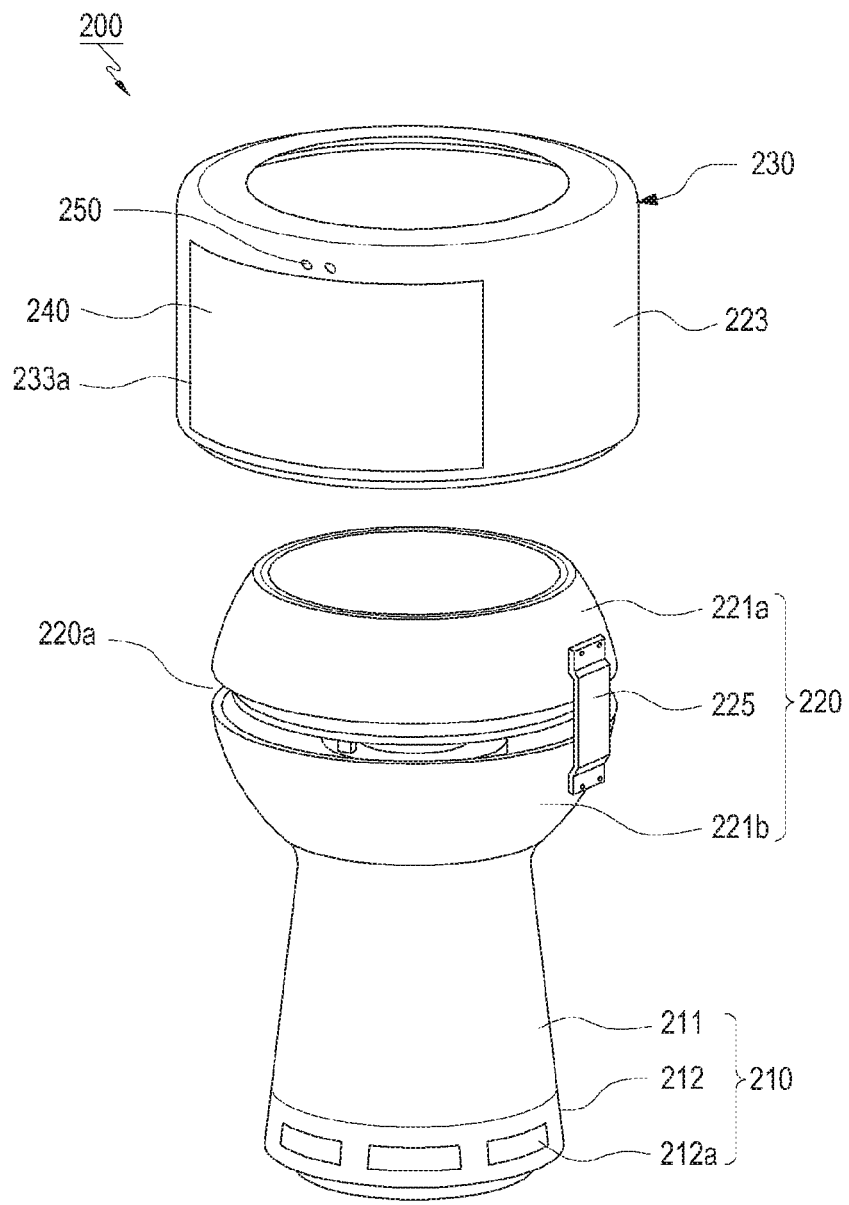

FIG. 2A is an exploded perspective view illustrating the configuration of the electronic device 200. FIG. 2b is an exploded perspective view illustrating a state of a rotating member 230 and rotation supporting member 220 among the components of the electronic device 200 before the rotating member 230 and the rotation supporting member 220 are fitted together.

Referring to FIGS. 2A and 2B, the electronic device 200 may include the rotation supporting member 220, a supporting member 210, the rotating member 230, a first and second module 222 and 223, a display 240, a driving module, a memory, and a processor. The rotation supporting member 220 may be supported by the supporting member 210 and may couple with the rotating member 230 so that the rotating member 230 can rotate.

The supporting member 210 may be disposed under the rotation supporting member 220 to support the rotation supporting member 220 so that the rotating member 230 can rotate.

The rotating member 230 may be rotatably coupled to the surface of the rotation supporting member 220 to rotate on the surface of the rotation supporting member 220 with respect to a first axis A1 and a second axis A2.

The first and second rotating module 222 and 223 may be provided inside the rotation supporting member 220 to rotate the rotating member 230 on the first and second axis A1 and A2.

The display 240 may be provided on the surface of the rotating member 230 to display information from the electronic device 200.

Upon receiving input information, the processor may control the rotation of the rotating member 230 so that the display 240 (e.g., the screen of the display) rotates on the first and second axis A1 and A2 corresponding to the received input information, identify an external object positioned along the first and second axis A1 and A2 using at least one sensor 250, and provide at least one function related to the identified external object.

The memory which is the same or similar to, e.g., the memory 130 of FIG. 1, may store a program necessary for functions and operations and various data generated while the program runs according to an embodiment of the present disclosure. The processor and the memory are described below in greater detail.

Among the components of the electronic device 200, the supporting member 210 is described below in further detail with reference to the accompanying drawings.

The supporting member 210 may include a first case 211 and a second case 212. For example, a speaker 270 may be placed in the first case 211. The second case 212 may include at least one emission hole 212a for emitting sound from the speaker 270. The upper part of the first case 211 is formed as a disc plate, the body of the first case 211 is shaped as a cylinder, and the lower part of the first case 211 is coupled with the second case 212.

When the second case 212 stands on the floor, the second case 212 simultaneously supports the first case 211, and the first case 211 supports the rotation supporting member 220 and the rotating member 230.

The rotation supporting member 220 supported by the supporting member 210 is described below in more detail.

The rotation supporting member 220 includes a body part 221 including a first housing 221a and a second housing 221b, a first rotating module 222 and a second rotating module 223, a rotator 224, and at least one coupling piece 225. For example, the body part 221 may be provided to be supported on an upper part of the supporting member 210. The first and second rotating module 222 and 223 and the rotator 224 may be disposed inside the body part 221. The coupling piece 225 may be disposed outside the body part 221.

The first rotating module 222 may have a first driving unit 222a (e.g., a motor). The first rotating module 222 may be provided in the body part 221 to rotate the rotating member 230 in a horizontal direction with respect to the first axis A1 by the first driving unit 222a.

The second rotating module 223 may have a second driving unit 223a (e.g., a motor). The second rotating module 223 may be provided in the body part 221 to rotate the rotating member 230 in upper and lower directions with respect to the second axis A2 by the second driving unit 223a.

The rotator 224 may be coupled with the rotating member 230 and may be provided in the body part 221 to be rotated along with the rotating member 230.

The coupling piece 225 may be provided between the rotating member 230 and the rotator 224 to couple the rotating member 230 with the rotator 224.

There may be two coupling pieces 225 that may be denoted a first and second coupling piece 225. Coupling protrusions 225a may be formed on the respective back surfaces of the first and second coupling piece 225. The coupling protrusions 225a may be fitted into a first coupling hole 224a and a second coupling hole 224b formed on the rotator 224 and may thereby be rotated along with the rotator 224.

The body part 221 may include the first and second housing 221a and 221b. A guide hole 220a may be formed between the first and second housing 221a and 221b to guide the rotation of the rotator 224.

Figure 2C:
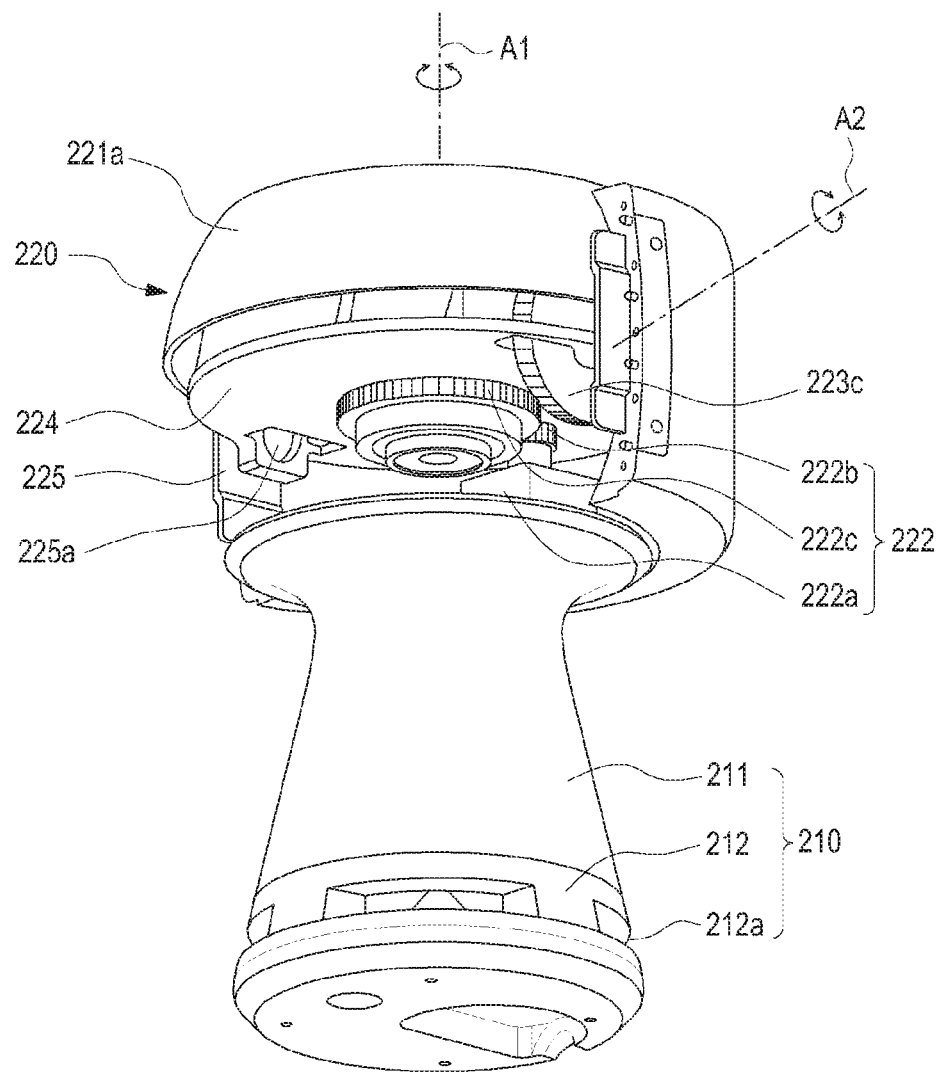

The first rotating module 222 is described in further detail with reference to FIG. 2C. FIG. 2C is a sectional, perspective view illustrating a coupled state of the first rotating module 222 among the components of the electronic device 200 according to an embodiment of the present disclosure.

For example, the first rotating module 222 may include the first driving unit 222a, a first gear part 222b, and a second gear part 222c.

The first driving unit 222a may be provided under the rotator 224 to rotate the rotator 224 on the first axis A1.

The first gear part 222b may be provided in the first driving unit 222a to rotate the second gear part 222c, which is described below, while simultaneously engaged with the second gear part 222c.

The second gear part 222c may be engaged with the first gear part 222b and may be provided on a lower surface of the rotator 224 to transfer a rotational force from the first driving unit 222a to the rotator 224 to rotate the rotator 224 while simultaneously rotating the rotating member 230 on the first axis A1.

Figure 3:
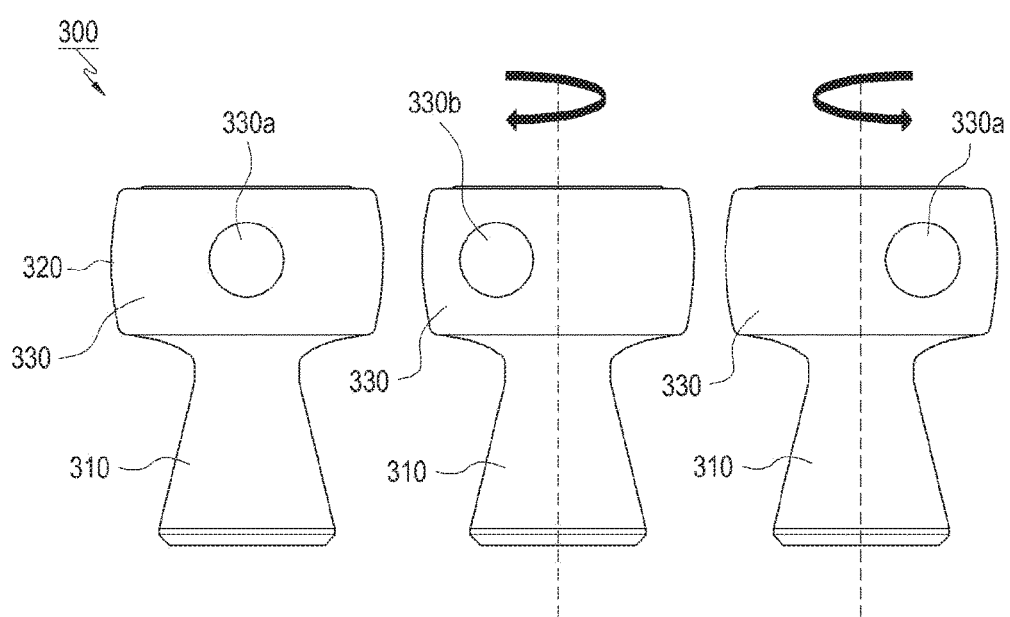
FIG. 3 is a view illustrating an example of a movement of an external configuration of an electronic device according to an embodiment of the present disclosure.

For example, if the first driving unit 222a is powered on and operated, the first driving unit 222a may rotate, and the rotational force of the first driving unit 222a may be delivered to the second gear part 222c through the first gear part 222b. When the second gear part 222c rotates, the rotator 224 may rotate together. The rotator 224 may rotate on the first axis A1 while simultaneously rotating the rotating member 230 clockwise or counterclockwise on the first axis A1. The rotating member 230 may rotate on the first axis A1 along the surface of the rotation supporting member 220. As such, the first rotating module 222 may rotate the rotating member 230 clockwise or counterclockwise on the first axis A1 as illustrated in FIG. 3.

Figure 2D:
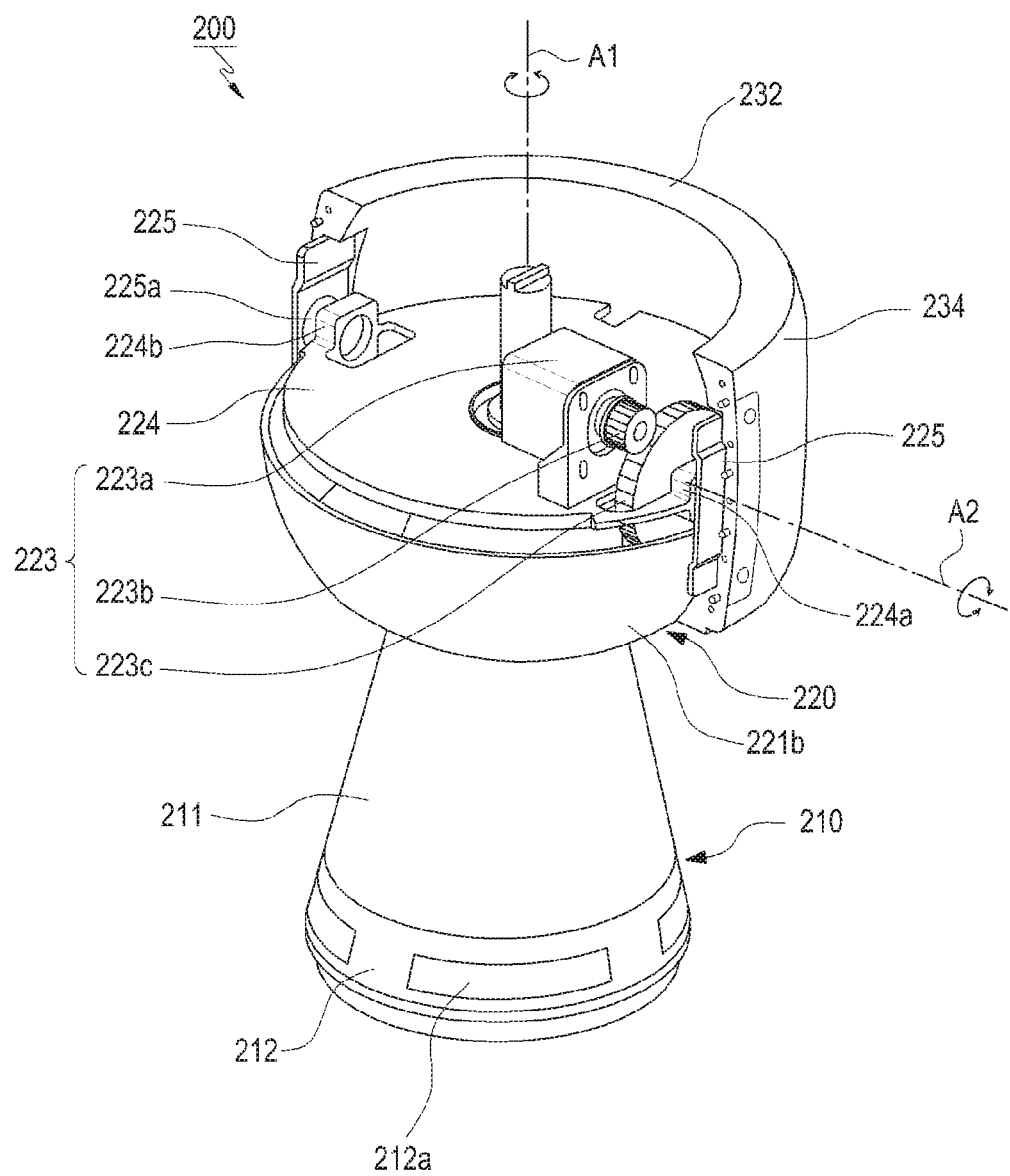

The second rotating module 223 is described in further detail with reference to FIG. 2D. FIG. 2D is a sectional, perspective view illustrating a coupled state of the second rotating module 223 among the components of the electronic device 200 according to an embodiment of the present disclosure.

For example, the second rotating module 223 may include the second driving unit 223a, a first gear part 223b, and a second gear part 223c.

The second driving unit 223a may be provided over the rotator 224 to rotate the rotator 224 on the second axis A2.

The first gear part 223b may be provided in the second driving unit 223a to rotate the second gear part 223c, which is described below, while simultaneously engaged with the second gear part 223c.

The second gear part 223c may be engaged with the first gear part 223b and may be provided on a side surface of the rotator 224 to transfer a rotational force from the second driving unit 223a to the rotator 224 to rotate the rotator 224 while simultaneously rotating the rotating member 230 on the first axis A1.

The second gear part 223c may be coupled to be rotatable while being fitted through a through-hole formed in the rotator 224. A center hole may be formed in a central part of the second gear part 223c to face a first coupling hole 224a formed in a side surface of the rotator 224. When the center hole of the second gear part 223c faces the first coupling hole 224a of the rotator 224, the coupling protrusions 225a formed on the back surfaces of the first coupling pieces 225 may be fitted and coupled through the holes. Accordingly, if the second gear part 223c rotates, the coupling pieces 225 may rotate along therewith. Since a second coupling hole 224b is formed on an opposite side surface of the first coupling hole 224a formed in the rotator 224 to allow the coupling protrusion 225a formed on the back surface of the second coupling piece 225 to be fitted thereinto, the coupling protrusion 225a formed on the back surface of the second coupling piece 225 may be fitted into the second coupling hole 224b.

Protecting cover parts 233 and 234 may be provided over the rotator 224 to protect the second driving unit 223a and the first and second gear part 223b and 223c. For example, the protecting cover part 233 and 234 may cover and protect the second driving unit 223a and the first and second gear part 223b and 223c.

Figure 4A:
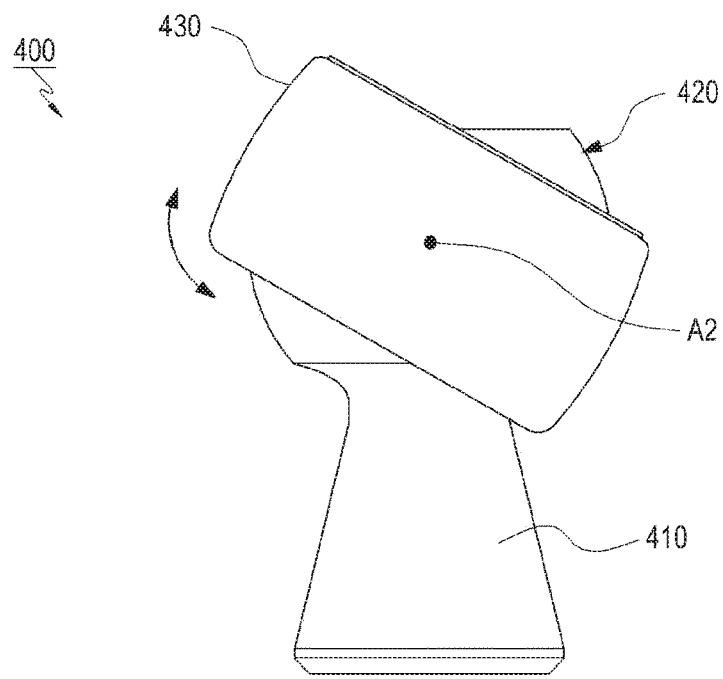
FIGS. 4A and 4B are views illustrating examples of movements of an external configuration of an electronic device according to various embodiments of the present disclosure.
Figure 4B:
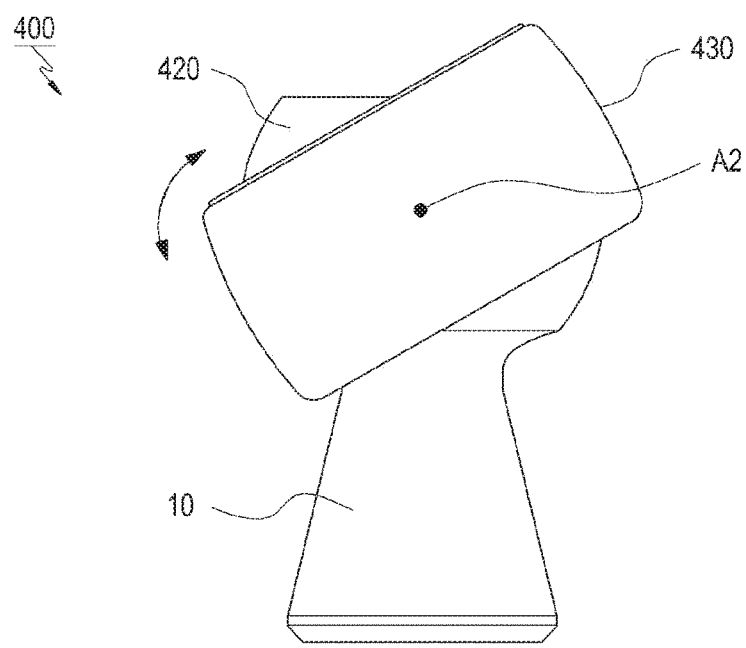

For example, if the second driving unit 223a is powered on and operated, the second driving unit 223a may rotate, and the rotational force of the second driving unit 223a may be delivered to the second gear part 223c through the first gear part 223b. When the second gear part 223c rotates, the rotator 224 may rotate together. The rotator 224 may rotate on the second axis A2 while simultaneously rotating the rotating member 230 clockwise or counterclockwise on the second axis A1. The rotating member 230 may rotate on the second axis A2 along the surface of the rotation supporting member 220. As such, the second rotating module 223 may rotate the rotating member 230 clockwise or counterclockwise on the second axis A2 as illustrated in FIGS. 4A and 4B.

Figure 2E:
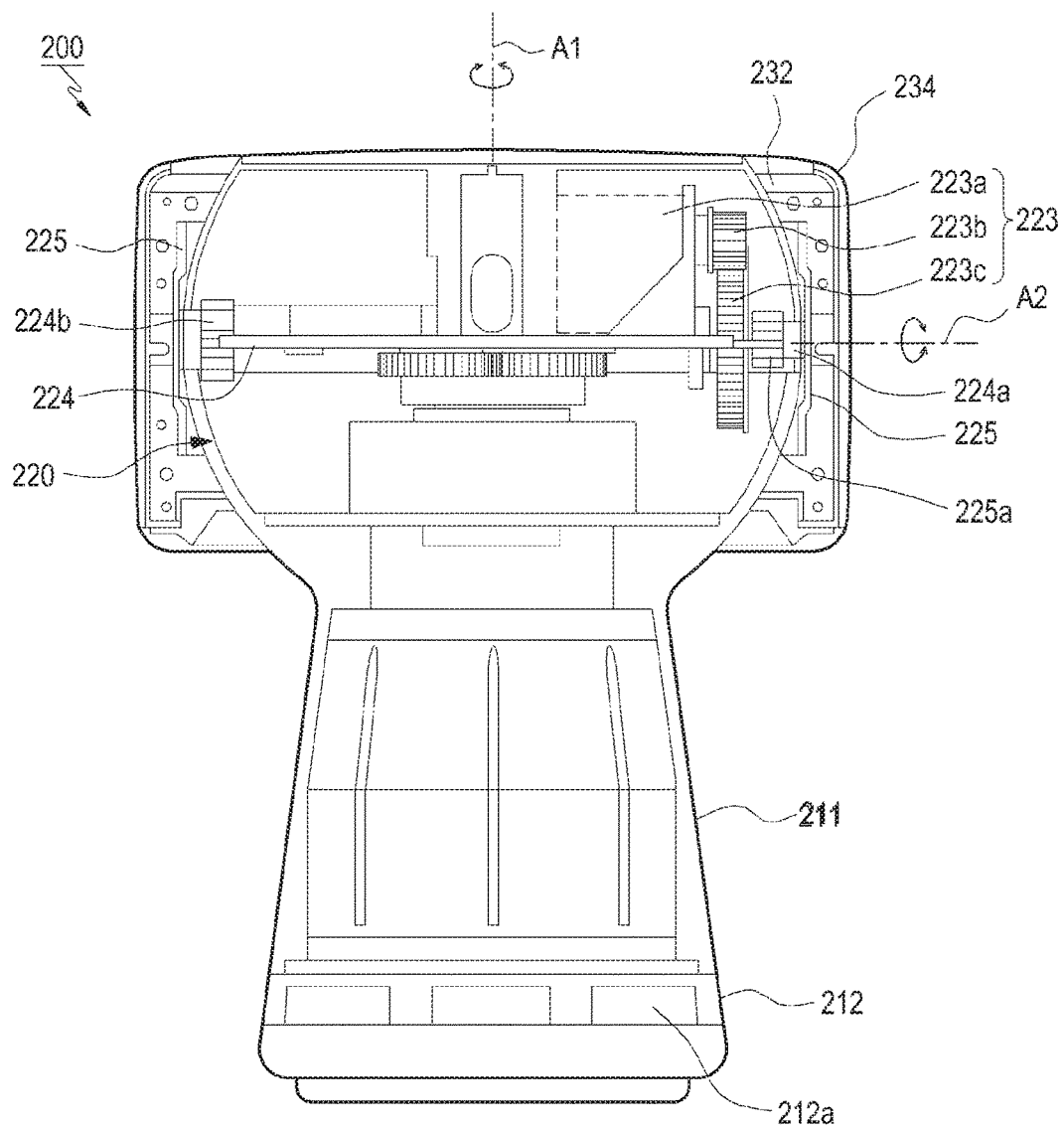
Figure 2F:
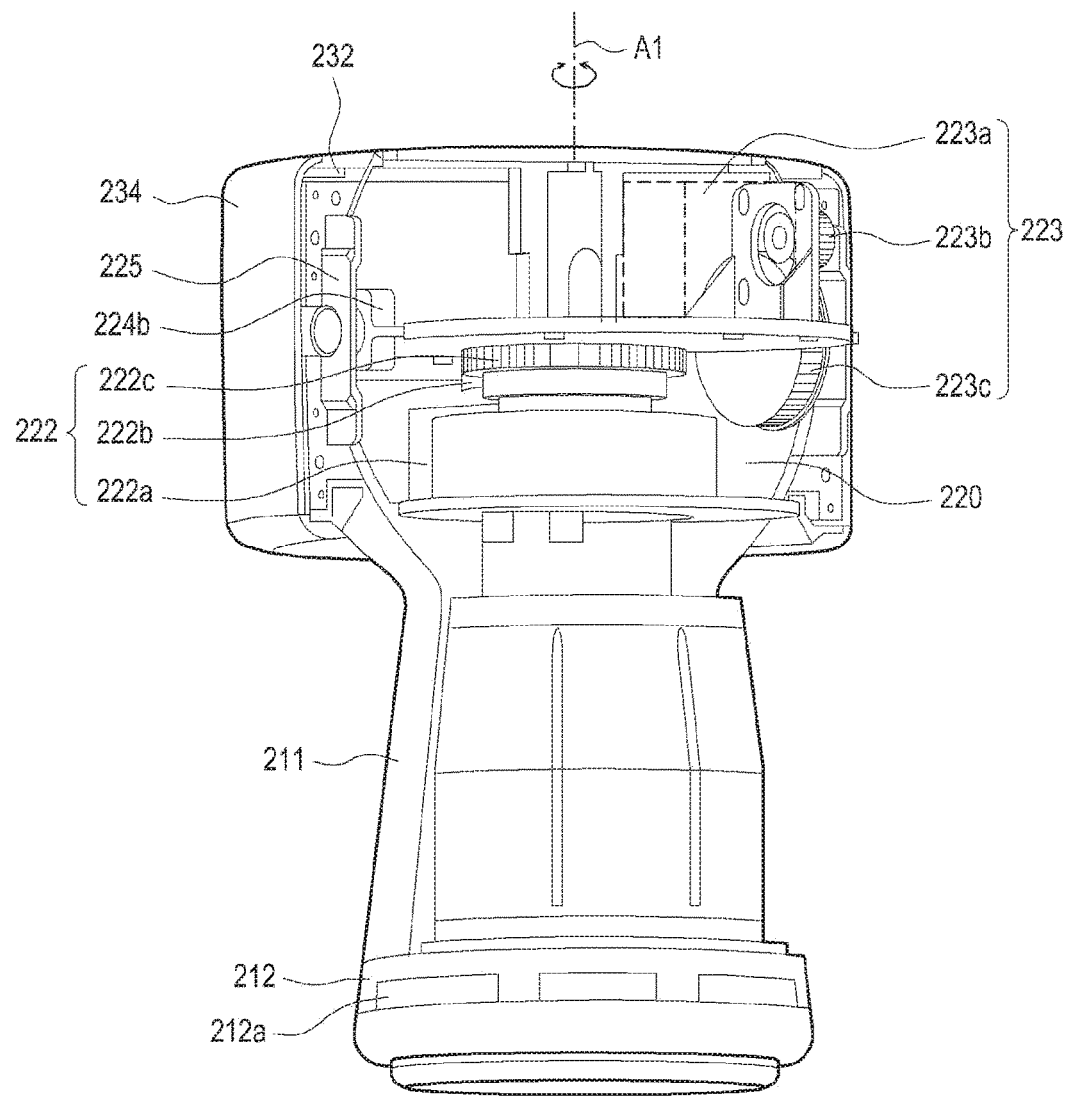

The rotating member 230 is described below in greater detail with reference to FIGS. 2E and 2F. FIG. 2E is a side cross-sectional view illustrating a coupled state of the rotating member 230 among the components of the electronic device 200 according to an embodiment of the present disclosure. FIG. 2F is a sectional perspective view illustrating a coupled state of the rotating member 230 among the components of the electronic device 200 according to an embodiment of the present disclosure.

For example, as set forth above in connection with FIG. 2A the rotating member 230 may include a first bracket 231, a second bracket 232, a first cover part 233, and a second cover part 234. The first bracket 231 may be semi-spherical and have the display 240. The second bracket 232 may be semi-spherical and may be coupled with the first bracket 231 forming a ring shape. The first cover part 233 may include at least one sensor and may have an opening 233a to externally expose the display 240. The second cover part 234 may be provided on the surface of the second bracket 232 to be connected with the first cover part 233.

For example, the display 240 and the first cover part 233 may be provided on a first surface of the first bracket 231, and the display 240 may be exposed to the outside through the opening 233a of the first cover part 233 as illustrated in FIGS. 2e and 2f. A second surface of the first bracket 231, which is positioned at an opposite side of the first surface, may be rotatably coupled while simultaneously being positioned facing the surface of the rotation supporting member 220. The second cover part 234 may be provided on the first surface of the second bracket 232, and a second surface of the second bracket 232, which is positioned at an opposite side of the first surface, may be rotatably coupled while simultaneously being positioned facing the surface of the rotation supporting member 220.

Upon receiving input information, the processor may control the rotating member 230 to rotate the display 240 with respect to the first axis A1 and second axis A2 corresponding to the received input information. For example, the processor may apply power to the first and second driving unit 222a and 223a of the first and second rotating module 222 and 223, respectively, to rotate the first and second driving unit 222a and 223a while simultaneously rotating the rotator 224. The processor may control the rotation of the rotator 224 and the first and second driving unit 222a and 223a while simultaneously controlling the application of power to the first and second driving unit 222a and 223a. Accordingly, the rotator 224 may rotate the rotating member 230 as the first and second driving unit 222a and 223a rotates. At this time, the processor may identify an external object positioned on the first or second axis A1 or A2 using the sensors provided in the first cover part 233, grasp the position of the identified external object, and control the first and second driving unit 222a and 223a and the rotator 224 to rotate the rotating member 230. The operation of the processor is described below in further detail.

The first and second cover parts 233 and 234 may be formed of a material including glass, a transparent acrylic resin, polyethylene, polyethylene terephthalate, and polycarbonate. The first and second cover parts 233 and 234 may be formed of other various materials or substances than those enumerated above.

Referring back to FIGS. 2A and 2B, according to an embodiment of the present disclosure, the electronic device 200 (e.g., the electronic device 101 of FIG. 1) may include the supporting member 210, the rotation supporting member 220, the rotating member 230, and the first and second rotating modules 222 and 223. The electronic device 200 may further include the display 240 joined onto the surface of the rotating member 230 and a sensor module 250 including at least one sensor capable of obtaining ambient information. Here, the sensor module 250 may include at least one sensor of an image sensor, an infrared (IR) sensor, an ultrasonic wave sensor, an illumination sensor, a red-green-blue (RGB) sensor, an ultra-wide band (UWB) module or device, a zigbee module or device, and a microphone. The sensor module 250 may include other various sensors capable of obtaining ambient information. The sensor module 250 may be configured to be joined onto a partial area of at least one of the supporting member 210, the rotation supporting member 220, or the rotating member 230 other than the area shown in FIG. 2B.

Further, the speaker 270 of the electronic device 200 as illustrated in FIG. 2A may be configured in at least one exposed partial area of at least one of the rotation supporting member 220 or the rotating member 230 other than the supporting member 210.

Further, the electronic device 200 may include software components for performing operations or functions of the electronic device in at least one inner area of the supporting member 210, the rotation supporting member 220, or the rotating member 230. According to an embodiment of the present disclosure, the electronic device may include a processor (e.g., the processor 120 of FIG. 1) for processing and controlling an operation and function to provide information through interactions with the identified external object.

The supporting member 210 may be coupled with the rotation supporting member 220 to support the rotation supporting member 220. Further, the rotation supporting member 220 may include a module for supplying power to at least an area and a first and second rotating module (the above-described first and second driving unit and first and second gear part) driving the rotating member 230 to rotate the display 240 coupled with the rotating member 230.

Further, a moving means (e.g., a wheel) may be joined onto the underneath exposed surface of the supporting member 210 to allow the electronic device 200 to move to other places. According to an embodiment of the present disclosure, the supporting member 210 may receive power externally. A connecting terminal or cable may be accommodated in a lower part of the electronic device to receive power from the outside. A coil may be mounted in a lower part of the supporting member 210 to receive power from an external wireless charger in a wireless charging manner. For example, a battery to receive power may be placed in an inner area of at least one of the supporting member 210, the rotation supporting member 220, or the rotating member 230.

According to various embodiments of the present disclosure, the rotating member 230 may have the opening 233a for exposing the display 240 in a shape other than that shown in FIG. 2A and to surround the entire area of the first cover part 233. Further, the rotating member 230 may have an opening, which is similar to, e.g., the opening 233a, in the entire or partial area of the second cover part 234 to expose the display 240 provided in the second cover part 234. A window may be configured in the first cover part 233 or the second cover part 234 to surround the surface of the panel (e.g., the ring-shaped panel) of the display 240. Here, the window of the rotating member 230 may be, e.g., a display capable of displaying information in its partial or whole area.

As set forth above, the rotation supporting member 220 may include various components (e.g., the first and second rotating module and rotate) for rotating the rotating member 230 and may have a physical button or touch input-capable touchpad joined on the outer surface of an upper part thereof. Further, at least some of the components included in the rotation supporting member 220 may be coupled with at least some of the components (e.g., the first and second bracket and first and second cover part) included in the rotating member 230 to rotate the rotating member 230. The rotation supporting member and its rotation and combined configuration are illustrated in FIGS. 2A and 2B, and no further detailed description thereof is given below.

According to an embodiment of the present disclosure, the electronic device 200 may be configured in the form shown in FIGS. 2A to 2F and may also take other various forms without being limited thereto. Various modules (e.g., the first and second rotating module 222 and 223 and rotator 224 of FIGS. 2A to 2F) for moving the display 240 coupled with the rotating member 230 may be included in the supporting member 210 and the rotation supporting member 220 of the electronic device. For example, the electronic device may be divided into a first rotating module driven to rotate the driving units along a horizontal direction with respect to the first axis A1 and a second rotating module driven to rotate the driving units along left and right directions with respect to a horizontal axis. The first rotating module may include a first driving unit (e.g., a motor) and first and second gears. The second rotating module may include a first driving unit (e.g., a fan motor) and first and second gears.

Further, the electronic device may configure the display 240 to surround an area of the surface of the rotating member 230 and may include a coupling piece (e.g., display assembly) connecting the rotating member 230 with the rotation supporting member 220.

Figure 5A:
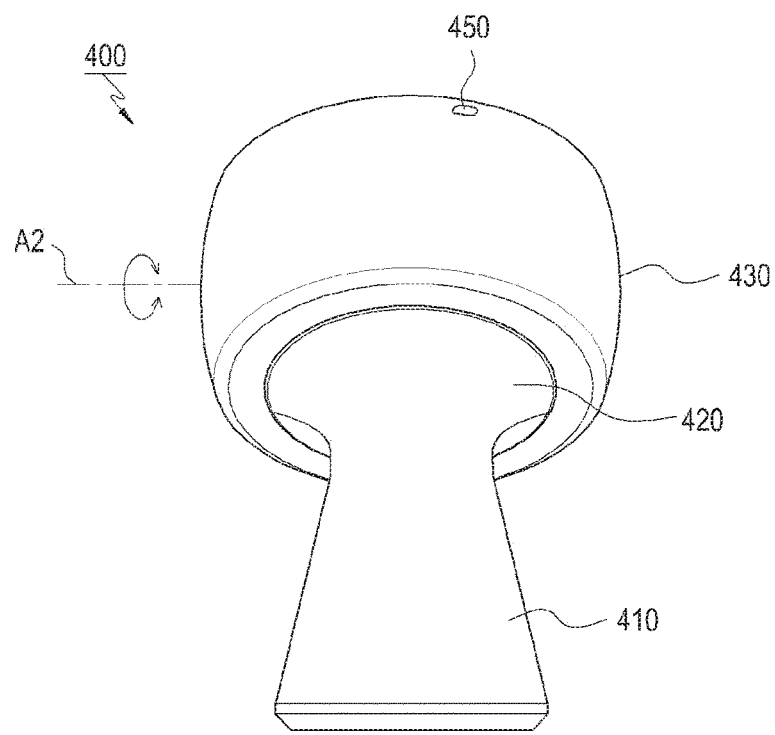
FIGS. 5A and 5B are views illustrating examples of movements of an external configuration of an electronic device according to various embodiments of the present disclosure.
Figure 5B:
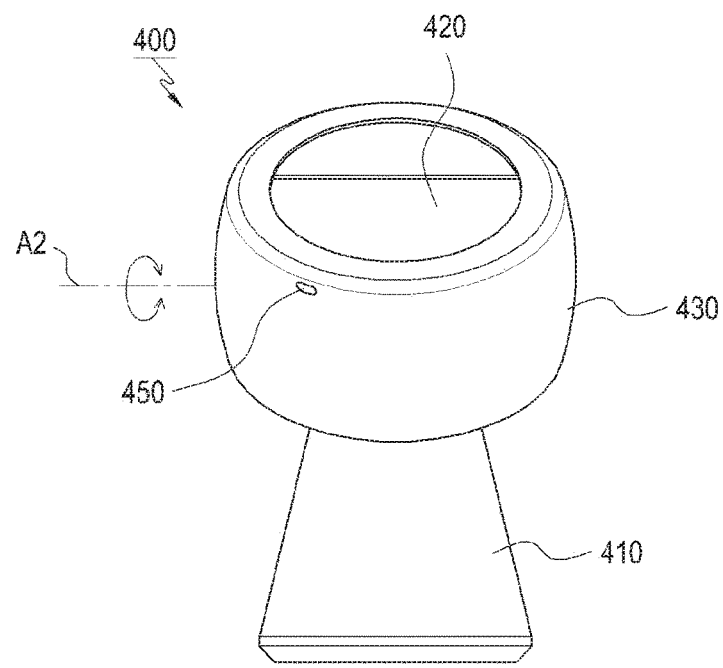

FIG. 3 is a view illustrating an example of rotation, in a first direction, of a rotating member of an electronic device according to an embodiment of the present disclosure. FIGS. 4A and 4B are views illustrating an example of rotation, in a second direction, of a rotating member of an electronic device according to an embodiment of the present disclosure. FIGS. 5A and 5B are views illustrating an example of rotation, in another second direction, of a rotating member of an electronic device according to an embodiment of the present disclosure.

Referring to FIG. 3, an electronic device 300 may include a supporting member 310, a rotating member 320 and a rotation supporting member coupled with the supporting member 310. The rotation supporting member includes a first and second rotating module. The rotating member 320 may be rotated along a horizontal direction clockwise or counterclockwise on a vertical axis (e.g., A1 of FIG. 2a) by the first and second rotating module. According to an embodiment of the present disclosure, as the rotation of the rotating member 320 allows a display 330 to move along the direction of the rotation, the electronic device 300 may control an object to exhibit such an effect as if the object simultaneously moves along with the display 330.

For example, the electronic device 300 may display an object 331a on, e.g., a central area of the display 330 formed to surround the whole or partial area of the rotating member 320. Thereafter, if rotating left, the electronic device 300 may previously move the object 331a to a left-hand area of the display 330, i.e., an area positioned in the direction of rotation and display a moved object 331b or 331c. When the rotating member 320 completely rotates, the electronic device 300 may display the object 331b moved to the left-hand area of the display 330 at the position before the move, e.g., on the central area of the display 330. According to an embodiment of the present disclosure, as the rotating member 320 rotates right and the display 330 thus moves to the right, the electronic device 300 may previously move the object 331a, which is positioned in the central area of the display 330, to the right of the display 330, displaying a moved object 331c. When the rotation of the rotating member 320 is complete, the electronic device 300 may display the moved object 331c back at the original position (the central area of the display).

The first and second rotating module and the rotation supporting member are the same as the first and second rotating module 222 and 223 and the rotation supporting member 220 described above, and no further detailed description thereof is thus presented below.

Referring to FIGS. 4A and 4B, an electronic device 400 may include a supporting member 430, a rotation supporting member 420, and a rotating member 430. The rotation supporting member 420 may include a first and a second rotating module. The rotating member 430 may be rotated clockwise or counterclockwise on the second axis A2 by the first and the second rotating module. The clockwise or counterclockwise rotation of the rotating member 430, as shown in FIGS. 4A and 4B, may be represented at front view as shown in FIGS. 5A and 5B.

Likewise, the first and second rotating module and the rotation supporting member 420 are the same as the first and second rotating module 222 and 223 and the rotation supporting member 220 described above, and no further detailed description thereof is thus presented below.

Figure 6A:
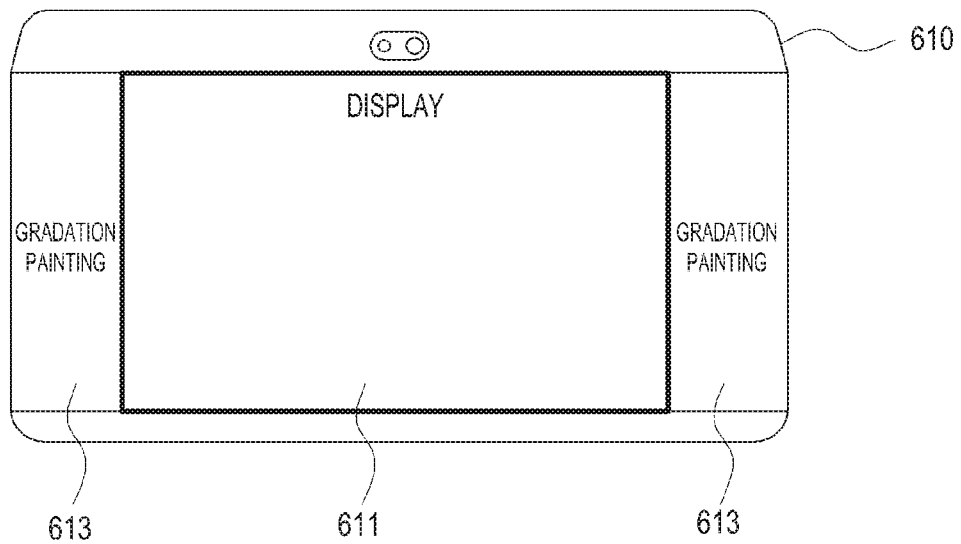
FIGS. 6A, 6B, and 6C are views illustrating examples of a configuration of a display of an electronic device according to various embodiments of the present disclosure.
Figure 6B:
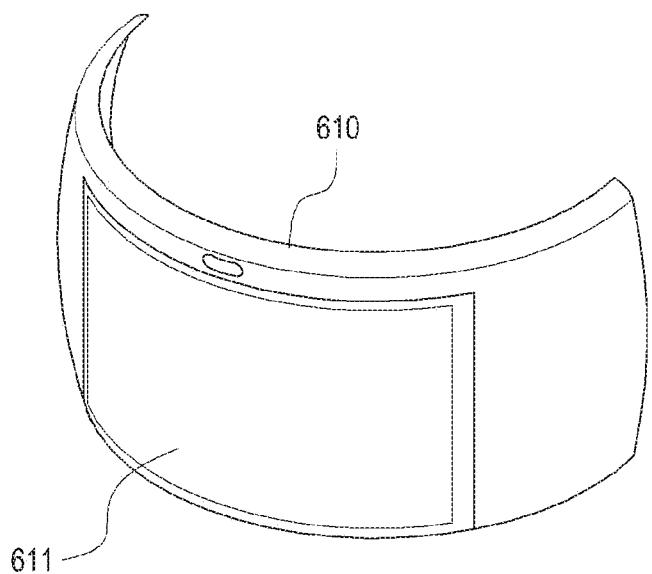
Figure 6C:
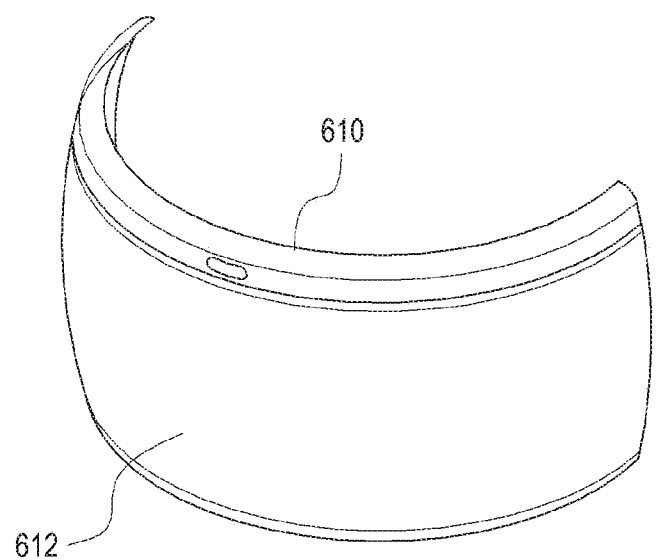

FIGS. 6A to 6C are views illustrating examples of the configuration of a display of an electronic device according to an embodiment of the present disclosure.

Referring to FIGS. 6A and 6B, a display 611 of the electronic device, which is the same or similar to the display 240 of FIGS. 2A and 2B, may be coupled with a rotating member 610, and the panel of the display 611 may be coupled onto an area of the surface of the rotating member 610 which is the same or similar to the rotating member 230 of FIGS. 2A to 2F. A window may be coupled to the surface of the rotating member. To make the display panel and the window assembly feel like one piece, the electronic device may be subject to a gradation process that puts gradation coats onto an area of the window assembly which is closer to the display 611 and another area of the window assembly which is further from the display 611. According to an embodiment of the present disclosure, e.g., a 10 mm left-to-right area with respect to an active area of the display may be subject to a gradation process from its outer side to the inside, allowing it to turn from black to transparent According to an embodiment of the present disclosure, at least part of the display 611 of the electronic device may be bent at the rotating member 610, allowing it to be coupled to the window assembly. The display 611 of the electronic device may be joined to the window assembly through at least one or more areas of the window assembly or a physical structure or chemical assembly for assembling and may thus remain bent at a predetermined degree.

Referring to FIG. 6C, according to an embodiment of the present disclosure, the display 612 of the electronic device may be formed to surround, e.g., the overall surface of the cylindrical rotating member 610. Here, the rotating member 610 may have an opening in the form of surrounding the entire surface, and a transparent window may be fastened to the opening.

According to an embodiment of the present disclosure, the electronic device may also have other various configurations that may provide information to the user than those shown in FIGS. 2A to 6C.

Hereinafter, software components of an electronic device are described in detail in association with its hardware components, according to an embodiment of the present disclosure.

Figure 7:
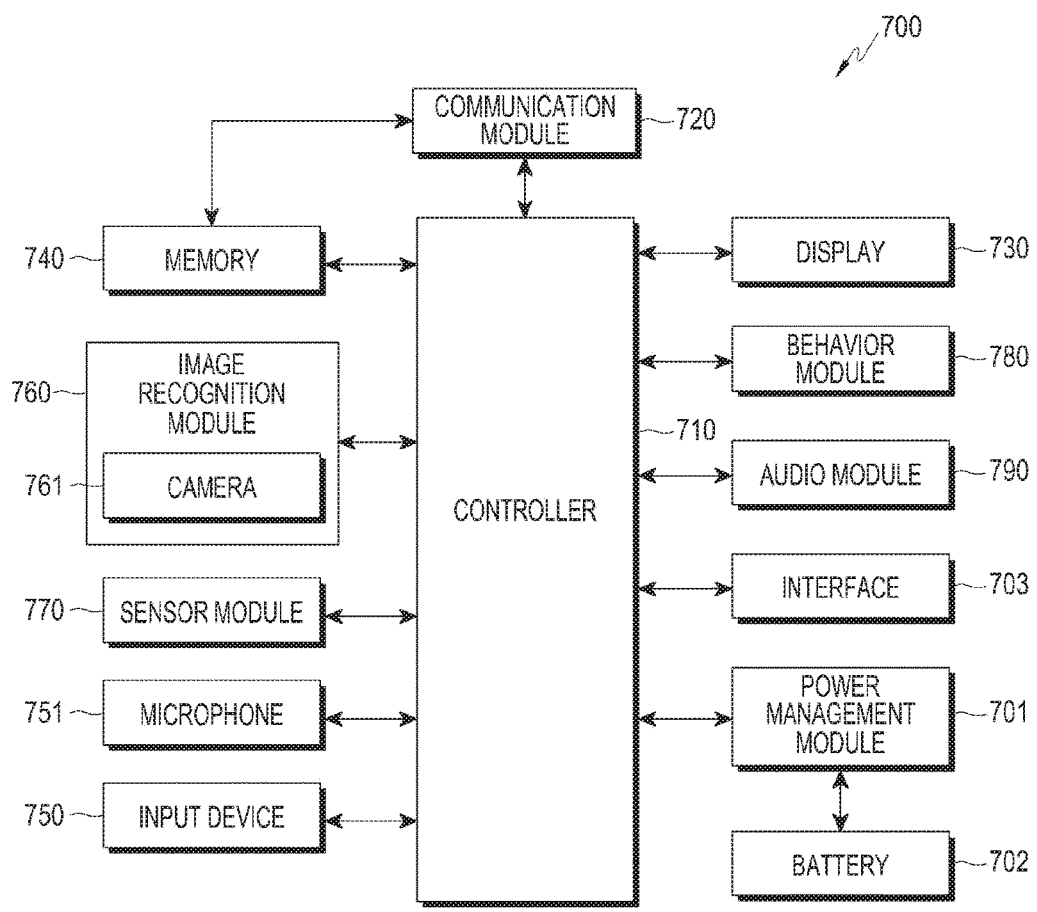
FIG. 7 is a view illustrating an electronic device according to an embodiment of the present disclosure.

FIG. 7 is an electronic device according to an embodiment of the present disclosure.

Referring to FIG. 7, an electronic device 700 (e.g., the electronic device 101 of FIG. 1) may include at least one of a controller 710, a communication module 720, a display 730, a memory 740, an input device 750, an image recognizing module 760, a sensor module 770, a motion/behavior module 780, and an audio module 790. The electronic device 700 may further include at least one of a power managing module 701, a battery 702, an interface 703, and a microphone 751. According to an embodiment of the present disclosure, the electronic device 700 may further include a subscriber identification module (SIM) card.

According to an embodiment of the present disclosure, the controller 710 which is the same or similar to, e.g., the processor 120 of FIG. 1, may control the running of a function, application, program, or information according to the operation of the electronic device 700. The controller 710 may perform control to communicate with peripheral devices and may perform control to display various types of information (e.g., graphic elements, contents, or objects) on the whole or part of the screen of the display 730.

Further, the controller 710 may check the use context of the electronic device. Here, the use context of the electronic device relates to the current operation context of the electronic device. The user context of the electronic device may mean the running of a program, application, or function of the electronic device. Hereinafter, the running of functions of the electronic device is described in regard to the use context of the electronic device.

The controller 710 may control a movement of the display 730 coupled with a rotating member of the electronic device 700 upon running a certain function of the electronic device 700. Upon receiving input information from an external object, the controller 710 may trace the position of the external object having entered the input information and move the display 730 in the direction (e.g., a first direction) where the external object is positioned. In this case, the controller 710 may transmit control signals so that the internal driving members (e.g., the first and second rotating module 222 and 223 and the rotator 224) are driven in the first direction, controlling the driving of the driving members. The input information may be information for initiating an interaction with an external object and may include voice information of the external object (e.g., a user), information entered from the external object through a button or touchpad, information sensed for a certain movement of the external object, and information received through an external network.

The controller 710, upon receiving the input information for initiating the interaction with the external object, may analyze the received input information and select and run, as an interaction means, an application capable of running on the electronic device, corresponding to the analyzed input information. Further, the controller 710 may configure an initial screen of the running application and display on the display. Then, the controller 710 may control to output, as audio information, a guide indicating that a preparation for interactions has been made through the audio module 790. Further, before or after running the application, the controller 710 may determine the position where the input information has been received using at least one sensor simultaneously with the running of the application and perform control to drive the rotating member (e.g., the rotating member 230 of FIGS. 2A to 2F) towards the determined position so that the display 730 moves in the first direction towards the determined position.

If the display 730 moves in the first direction, the controller 710 may identify the external object positioned in the first direction using at least one sensor. According to an embodiment of the present disclosure, the electronic device may receive information about the user's facial image sensed by the image recognizing module 760 (e.g., the camera 761 or the sensor module 250 of FIG. 2B), extract registration information corresponding to the received information about the facial image, and compare the extracted registration information with the received information about the facial image, thereby recognizing the user. The electronic device may identify the external object using at least one of the user's face recognition, fingerprint recognition, iris recognition, authentication information (e.g., a password), authentication, or voice recognition.

Further, in order to identify the user, the controller 710, after moving in the first direction, may, e.g., recognize the user's face and control the internal driving members and control the internal driving members to rotate the rotating member—and as a result the display coupled with the rotating member—clockwise or counterclockwise on the horizontal axis (e.g., A2 of FIG. 2A).

The controller 710 may enable the electronic device to provide at least one function related to the identified external object.

According to an embodiment of the present disclosure, upon recognizing a plurality of users along the first direction in which the display 730 has moved, the controller 710 may identify at least one of the plurality of users and provide information related to the identified user.

According to an embodiment of the present disclosure, if the input information is a control command for an peripheral device, the controller 710 may determine the peripheral device and display an object for the determined peripheral device on the display 730 that has moved facing the user. Then, the controller 710 may transmit the control command to the peripheral device.

According to an embodiment of the present disclosure, the controller 710 may measure the distance between identified users. When the measured distance is a preset threshold or greater, the controller 710 may determine that the distance from the identified external object is large and may provide information related to the first function so that the object displayed on the display 730 may intuitively be identified from far away. For example, an image-type object or audio information may be provided as the object displayed on the display 730. When a character is displayed according to a function, the displayed character may be magnified and displayed. Here, if the electronic device is positioned at a preset distance or greater from the user, the user may not enter a physical input. Thus, the first function may be a function activated only for an input through a gesture or voice. For example, the touchpad may be deactivated.

Further, the controller 710 may determine that the distance from the identified external object is small and provide an object for the second function to the display 730. For example, the controller 710 may perform control so that objects, even ones displayable in a small size, may be displayed on the display 730. The controller 710 may perform control to configure a screen including an object allowing the user to directly control a physical command, not a voice command, and to display the configured screen. Here, the second function may be a function enabling the user to make a physical entry. Further, if objects provided are configured in multiple pages according to an operation for a running application, the controller 710 may perform control to sequentially or non-sequentially display the multiple pages on the display 730. The multiple pages may be displayed as if they are flipped by at least one of a predetermined time, the user's gesture or voice information, and information sensed by at least one sensor under the control of the controller 710.

According to an embodiment of the present disclosure, if a notification event occurs while a particular application runs or in a standby state (also referred to as an "idle state"), the controller 710 may analyze information received as per the notification event, determine a corresponding user, trace the position of the determined user, and move the display 730 in the direction (for example, the first direction) where the user is positioned. Further, upon receiving a response message from the user identified in the first direction through an interaction according to the notification event, the controller 710 may perform control to send the received response message to the opposite party who has sent the information about the notification event.

Further, in the standby state (also referred to an idle state), the controller 710 may receive and process information entered for an interaction using at least one physical button or touchpad configured in an upper area of the rotating member. Upon attempting an interaction through the physical button or touchpad, the controller 710 may control the electronic device to sense the approach of the user's body through at least one or more sensors and move a physical input-capable area in a direction facing the user in order to enable user's input entry.

According to an embodiment of the present disclosure, the controller 710 may include at least one or more of an application processor (AP), a communication processor (CP), a graphic processor (GP), a multi-chip processor (MCP), and an image processor (IP) to perform a process for driving the electronic device and providing services.

According to an embodiment of the present disclosure, the controller 710 may control the rotating member to move so that not only the display 730 but also at least one or more sensors for image sensing in the direction of interaction with the user, at least one or more microphones 751 for obtaining voice, an instrumental eye structure or at least one or more other hardware (H/W) or instrumental structures face the identified user. Further, the controller 710 may perform control to provide information through a light beam or a temporary change in device if the direction is not identified. Accordingly, the user may intuitively identify information.

According to an embodiment of the present disclosure, upon determining that the received input information is for configuring command information, the controller 710 may run an application for configuring command information. Then, the controller 710 may control the movement of the rotating member so that the display 730 faces in the first direction and may identify the external object in the first direction. Further, in order to configure command information, the controller 710 may configure at least one operation control function and an operational condition related to the identified external object and provide information related to the at least one configured operation control function and the configured operational condition, as command information for the identified external object.

For example, upon receiving, as interaction information, voice information from the identified external object, the controller 710 may extract a word related to a condition from the received voice information through a voice analyzing algorithm, or obtain a condition sentence including the extracted word or extract a control-related word to obtain a control sentence including the extracted word. The controller 710 may configure the operational condition based on the obtained condition sentence or configure the operation control function based on the obtained control sentence.

Further, the controller 710 may gather context information through context recognition in connection with, e.g., the identified external object and may configure the operational condition and operation control function based on the gathered context information. The controller 710 may generate objects related to the function for configuring the operation control function or condition objects for configuring the operational condition based on the gathered context information. Here, the context information may mean all information available, e.g., at the time that the user performs an interaction and may include information related to a human being, the position of an object, identification, activity, or state. The context information may also mean information specifying or defining the nature of a context or situation, such as a human being, place, object, thing, or time that affects the interaction between the user and another user, system, or device application.

Specifically, the context information may include a computing context, such as a network connection state, communication bandwidth, and printer/display/workstation, a user context, such as a user's profile/position/ambient people, a physical context, such as lighting/noise level/traffic state/temperature, or a time context, such as time/week/month/season. Such context information may be grasped and gathered through various sensing devices and applications in the system, and the context information may be used to provide various application services or bundled up with other context information to be used to induce a third conclusion.

The controller 710 may display the generated condition objects or function-related objects on the display for the user's choice. The controller 710 may select at least one condition object from among the condition objects displayed on the display and set a condition that the selected condition object indicates as the operational condition. Further, the controller 710 may select at least one object from among the function-related objects displayed on the display and set a function that the selected object indicates as the operation control function. Here, upon selecting the displayed object, the controller 710 may set a displayed function-related object or displayed condition object corresponding to a selection input sensed using at least one sensor as the object for configuring the operation control function or the operational condition. Here, the condition objects or function-related objects may be displayed in a list form on an area of the display 730 that faces in the first direction along which it is positioned opposite the external object. Further, the condition objects or function-related objects may be moved from a preset area of the display 730 to another area of the display 730 in the first direction along which it faces the external object and be displayed on the other area.

The controller 710 may perform control to configure integrated command information by associating the configured operational condition with the at least one configured operation control function and to store the configured command information, as command information for the external object, in the memory 740. In order for the user to intuitively identify the configured command information, the controller 710 may perform control to generate a card-type image, graphic element, or object (e.g., a command card) containing the command information and to store the generated command card, as command information for the external object, in the memory 740. The controller 710 may display the generated command card on the display 730 or output the generated command card as voice information through the audio module 790.

In connection with the configured operational condition or the configured operation control function, the controller 710 may search at least one command card stored in the memory 740 and display the found command card on the display 730. The controller 710 may update the command information contained in the command card found under the configured operational condition or the configured operation control function. Here, if one or more command cards are searched, the controller 710 may configure the searched command cards in a list form or in such a form as if pages are flipped and display on the display 730.

The controller 710 may configure integrated command information by associating the configured operational condition with the at least one configured operation control function and generate a command card by forming the configured command information in a card form—hereinafter, this command card is denoted a first command card. The controller 710 may search for at least one command card (hereinafter, denoted a second command card) generated before the identified external object, merge the generated first command card with the found second command card to configure new command information for the identified external object, and generate a new third command card by forming the configured new command information in a card form. Here, upon searching for the second command card, the electronic device may search for the second command card containing the same or similar information to at least one of the operational condition or operation control function contained in the first command card.

If the configured operational condition is met, the controller 710 may run the at least one configured operation control function according to the configured operational condition. Before running the operation control function, the controller 710 may determine the current position of the external object, and upon determining that the external object is not positioned within an adjacent area, the controller 710 may prevent the configured operation control function from running.

According to an embodiment of the present disclosure, the controller 710 may be at least a portion of the processor and may include a combination of one or more of, e.g., hardware, software, or firmware. The controller 710 may lack at least some of the components described herein or may include other components for performing the function of the electronic device in addition to the components mentioned herein.

According to an embodiment of the present disclosure, if implemented in hardware, the configuration of at least a portion of the controller 710 of the electronic device 700 may include one or more of at least one processor including a central processing unit (CPU)/micro processing unit (MPU), a memory (e.g., a register and/or a random access memory (RAM)) where at least one piece of memory loading data is loaded, and a bus for inputting/outputting at least one piece of data to the processor and memory. When implemented in software, the controller 710 may include a predetermined program routine or program data that is loaded from a predetermined recording medium to a memory to perform a defined function on the electronic device and is processed by the processor.

According to an embodiment of the present disclosure, the display 730 of the electronic device, which is the same or similar to, e.g., a partial configuration of the input/output interface 150 or display 160 of FIG. 1, the display 240 of FIG. 2B, the display 611 of FIG. 6A, or the display 612 of FIG. 6B, may output information (e.g., at least one object or graphic element of text, image, or video) relating to a result of running an operation under the control of the controller 710.

The display 730 may display, on the screen, an input pad (e.g., one or more buttons) for entering at least one of various numbers, characters, or symbols on an input window, in various manners. The display 730 may display a screen of running a service according to the execution of various applications related to information communication.

The display 730 may be configured with a bendable display panel (e.g., a flexible display). Further, if the display 730 is implemented in the form of a touchscreen, the display 730 may correspond to the touchscreen of the input device 750. The display 730, if implemented together with the input device 750 in the form of a touchscreen, may display various information generated according to the user's touch input/interaction.

The display 730 may be configured in a form as shown in, e.g., FIGS. 6A to 6C. The display panel may be mounted in the whole or partial area of the rotating member depending on the shape of the rotating member to be moved up/down or left/right by the driving members included in the rotating member (e.g., the rotating member 230 of FIGS. 2A to 2F) as the rotating member rotates under the control of the controller 710.

The display 730 may be moved interworking with the movement of the rotating member so that its main area faces in the first direction along which the external object is positioned under the control of the controller 710. The display 730 may be moved so that its main area faces in the second direction where it is positioned opposite the identified external object, and the display 730 may display objects or graphic elements for information related to the identified user.

The display 730 may display current time information, per-time graphic elements, and weather information on the standby screen in the standby state under the control of the controller 710. The display 730 may change and display relevant graphic elements according to the elapsed time.

When input information for initiating an interaction is received so that the electronic device 700 switches from the standby state to an active state for performing the interaction, the display 730 may display, on the main area, the switch to the active state, input information, or an object related to a particular application that runs based on the input information. Further, as the direction in which the main area faces is changed by the movement of the rotating member, the display 730 may display objects as if objects on the main area move along the moving direction. According to an embodiment of the present disclosure, if the electronic device lacks the rotating member or is not moved by the rotating member—i.e., the display 730 does not move, the display 730 may move objects on the display to the area that faces in the direction where the identified external object is positioned and display the objects on the area.

The display 730 may display objects by performing an interaction with the identified external object through an interaction means. Further, the display 730 may display an object related to the operational condition and operation control function configured by the controller 710 and display the generated command card or at least one found command card based on the configured operational condition and configured operation control function.

According to an embodiment of the present disclosure, the display 730 of the electronic device 700 may include at least one or more of a liquid crystal display (LCD), a thin film transistor LCD (TFT-LCD), an organic light emitting diode (OLED) display, a light emitting diode (LED) display, an active matrix OLED (AMOLED) display, a flexible display, and a three-dimensional (3D) display. The display may be configured in a transparent type or light-transmissive type allowing the outside to be viewed therethrough. The display may be configured in the form of a transparent display including a transparent OLED (TOLED) display.

According to an embodiment of the present disclosure, the electronic device 700 may include, in addition to the display 730, another display (e.g., an expanded display or flexible display) or a display of an external electronic device (e.g., at least one of an external display device, a wearable device, or an external terminal device) interworking with the electronic device. The additional display may perform the same or similar operations to those of the display 730.

According to an embodiment of the present disclosure, the communication module 720 (e.g., the communication interface 170 of FIG. 1) of the electronic device may perform communication with another electronic device or an external electronic device (e.g., the electronic device 102 or 104 or server 106 of FIG. 1) under the control of the controller 710. The communication module 720 may communicate data related to an operation run under the control of the controller 710 with an external device. The communication module 720 may connect to a network using wireless communication or wired communication via the communication interface or perform communication through an inter-device connection. The wireless connection may be made by various radio communication protocols, including, but not limited to, wireless fidelity (Wi-Fi), Bluetooth (BT), ZigBee, z-wave, near field communication (NFC), global positioning system (GPS), or cellular communication protocols (e.g., long term evolution (LTE), LTE-advanced (LTE-A), code division multiple access (CDMA), wideband CDMA (WCDMA), universal mobile telecommunications service (UMTS), wireless broadband (WiBro) or global system for mobile communications (GSM). The wired communication may include at least one of, e.g., universal serial bus (USB), high definition multimedia interface (HDMI), recommended standard 232 (RS-232), plain old telephone service (POTS), universal asynchronous receiver transmitter (UART), inter-integrated circuit (I2C), serial peripheral interface (SPI), or controller area network (CAN). The communication module 720 may include all other types of communication schemes that have been widely known or are to be developed in the future, in addition to the above-enumerated communication schemes.

The communication module 720 may transmit or receive information by interacting with external electronic devices connected through, e.g., a home network. Further, the communication module 720 may transmit, to an external electronic device, a control signal to control, e.g., a peripheral home device in the house, according to a command inputted through an interaction with an external object. Further, the communication module 720 may be connected via various communication networks to receive context information for configuring command information from external electronic devices.

According to an embodiment of the present disclosure, the memory 740 (which is the same or similar to, e.g., the memory 130 of FIG. 1) of the electronic device may store various data generated while the program runs, as well as a program necessary for a functional operation according to an embodiment. The memory 740 may largely include a program area and a data area. The program area may store relevant information for driving the electronic device, such as operating system (OS) for booting up the electronic device. The data area may store data communicated and generated according to an embodiment of the present disclosure. Further, the memory 740 may include at least one storage medium of a flash memory, a hard disk, a multimedia card, a micro-type memory (e.g., a secure digital (SD) or an extreme digital (xD) memory), a random access memory (RAM), or a read only memory (ROM)).

The memory 740 may store information related to applications running on the electronic device 700, relevant information for identifying an external object, information related to the motion of an external object gathered through the motion module 780, or context information. The memory 740 may also store other various pieces of information necessary to conduct various embodiments of the present disclosure.

The memory 740 may store information according to an interaction with the identified external object. The memory 740 may also store information (e.g., the operational condition card or operation control function card) related to the configured operation condition or configured operation control function and the command information configured based on the configured operational condition and configured operation control function. The memory 740 may also store the command card obtained by configuring the command information in a card form.

The input device 750 (e.g., the input/output interface 150 of FIG. 1) of the electronic device may transfer, to the controller 710, various information, such as number and character information entered from the user and signals entered in relation with setting various functions and controlling functions by the electronic device. The input device 750 may support a user input for running an application or module supporting a particular function. The input device 750 may include at least one of a key input means, such as a keyboard or keypad, a touch input means, such as a touch sensor or touchpad, a sound source input means, a camera, or various sensors, and the input unit 230 may include a gesture input means. Further, the input device 750 may include all types of input means that are being currently in development or are to be developed in the future. The input device 750 may receive information from the user through the touch panel of the display 730 and transfer the inputted information to the controller 710.

The input device 750 may deliver, to the controller 710, information related to the user's gesture that has been received through the sensor module 770 including various sensors or the camera 761 of the image recognizing module 760. The input device 750 may transfer, to the controller 710, an input signal according to the selection of at least one object (e.g., a content) displayed on the screen.

The input device 750 may receive an input signal from the external object (user or thing) through a sound input means, i.e., the audio module 790, and transfer the inputted signal to the controller 710.

The input device 750 may include at least one of the image recognizing module 760 including the camera 761, the sensor module 770 including various sensors, the microphone 751, and the interface 703, depending on the configuration of the electronic device.

The electronic device may include the audio module 790 which is the same or similar to, e.g., the input/output interface 150 of FIG. 1 or the speaker 270 of FIG. 2A. The audio module 790 may output sounds and may include at least one of, e.g., an audio codec, a microphone (MIC), a receiver, an earphone output (EAR_L) or a speaker. According to an embodiment of the present disclosure, the audio module 790 may output audio information generated according to the current running of an application and may output the audio information in a mute mode, speaker mode, or earphone mode according to each function of the running application. Further, the audio module 790 may output audio information related to an application that runs as an interaction means, audio information to indicate the start of an interaction, or audio information generated by interaction with the identified external object while the application is running.

Further, according to an embodiment of the present disclosure, the electronic device may further include a means to output vibrations or a means to emit smells. When each running application runs in a function corresponding to the transformed type of the display 730, the vibration output means or smell output means may output information relating to the running function as a vibration or smell.

Main components of the electronic device have been described above with reference to FIG. 7, according to an embodiment of the present disclosure. However, the components shown in FIG. 7 are not essential components, and the electronic device may be implemented with more or less components than those shown. The position of the major components described above in connection with FIG. 7 may be varied according to various embodiments of the present disclosure. According to an embodiment of the present disclosure, the electronic device of FIG. 7 may be driven by the hardware configuration shown in FIGS. 2A to 2F. As the electronic device is so driven, the rotating member may be rotated to control the movement of the display 730, a relevant function may be provided through interaction with the external object identified as the rotating member rotates, and the display of objects may be controlled interworking with the movement of the display 730 coupled to the rotating member, as illustrated in FIG. 3, 4A, 4B, 5A, or 5B.

As set forth above, an electronic device (the electronic device 101 of FIG. 1 or the electronic device 700 of FIG. 7) may analyze voice information received from an external object through various voice analyzing algorithms. Further, the electronic device may obtain text as a result of the voice recognition and may use the same, as a query, to perform natural language understanding (NLU)/dialog management (DM). Here, the electronic device may recognize the text as a sentence through the NLU/DM. The electronic device may output a sound response to the identified external object using at least one language model. Accordingly, the electronic device may provide a dynamic result to the interacting external object (e.g., user) according to the relationship among at least one or more external objects or content to be delivered. The electronic device may determine a variety of language models depending on the identified external object. For example, if the relationship with the identified external object is set as friends previously or by study, a language model for configuring words or phrases expressing intimacy may be selected, and for an urgent message, as should be delivered to the external object, an acoustic model with the feature of clear tones may be selected and converted into language. The electronic device may modulate the voice with a low-frequency band voice acoustic model and output the same based on the information indicating that the external object has difficulty hearing high-frequency band voices.

The electronic device may analyze information inputted in the standby state through a voice analyzing algorithm, determine an interaction means according to the result of analysis, and run an application related to the determined interaction means. Further, upon receiving voice information as interaction information inputted by interaction with the external object while the application is running, the electronic device may analyze the inputted voice information through the voice analyzing algorithm and provide a corresponding function according to the result of analysis. Further, the electronic device may analyze, through the voice analysis algorithm, voice information inputted by interaction with the identified external object while running, e.g., a command card application and recognize a sentence for configuring an operational condition and operation control function included in the command information based on the analyzed voice information.

The controller of the electronic device (e.g., the electronic device 101 of FIG. 1 or the electronic device 700 of FIG. 7), as a hardware module or software module (e.g., an application program), may be a hardware component (e.g., a function) or software component (e.g., a program) including at least one of various sensors, data measuring module, input/output interface, a module for managing the state or environment of the electronic device, or communication module as included in the electronic device.

Figure 8:
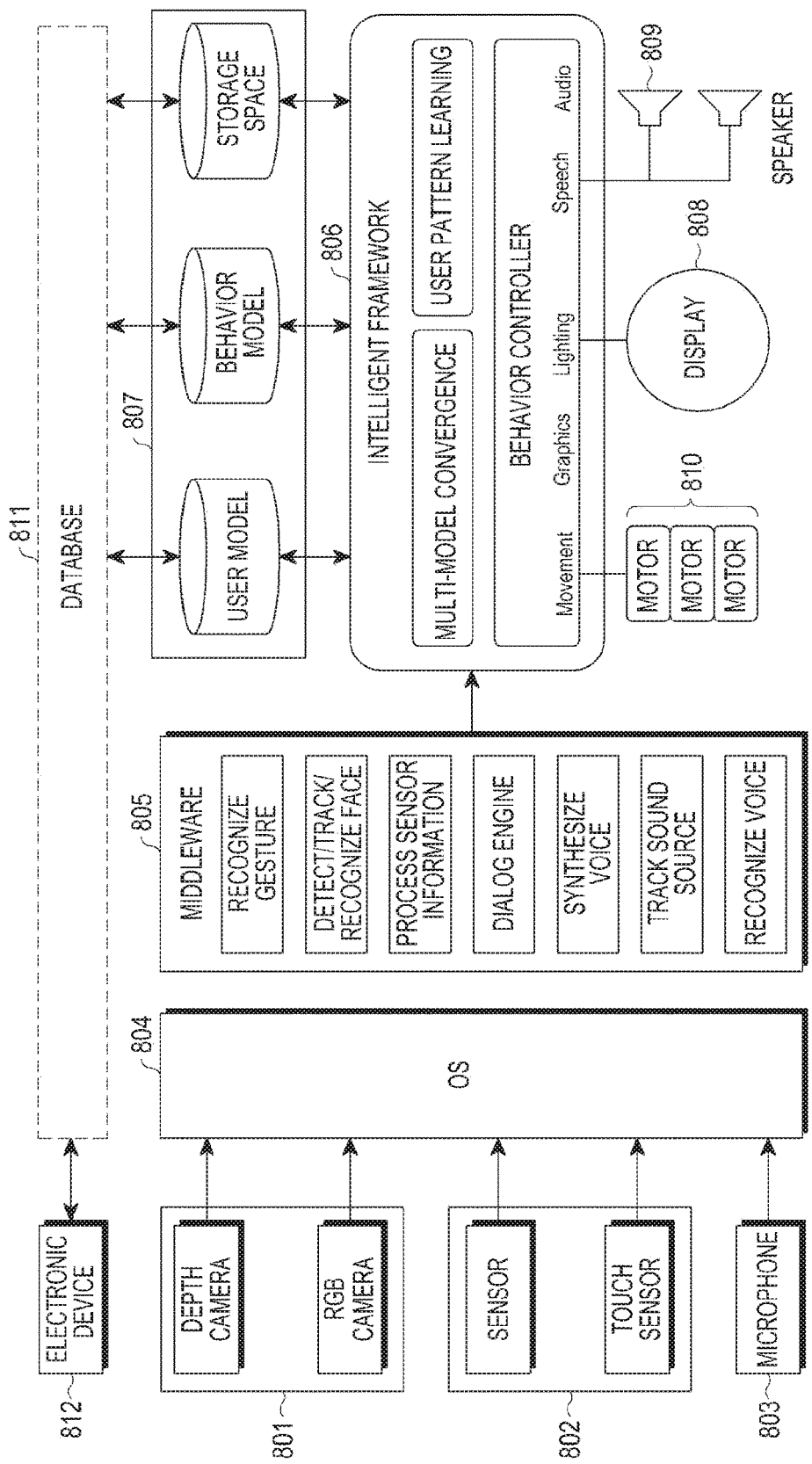
FIG. 8 is a view illustrating an electronic device according to an embodiment of the present disclosure.

FIG. 8 is an electronic device according to an embodiment of the present disclosure.

According to an embodiment of the present disclosure, the controller of the electronic device, as a hardware module or software module (e.g., an application program), may be a hardware component (e.g., a function) or software component (e.g., a program) including at least one of various sensors, data measuring module, input/output interface, a module for managing the state or environment of the electronic device, or communication module as included in the electronic device. Such hardware components (e.g., functions) or software components (e.g., programs) may be added or omitted depending on the configuration and hardware configuration (e.g., function) of the electronic device.

Referring to FIG. 8, an operating system (OS, also referred to as system software (S/W)) 804 in the electronic device may not only play a role as a normal operating system, such as distributing resources and job scheduling processing, but may also control various hardware (H/W) devices (e.g., a camera 801, a sensor 802, a microphone 803, etc.). Further, the OS 804 may process signals inputted from the H/W devices.

Middleware 805 may detect the position of the user's face using the signal-processed data to perform authentication through facial recognition, recognize the user's three-dimensional (3D) gesture, trace the position of input of an audio signal (through e.g., direct of arrival (DOA)), perform voice recognition or voice synthesis, function as a conversation engine for processing conversation (e.g., an interaction), or process information sensed by at least one sensor.

An intelligent framework 806 may perform multi-modal fusion, user pattern learning, and behavior control functions. The multi-modal fusion may compile and manage various information processed by the middleware 805. The user pattern learning function may extract and learn meaningful information, such as the user's life pattern or preference, using multi-modal fusion module information. The behavior control function may represent information that the electronic device is to feed back to the user in a movement, a graphic (user interface (UI)/user experience (UX)), lighting, a voice response (speech), or an audio. The intelligent framework may include a program that operates as part of the kernel for controlling the hardware components, e.g., a motor 810, display 808, or speaker 809, and the intelligent framework may run relevant functions based on data communicated with the motor 810, display 808, or the speaker 809.

Further, the electronic device may include a memory 807 that includes a user model database (DB) storing, as per users, information learned in the intelligent framework 806, a behavior model DB for controlling the behavior of the electronic device, and a storage storing other information. The DBs in the memory 807 may be stored or shared through a network (e.g., a Cloud database) 811.

The electronic device may include a rotation supporting member, a supporting member supporting the rotation supporting member, a rotating member movably coupled with the rotation supporting member, a display movably coupled onto the surface of the rotating member, a driving module driving the display, a memory, and a processor. Here, the processor, upon receiving input information, may control the driving of the rotating member so that the display corresponding to the received input information faces in a first direction, if the display moves to face in the first direction, control the driving of the rotating member so that the display faces in a second direction to identify the external object, if the display is positioned to face the external object in the second direction, identify the external object, and display, through the display, information about at least one function run in relation to the identified external object.

The process may, if the display moves in the first direction or second direction corresponding to the driving of the rotating member with previous information displayed on the display in relation with the external object, change the position of display of at least one object for the previous information so that at least one object of the displayed previous information is displayed while being moved in a set direction as the display moves, and if the movement of the display stops, change the position of display of the at least one object back to the original position.

The processor may, if the display moves in a third direction after information about the executed function is displayed on the display, change the position of display of the at least one object so that the at least one object of the information about the executed function is displayed while being moved in a set direction as the display moves in the third direction, and if the movement of the display stops, change the position of display of the at least one object back to the original position.

The processor may, if running a function related to the identified external object, gather information related to the executed function from a peripheral electronic device and provide information corresponding to the context or interest of the external object using the gathered information.

The processor may, if the input information is a control command, run an application for the control command and transmit, to the peripheral electronic device, control information to control a peripheral electronic device corresponding to the control command through the running application.

The processor may measure the distance from the identified external object, run another function in relation to the identified external object according to the measured distance, and display information about the running function on the display.

The processor may, if a notification event occurs while the function related to the external object is provided, determine a target external object of the notification event, control the driving of the rotating member so that the display moves in the direction where the determined target external object is positioned, and upon receiving response information from the target external object, provide the information about the executed function corresponding to the received response information.

The processor may, in a case where the information about the at least one function includes multiple pages, if the display is moved at a requested direction according to a request for switching the displayed page, change the position of display of the first page so that the first page displayed on the display disappears in the requested direction, and if the display returns to the first direction, change the position of display of a second page so that the second page slides in from an opposite direction of the requested direction on the display.

An electronic device may include a rotation supporting member, a supporting member supporting the rotation supporting member, a rotating member rotatably coupled onto the surface of the rotation supporting member, a first and second rotating module provided in the rotation supporting member to rotate the rotating member in a first or second direction, a display provided on the surface of the rotating member, a driving module driving the display, a memory, and a processor. Upon receiving input information, the processor may control the rotation of the rotating member so that the display (or a screen of the display) rotates in the first or second direction corresponding to the received input information, identify an external object positioned along the first or second direction using at least one sensor, and provide at least one function related to the identified external object.

The supporting member may include a first case having a speaker therein and a second case provided under the first case and having at least one emission hole for emitting sound from the speaker.

The rotation supporting member may include a body part including first and second housings, a first rotating module provided in the body part, having the first driving unit, and rotating the rotating member in a first direction by the first driving unit, a second rotating module provided in the body part, having the second driving unit, and rotating the rotating member in the second direction by the second driving unit, a rotate provided in the body part and coupled to be rotated along with the rotating member, and at least one coupling piece provided between the rotating member and the rotate to couple the rotating member with the rotate.

The first rotating module may include a first driving unit provided under the rotate and a second gear part provided at a lower surface of the rotate, engaged with a first gear part provided in the first driving unit, transferring a rotational force from the first driving unit to the rotate to turn around the rotate, and rotating the rotating member in the first direction.

The second rotating module may include a second driving unit provided over the rotate and a second gear part provided at a side surface of the rotate, engaged with a first gear part provided in the second driving unit, transferring a rotational force from the second driving unit to the rotate to turn around the rotate, and rotating the rotating member in the second direction.

The rotating member may include a first bracket having the display, a second bracket coupled with the first bracket, a first cover part provided on the surface of the first bracket, including the at least one sensor, and having an opening to externally expose the display, and a second cover provided on the surface of the second bracket and coupled with the first cover part. Here, the first display and the first cover part may be provided on a first surface of the first bracket, a second surface, which is an opposite surface of the first surface of the first bracket, may be rotatably coupled onto the surface of the rotation supporting member while facing the rotation supporting member, the second cover part may be provided on a first surface of the second bracket, and a second surface, which is an opposite surface of the first surface of the second bracket, may be rotatably coupled onto the surface of the rotation supporting member while facing the rotation supporting member.

The rotating member may include a ring-shaped rotating member.

The first and second cover parts may be formed of at least one of glass, a transparent acrylic resin, polyethylene, polyethylene terephthalate, and polycarbonate.

According to various embodiments of the present disclosure, an electronic device may comprise a main body including a rotating member, a rotation supporting member supporting the rotating member, and a driving module moving the rotating member, a display coupled onto a surface of the rotating member, a processor controlling the driving module to move the rotating member, and a memory storing instructions executed by the processor, wherein the processor may control a movement of the rotating member so that the display or a screen of the display faces in a first direction where an external object is positioned, identify the external object positioned in the first direction using at least one sensor, configure an operational condition related to the identified external object and at least one operation control function associated with the operational condition based on information received according to an interaction with the identified external object, and provide information related to the configured operational condition and the at least one configured operation control function.

The processor may, if the configured operational condition is met, run the at least one configured operation control function according to the configured operational condition.

The processor may, if the display moves to face in the first direction, control the movement of the rotating member so that the display faces in a second direction to identify the external object and, if the display faces in the second direction, identify the external object facing the display using at least one sensor.

The processor may configure command information by integrating the configured operational condition and the at least one configured operation control function in association therebetween, generate a card-type command card containing the configured command information, and display the generated command card on the display.

The processor may, upon receiving voice information from the identified external object, obtain a condition sentence containing a word related to a condition from the received voice information, configure the operational condition based on the obtained condition sentence, obtain a control sentence containing a word related to control from the received voice information, and configure the at least one operation control function based on the obtained control sentence.

The processor may generate condition objects for configuring the operational condition or objects related to the function for configuring the operation control function based on context information gathered through context recognition in relation to the identified external object and may display the generated condition objects or function-related objects on the display.

The processor may choose at least one condition object from among the condition objects for configuring the operational condition displayed on the display and set a condition indicated by the chosen condition object as the operational condition.

The processor may choose at least one object from among the function-related objects for configuring the operation control function displayed on the display and set a function indicated by the chosen object as the operation control function.

The processor may search at least one command card related to the configured operational condition or the configured operation control function and update the found command card based on the configured operational condition or the configured operation control function.

The processor, before running the operation control function, may determine a current position of the external object, and if the external object is not positioned within a nearby area, restrict the running of the configured operation control function. The configured operation control function may include a function for controlling an operation of at least one external electronic device positioned around the electronic device or controlling an operation for at least one application running on the electronic device.

A method for providing information in an electronic device as set forth above is described below in greater detail with reference to the accompanying drawings.

Figure 9:
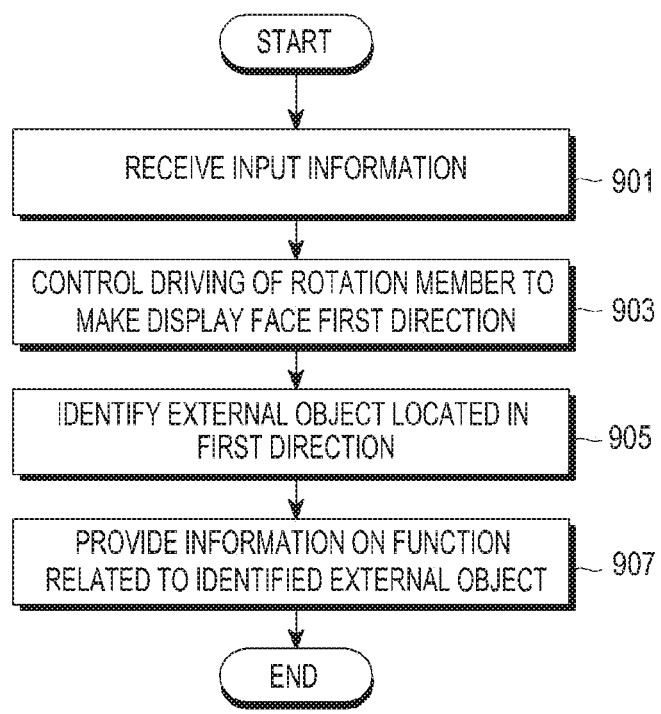
FIG. 9 is a flowchart of a method of an electronic device according to an embodiment of the present disclosure.

FIG. 9 is a flowchart of a method of an electronic device according to an embodiment of the present disclosure.

Referring to FIG. 9, an electronic device (e.g., the electronic device 101 of FIG. 1, the electronic device 200 of FIGS. 2A to 2F, or the electronic device 700 of FIG. 7) may receive input information for initiating an interaction with a user in step 901. Here, the input information may include voice information of the external object (e.g., a user), information entered from the external object through a button or touchpad, information sensed for a certain movement of the external object, and information received through an external network. According to an embodiment of the present disclosure, the electronic device may receive input information from at least one sensor or microphone mounted in at least a portion of the supporting member (e.g., the supporting member 210 of FIGS. 2A to 2F), the rotation supporting member (e.g., the rotation supporting member 220 of FIGS. 2A to 2F), or the rotating member (e.g., the rotating member 230 of FIGS. 2A to 2F).

In step 903, the electronic device, upon receiving the input information, may determine the direction in which the input information has been received according to the input information and may control the driving of the rotating member (e.g., the rotating member 230 of FIGS. 2A to 2F) coupled with the display (e.g., the display 160 of FIG. 1, the display 240 of FIGS. 2A and 2B, the display 611 or 612 of FIGS. 6A to 6C, or the display 730 of FIG. 7) so that the display faces in the determined direction. According to an embodiment of the present disclosure, if the received input information is information received through a microphone, the electronic device may determine the direction in which a voice is entered through an array of multiple microphones and control the driving of the rotating member so that the display moves in the determined direction (e.g., the first direction). According to an embodiment of the present disclosure, the electronic device may control the display to rotate clockwise or counterclockwise on a vertical axis (e.g., A1 of FIGS. 2A to 2F) of the rotating member so that the display may receive a 360-degree image as the input information, and if the rotating member rotates at 360 degrees, the electronic device may control the rotating member to rotate at 360 degrees. In such case, the electronic device may analyze the 360-degree image to identify an external object in step 905.

In step 905, the electronic device may identify an external object positioned in the first direction based on the result of analysis of the received input information or information sensed by at least one sensor. According to an embodiment of the present disclosure, the electronic device may receive the user's facial image captured by an image recognizing module (e.g., a camera) and compare the result of analysis of the received facial image with registration information about the external object that is previously registered and stored, thereby identifying the user. The electronic device may identify the external object using at least one of the user's face recognition, fingerprint recognition, iris recognition, authentication information (e.g., a password), authentication, or voice recognition.

In step 907, the electronic device may provide at least one function related to the identified external object. Here, no more detailed description is given as to the at least one function provided in connection with the external object.

Specific steps for providing at least one function related to an external object based on the operational procedure of the electronic device as shown in FIG. 9 are described below in connection with the figures subsequent to FIG. 9. In the subsequent figures, the electronic device may be configured and driven in the same or similar manner to, e.g., the electronic device 200 of FIGS. 2A to 2F, the electronic device 700 of FIG. 7, or the electronic device of FIG. 8.

Figure 10:
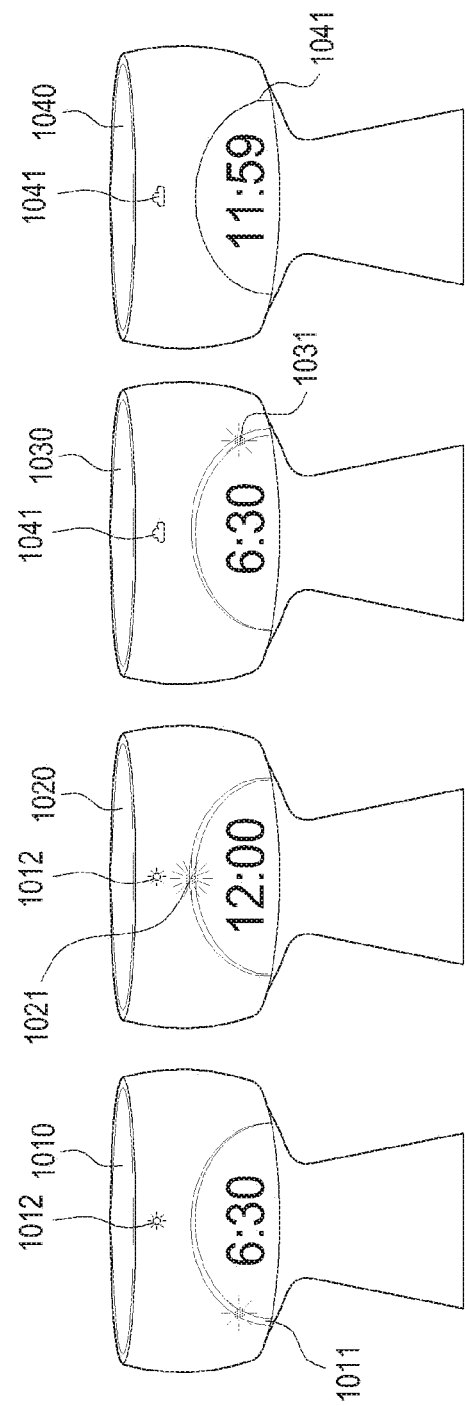
FIG. 10 is a view illustrating an example of a display screen of an electronic device according to an embodiment of the present disclosure.

FIG. 10 is a view illustrating an example of a display screen of an electronic device according to an embodiment of the present disclosure.

In step 901 of FIG. 9 as set forth above, the electronic device may receive input information for initiating an interaction in the standby state (e.g., a state where there is no interaction with an external object). The electronic device may configure a standby screen and display it on the display in the standby state as illustrated in FIG. 10. The standby screen may include objects actively configured as per at least one of time information, environment information, sensing information, user's context information, or configuration information.

Referring to FIG. 10, the electronic device may display current time information and per-time graphic elements on a standby screen 1010, 1020, 1030, or 1040 that is included in the display and contains per-time graphic elements. For example, the electronic device may display, on the standby screen 1010, time information (e.g., "6:30"), a graphic element 1011 (e.g., the position of the sun over time) related to the time, and weather information 1013 related to the time. Thereafter, the electronic device may change and display relevant graphic elements 1021, 1031, and 1041 as time elapses.

Figure 11A:
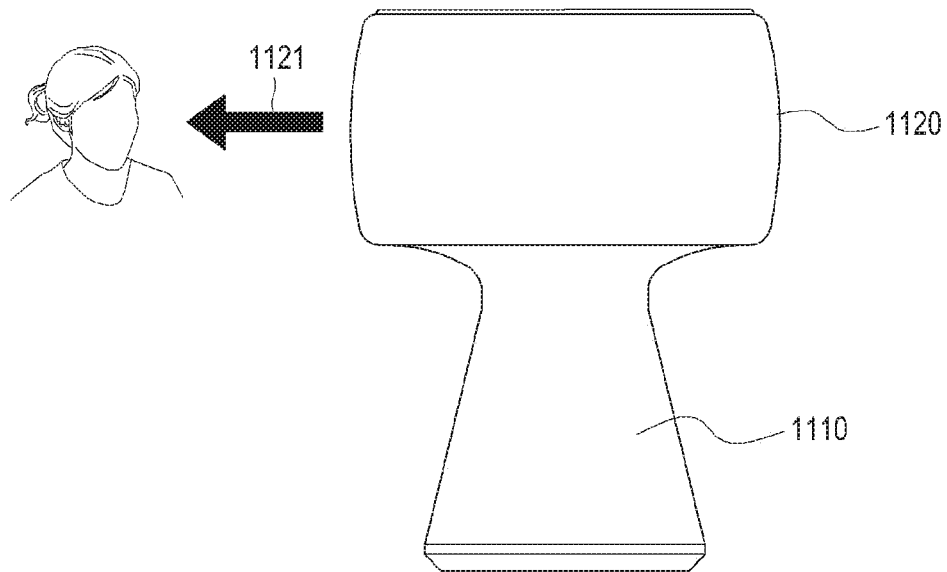
FIGS. 11A and 11B are views illustrating examples of movements of a display of an electronic device according to various embodiments of the present disclosure.
Figure 11B:
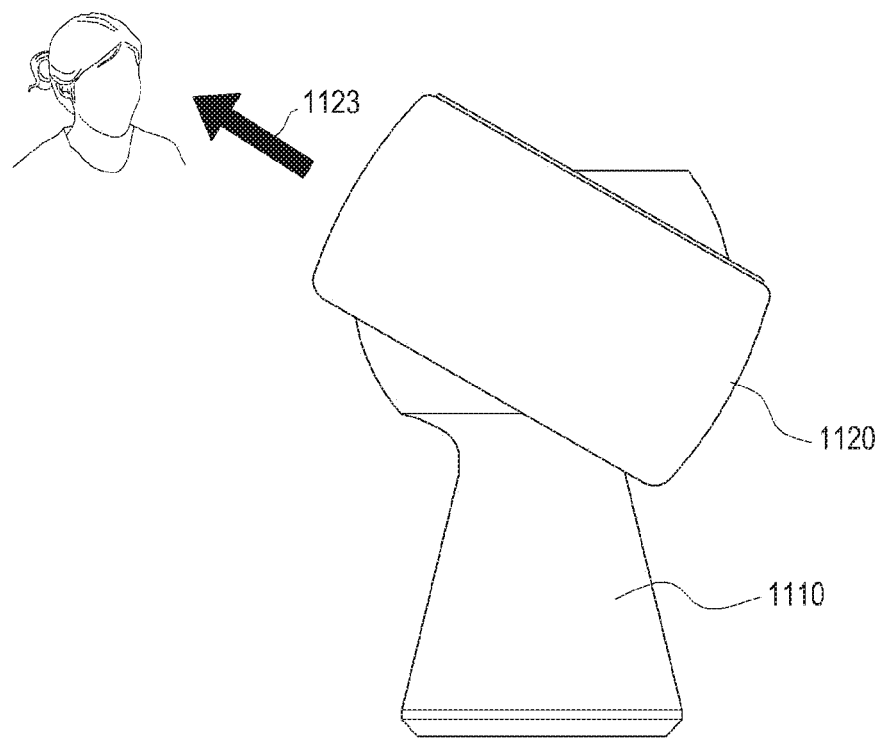

FIGS. 11A and 11B are views illustrating examples of movements of a display of an electronic device according to an embodiment of the present disclosure.

As in steps 903 and 905 of FIG. 9, the electronic device may identify an external object (e.g., a user) through at least one sensor. For example, referring to FIG. 11A, the electronic device may sense a voice from a user 1101 which is the external object, identify the position where the sensed voice has been entered, and move the display 1120 coupled with the rotating member by the driving members in a first direction (e.g., leftwards or rightwards) 1121 of the identified position with respect to a vertical axis (e.g., A1 of FIG. 2A) of the rotation supporting member 1110. Referring to FIG. 11B, the electronic device may recognize the user positioned in the first direction and move the rotating member towards the user's face (e.g., a second direction which is an upper or lower direction 1123) with respect to a horizontal axis (e.g., A2 of FIG. 2A) of the rotation supporting member 1110 so as to recognize the user's face. At this time, the electronic device may analyze a captured image of the user's face and determine whether the analyzed image corresponds to the user's registration information previously registered, thereby identifying the user. Further, the electronic device may adjust the direction of the rotation supporting member 1110 so that the display 1120 keeps facing the user's face.

Although an example of determining the user's first direction through a voice has been described above in connection with FIG. 11A, the first direction may alternatively be determined in other various ways capable of tracing a direction using, e.g., a user-sensible vision, UWB, heat sensor, or other sensors capable of identifying a human body.

According to an embodiment of the present disclosure as set forth above in connection with FIGS. 11A and 11B, the electronic device may move the display coupled with the rotation supporting member in the direction along which an external object is positioned by the driving members.

Figure 12:
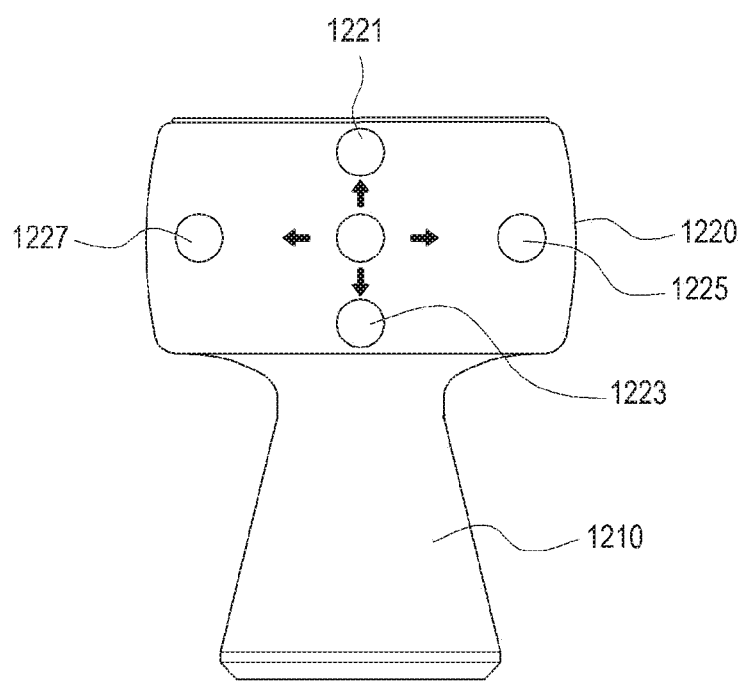
FIG. 12 is a view illustrating an example of a movement of an object displayed on a display of an electronic device according to an embodiment of the present disclosure.

FIG. 12 is a view illustrating an example of a movement of an object displayed on a display of an electronic device according to an embodiment of the present disclosure.

Referring to FIG. 12, if the electronic device includes no driving members for moving the display according to an embodiment of the present disclosure, the electronic device (which is the same or similar to the electronic device 101 of FIG. 1, the electronic device 200 of FIGS. 2A to 2F, or the electronic device 700 of FIG. 7) may move an object (e.g., an interaction object) displayed on a central area of the display 1220, which is omni-directionally provided, in a direction where a user is recognized (e.g., an upper direction 1221, a lower direction 1223, a left direction 1227, or a right direction 1225) and display the object so that the user may intuitively recognize that an interaction is currently ready. The display 1220 as shown in FIG. 12 may be configured so that a display panel circularly surrounds and couples to the surface of an upper part of, e.g. the supporting member 1210. Accordingly, the electronic device may identify the position of a user, move an object related to the user to the identified position, and display the object. Further, the electronic device may continue to trace the user's position as the user moves and change and display objects on the display 1220 in the direction where the user is positioned. The objects which are changed as the user moves may be ones related to the user and may be all or some of the objects displayed on the display 1220. According to an embodiment of the present disclosure, if objects related to a plurality of users are displayed on the display 1220, the electronic device may move the related objects to the respective identified positions of the users and display the objects. According to an embodiment of the present disclosure, if the electronic device recognizes a plurality of users in the same direction, the electronic device may sequentially provide information for each user or may split the screen area of the display panel in the same direction and provide per-user information. If the electronic device intends to perform multi-tasking interaction with an identified user, the electronic device may provide information about a plurality of functions executed in relation to the identified user. In such case, the electronic device may move an object of information about a first function among the information about the plurality of functions in a direction corresponding to the position of the identified user and display the object, and the electronic device may output information about a second function through an audio module. Here, the information about the second function may not move but remain displayed at its first position of display on the display screen area, and after a predetermined time or at the user's request, the information about the second function may be moved and displayed in a direction corresponding to the position of the identified user.

Figure 13:
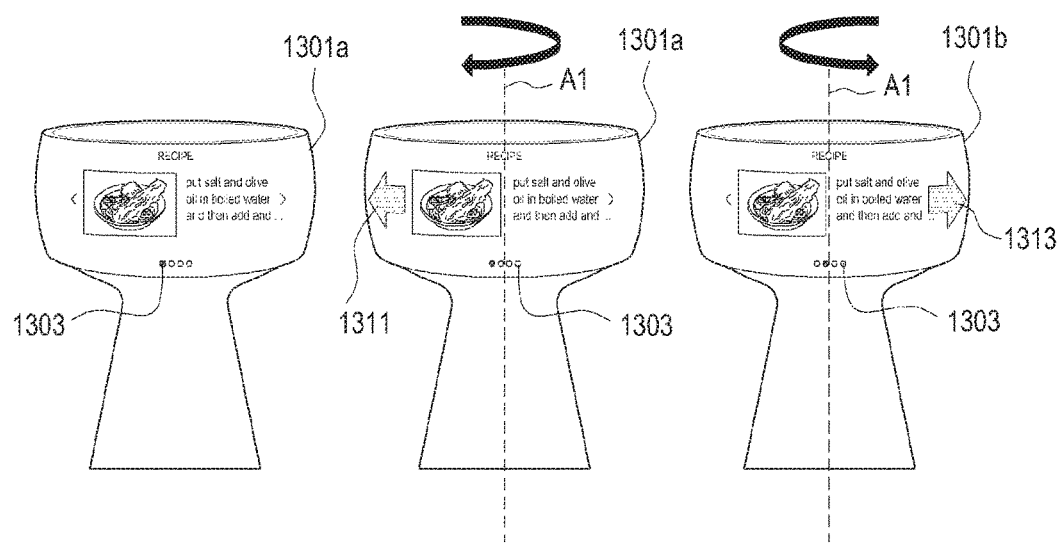
FIG. 13 is a view illustrating an example of a movement of a display of an electronic device according to an embodiment of the present disclosure.

FIG. 13 is a view illustrating an example of a movement of a display of an electronic device according to an embodiment of the present disclosure.

Referring to FIG. 13, according to an embodiment of the present disclosure, the electronic device (the electronic device 101 of FIG. 1, the electronic device 200 of FIGS. 2A to 2F, or the electronic device 700 of FIG. 7), upon providing information related to an identified external object (e.g., a user), may configure objects for the provided information in a plurality of pages 1301a and 1301b and display the configured pages 1301a and 1301b to present such an effect as if they may be flipped, as in step 907 of FIG. 9. The electronic device may display an object for a first page 1301a displayed on the display. When rotating the display clockwise on the vertical axis A1 by interaction with the identified external object, the electronic device may display, e.g., an object 1311 indicating a movement to the left and, e.g., objects contained in a second page 1301b that is a next page. When rotating the display counterclockwise on the vertical axis A1, the electronic device may display an object 1313 indicating that the second page 1301b is moved to the right with respect to the vertical axis. Further, the electronic device may receive a request for providing information from the user or under a predefined condition, and upon determining that information to be provided is constituted of a plurality of pages, the electronic device may display information 1303 about the pages to be displayed.

The electronic device may display, e.g., a recipe on the display at the user's request. For example, such recipe may contain a plenty of information that may not be shown in a single page. Thus, the information may be displayed in chronological order. Accordingly, the electronic device, upon providing such information at the user's request, may configure and provide a plurality of sequential pages.

If turning pages, the electronic device may intuitively provide the user with a relative before-after relationship between a first page, which is the current page, and a second page, which comes next to the first page. Further, the electronic device may display a disappearance of the current display screen in the direction that the display moves—e.g., a left direction. Thereafter, the electronic device may return the display to the first position by the driving members and give such an effect as if the second page, the next page, slides in from the right-hand screen while displaying the objects in the second page.

If needing to turn pages, the electronic device may determine whether to control the driving members that drives the rotating member to move the display to the left or right depending on a relationship between the current page and its next page and may control the driving members while turning pages displayed. If the display is determined to move to the left, the electronic device may simultaneously perform an operation (command) for controlling the movement of the display and a disappearance of the page currently displayed in the determined direction.

Figure 14A:
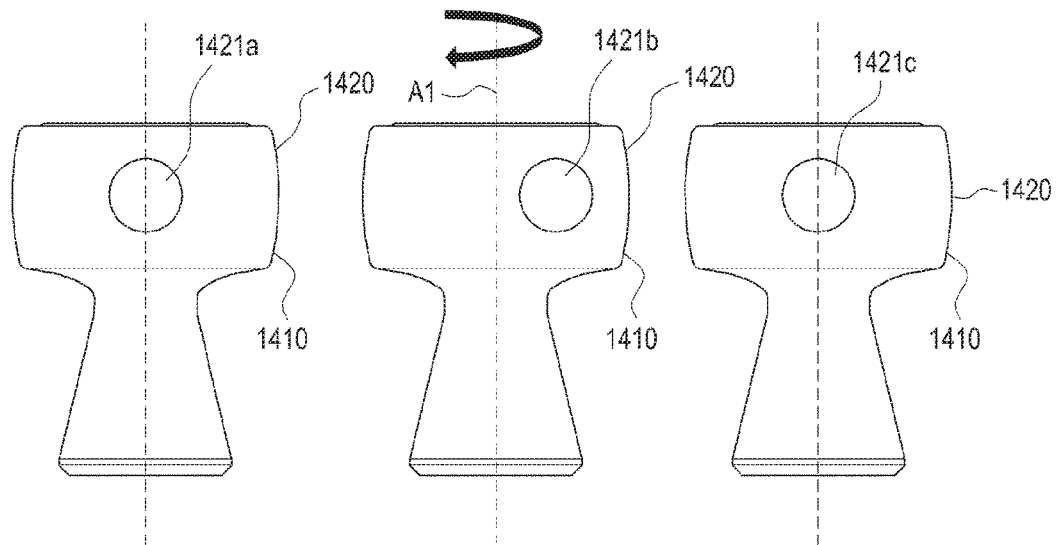
FIGS. 14A and 14B are views illustrating examples of movements of a display of an electronic device according to various embodiments of the present disclosure.
Figure 14B:
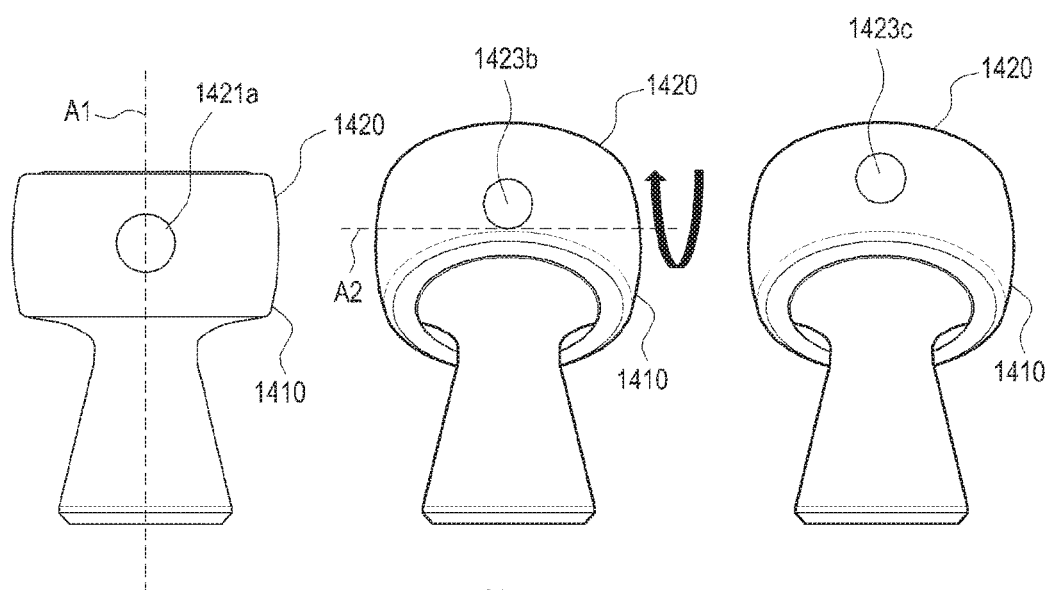
Figure 15A:
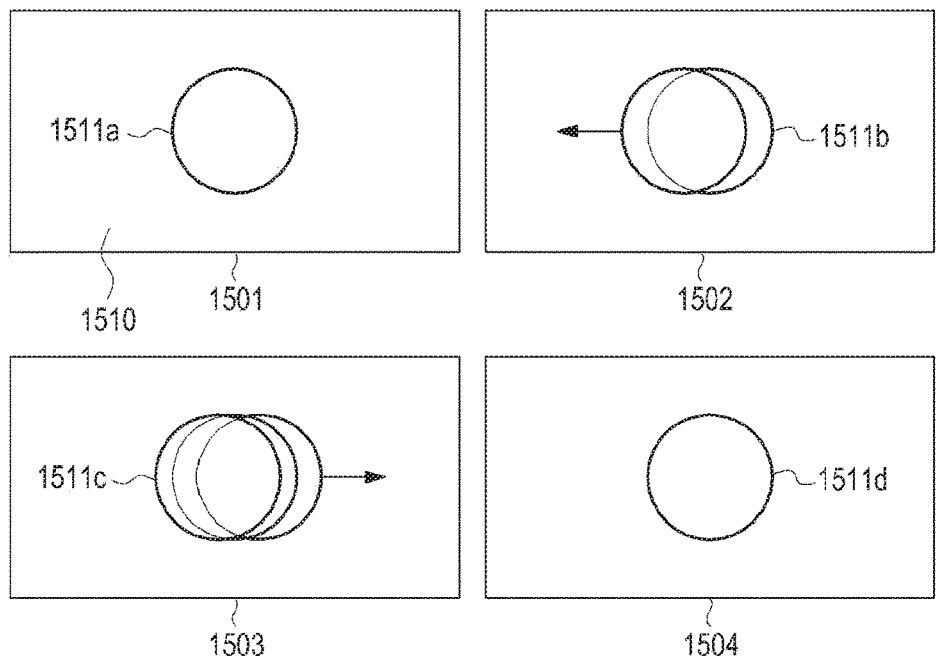
FIGS. 15A and 15B are views illustrating examples of movements of a display of an electronic device according to various embodiments of the present disclosure.
Figure 15B:
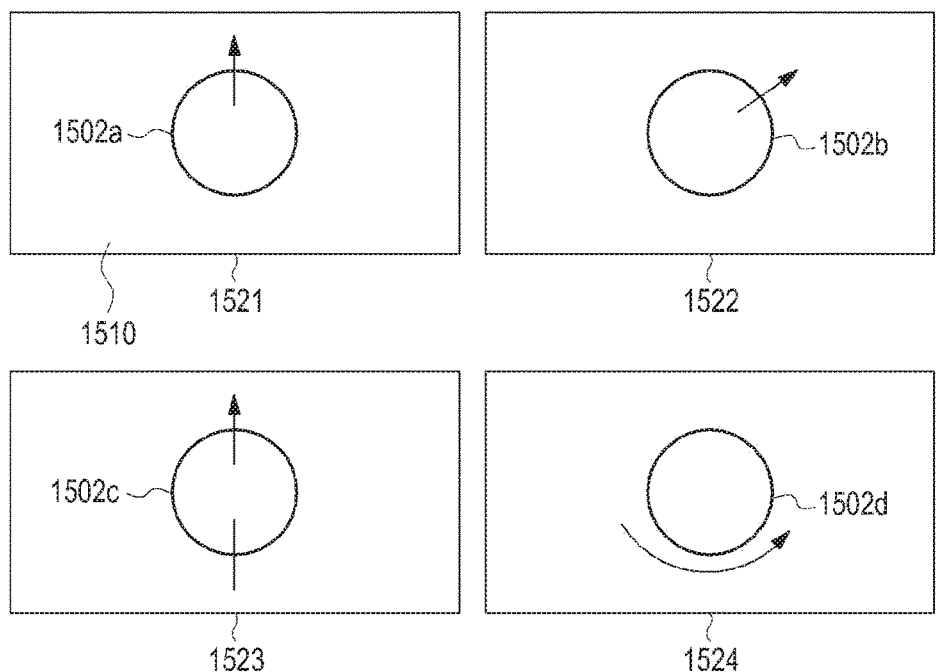

FIGS. 14A and 14B are views illustrating an example of a movement of a display of an electronic device according to an embodiment of the present disclosure. FIGS. 15A and 15B are views illustrating an example of a movement of a display of an electronic device according to an embodiment of the present disclosure.

Referring to FIG. 14A, if rotating the rotating member 1410 clockwise or counterclockwise on the vertical axis A1 to move the display 1420, the electronic device may control a first rotating module (a member inducing a movement to the left or right) of the rotating member 1410 according to a user input or sensing information. Upon moving the display 1420, e.g., to the left, with at least one or more objects 1421a displayed on the display 1420, the electronic device may perform control to reposition an object 1421b on the display 1420 in a right direction which is an opposite direction, corresponding to the direction of the movement of the display 1420, and to display the object. When the movement of the display 1420 is complete, the electronic device may change the position of display of the object to the area where the object 1421c used to be displayed on the display 1420 of the electronic device before the first movement. According to an embodiment of the present disclosure, if moving the display 1420 to the left, the electronic device may move the object in the direction of the movement, and if the control of the rotating member 1410 is complete, the electronic device may display the object at the position before the movement of the display 1420.

Referring to FIG. 14B, the electronic device may perform control to move clockwise or counterclockwise on the horizontal axis A2 and change the parameter where the object 1423b is displayed to control the change in the position of the object. According to an embodiment of the present disclosure, as the rotating member 1410 rotates clockwise or counterclockwise, the electronic device may move the object 1421a on the display 1420 to a lower area of the display which is positioned in an opposite direction of the direction of the movement of the object 1421a, and if the rotation of the rotating member 1410 is done, the electronic device may display the object 1423c back at the original position.

As illustrated in FIGS. 14A and 14B, the electronic device may display the object at positions changing in association with the movement of the display according to the rotation of the rotating member and may determine parameters for such change in position and display of the object. The electronic device as illustrated in FIGS. 14A and 14B may control the rotation of the rotating member (e.g., the rotating member 230 of FIGS. 2A to 2F) to move the display 1510 coupled to the rotating member as illustrated in FIGS. 15A and 15B, and the electronic device may determine parameters for the display of the object in association with the movement of the display 1510. The electronic device may control the display of at least one object that is displayed on the display 1510 based on the determined parameters. When the movement of the display is done, the electronic device may perform control to move the object back to the original position and display the object according to the determined parameters.

Referring to FIG. 15A, in step 1511, the electronic device may display an object 1511a on the display 1510 in an idle state where the electronic device takes no other actions. Here, as the parameters for displaying the object 1511a, e.g., the position of the rotating member (body_location), the movement speed, and the position of display of object (UI_location), respectively, may be determined to be n, 0, and coordinates n,n.

In step 1512, if there is a call from an external object (e.g., a user) in the idle state, the electronic device may rotate the rotating member to move the display 1510 in a direction of the rotation (e.g., to the right). Accordingly, the electronic device may determine the parameters to move the object 1511a in an opposite direction (e.g., to the left) of the direction of the call in the idle state, and the electronic device may display a moved object 1511b on the display 1510 according to the determined parameters. Here, as the parameters for displaying the object 1511b, e.g., the position of the rotating member (body_location), the movement speed, and the position of display of object (UI_location), respectively, may be determined to be +n, 1, and coordinates −n,n.

In step 1513, the electronic device may perform an operation for recognizing a user according to the user's call, and upon recognizing the user, the electronic device may perform control to stop rotating the rotating member, ceasing the movement of the display 1510. Accordingly, the electronic device may determine the parameters to move the object 1511b, which has been moved in the opposite direction of the direction of the rotation and displayed on the display 1510 which now stops moving, in the direction of the rotation (e.g., to the right), and the electronic device may display a moved object 1511c on the display 1510 according to the determined parameters. Here, as the parameters for displaying the object 1511c, e.g., the position of the rotating member (body_location), the movement speed, and the position of display of object (UI_location), respectively, may be determined to be 0, 0, and coordinates +n, n.

In step 1504, the electronic device may determine the parameters to return the object 1511c, which used to be displayed at the right side as the display 1510 stops moving, back to the original position and display the object, and the electronic device may display an object 1511d at the original position of the display 1510 according to the determined parameters. Here, as the parameters for displaying the object 1511d, e.g., the position of the rotating member (body_location), the movement speed, and the position of display of object (UL_location), respectively, may be determined to be 0, 0, and coordinates n, n.

As set forth supra, the operations as shown in FIG. 15A may be continuous operations.

Referring to FIG. 15B, in step 1521, the electronic device (e.g., the electronic device 400 of FIG. 5A) may move the display 1510 upwards as the rotating member rotates, e.g., up with respect to the horizontal axis A2 as viewed at front view. Accordingly, the electronic device may determine the parameters to move an object 1502a upwards and display the object 1502a on the display 1510. Here, as the parameters for displaying the object 1502a, e.g., the position of the rotating member (body_location), the movement speed, and the position of display of object (UL_location), respectively, may be determined to be n, n, and coordinates n, +n.

In step 1522, the electronic device (e.g., the electronic device 400 of FIGS. 4A and 4B) may move the display 1510 in a diagonal direction as the rotating member rotates, e.g., up or down with respect to the horizontal axis A2 as viewed at side view. Accordingly, the electronic device may determine the parameters to move an object 1502b in the diagonal direction and display the object 1502b on the display 1510. Here, as the parameters for displaying the object 1502b, e.g., the position of the rotating member (body_location), the movement speed, and the position of display of object (UL_location), respectively, may be determined to be n, n, and coordinates on a diagonal line (e.g., (+n, +n), (+n, −n), (−n, +n) or (−n, −n)).

In step 1523, if the rotating member rotates (e.g., upwards with respect to the horizontal axis A2 at front view) and then stops rotating, the electronic device (e.g., the electronic device 400 of FIGS. 5A and 5B) may determine the parameters so that, as the display 1510 stops moving, an object 1502c is displayed back at the original position on the display 1510 while the object repeatedly moves up and down. Here, among the parameters for displaying the object 1502c, e.g., the position of the rotating member (body_location), the movement speed, and the position of display of object (UL_location), respectively, may be determined to be 0, 0, and coordinates (e.g., 0, +n or 0, −n).

In step 1524, if the rotating member rotates (e.g., up/down with respect to the horizontal axis A2 at side view) and then stops rotating, the electronic device (e.g., the electronic device 400 of FIGS. 4A and 4B) may determine the parameters so that, as the display 1510 stops moving, an object 1502d is moved back to the original position and displayed on the display 1510. For example, in step 1524, the electronic device may determine the parameters so that the object 1502d moves back to the original position while rotating (to present such a 3D effect as if the object 1502d spins). If the object 1502d moves, e.g., to the left, and stops on the display 1510, the object 1502d may be displayed on the display 1510 as if the object 1502d stops moving after a predetermined time of 3D rotation by rotational inertia. Here, as the parameters for displaying the object 1502d, e.g., the position of the rotating member (body_location), the rotational speed of the rotating member, and the position of display of object (UL_location), respectively, may be determined to be 0, 0, and coordinates (e.g., +n, +n or −n, −n).

The operations of the electronic device described above in connection with FIG. 14A, 14B, 15A, or 15B may apply to the operational procedure shown in FIG. 9 described above and FIG. 17, 19, 24, 27, 31, or 33 described below in detail.

FIGS. 16A to 16D are views illustrating examples of display screens of an electronic device according to an embodiment of the present disclosure.

Figure 16A:
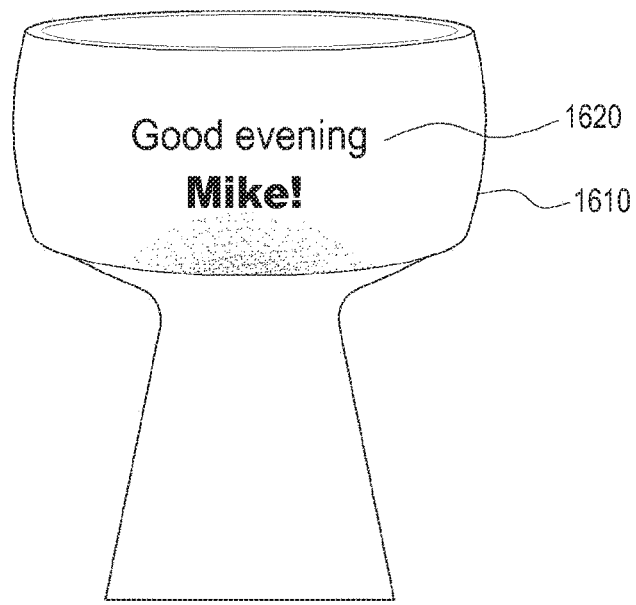
FIGS. 16A, 16B, 16C, and 16D are views illustrating examples of display screens of an electronic device according to various embodiments of the present disclosure.

Referring to FIG. 16A, the electronic device may recognize an external object (e.g., a user) as per the operational procedure described above in connection with FIG. 9, determine a greeting suitable for the recognized user, and display the determined greeting in a display object or output in a voice. For example, there may be at least one external object around the electronic device. In this case, the electronic device may choose a direction of movement for interaction through at least one sensor and control the driving members in the direction to drive the rotating member, thereby moving the display coupled with the rotating member. Accordingly, the electronic device may identify the user in the direction of movement, select an interaction means related to the identified user, and provide, through the selected interaction means, information according to the interaction with the identified external object. For example, as shown in FIG. 16, if the display 1610 moves in the direction corresponding to the position of the identified user after switching from the standby state to an active state for interaction, the electronic device may display information suitable for the identified user (Mike), e.g., "Good evening, Mike!" (1620) on the display screen facing the user.

Figure 16B:
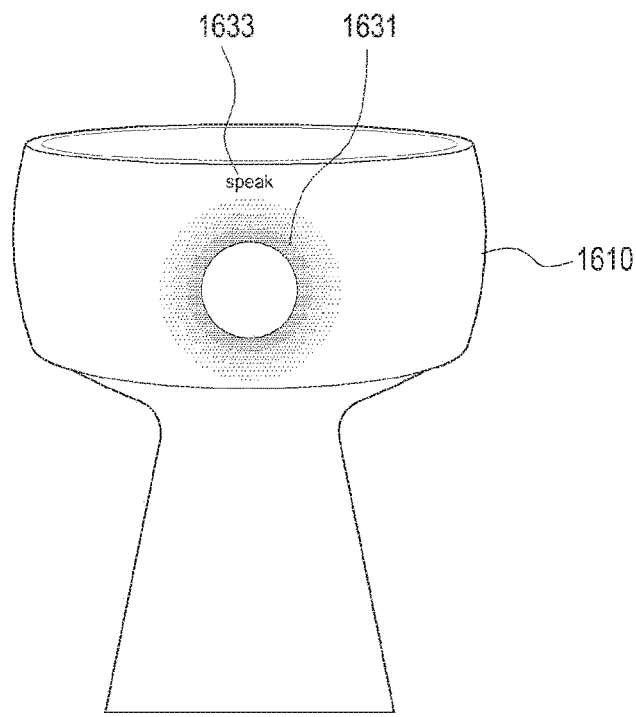

Referring to FIG. 16B, if there is no interaction with the identified external object, the electronic device may display a standby screen 1631 on the display 1610. Here, the electronic device may run an application for recognizing, e.g., sound, and display, on the display 1610, an object 1633 (e.g., "Please say something") indicating that it is ready to recognize sound. The electronic device may also display, on the display 1610, an object 1731 that changes as per particular conditions using at least one of environment information, sensing information, time information, or user configuration information.

Figure 16C:
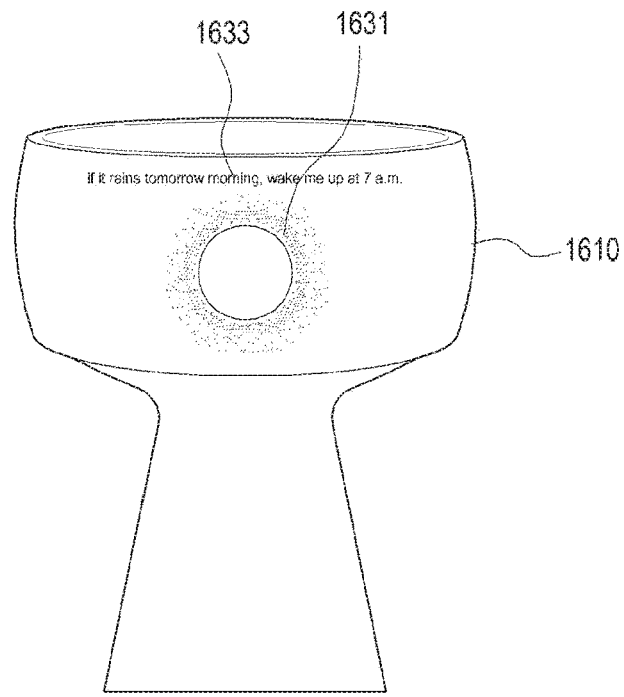
Figure 16D:
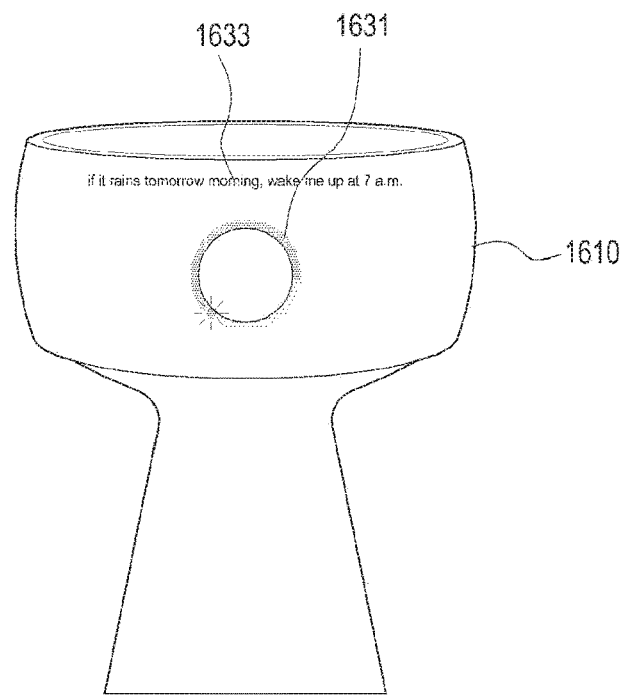

Referring to FIGS. 16C and 16D, upon receiving a sound from the external object (e.g., the user), the electronic device may control the driving of the rotating member so that the main area of the display 1610 moving in association with the movement of the rotating member faces in the direction where the sound has been received.

After moving the display 1610, the electronic device may display an object 1631 indicating that it is receiving the user's voice input. If the user makes a voice input, the electronic device may immediately display, on the display 1610, an object 1633 obtained by recognizing the user's voice input. As time elapses, the electronic device may change the object being displayed and display a changed object 1631. Upon determining that the voice input is complete, the electronic device may inform the user of the completion of the voice input.

Figure 17:
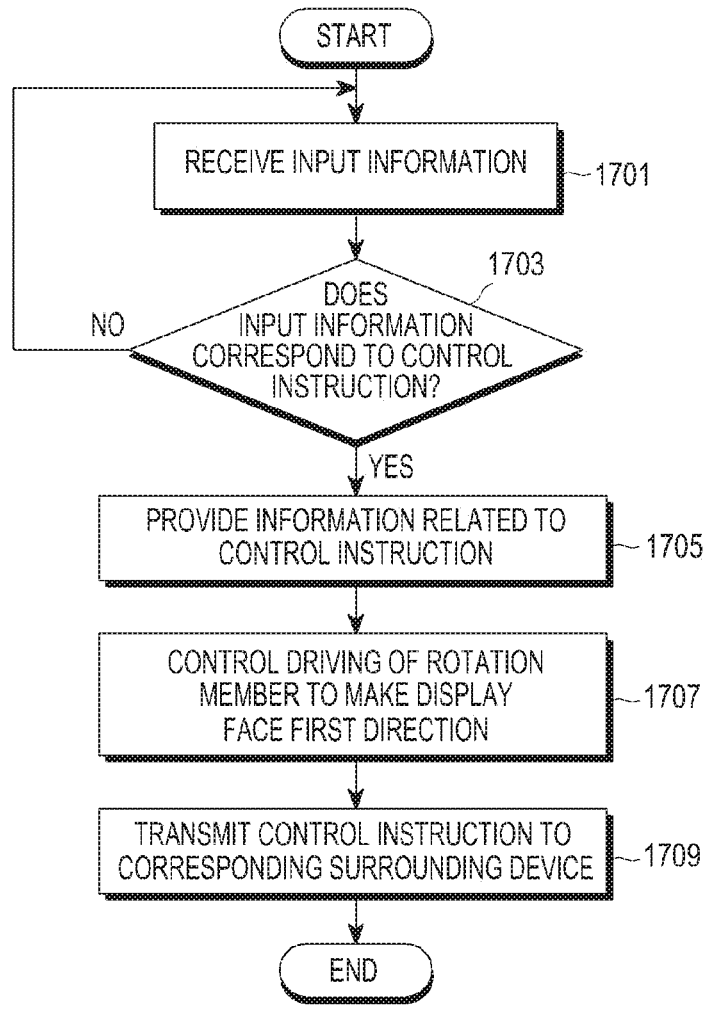
FIG. 17 is a flowchart of a method of an electronic device according to an embodiment of the present disclosure.
Figure 18:
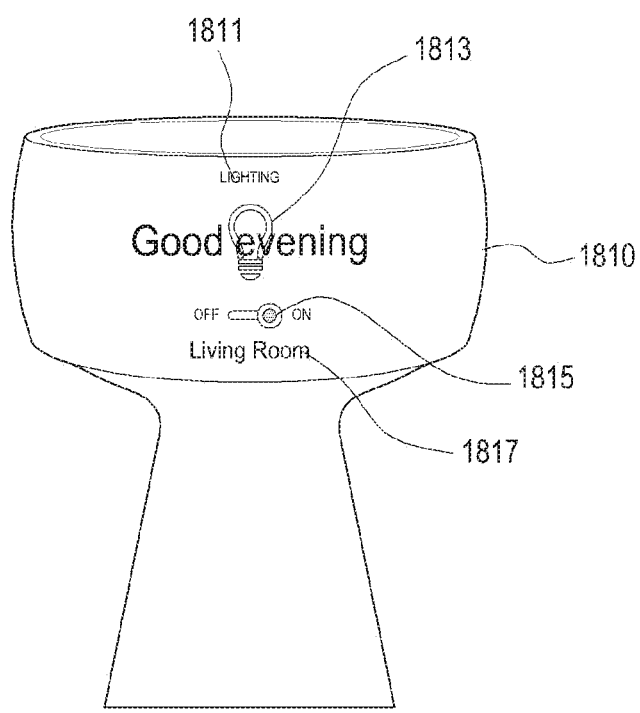
FIG. 18 is a view illustrating an example of a display screen of an electronic device according to an embodiment of the present disclosure.

FIG. 17 is a flowchart of a method of an electronic device according to an embodiment of the present disclosure. FIG. 18 is a view illustrating an example of a display screen of an electronic device according to an embodiment of the present disclosure.

Referring to FIG. 17, the electronic device (e.g., the electronic device 101 of FIG. 1 or the electronic device 200 of FIG. 2) may receive input information for initiating an interaction and analyze the received input information in step 1701. Here, the input information may include voice information of the external object (e.g., a user), information entered from the external object through a button or touchpad, information sensed for a certain movement of the external object, and information received through an external network.

In step 1703, the electronic device may determine whether the analyzed input information is a control command for controlling a peripheral device (e.g., a peripheral home device). If the input information is determined to be a control command, the electronic device may perform step 1705. Unless the input information is determined to be a command for controlling a peripheral device, the electronic device may wait to receive input information or select an interaction means as per the result of analysis and conduct an operation as per the selected interaction means in step 1701.

In step 1705, the electronic device may activate an interaction means (e.g., a home network application or function for controlling the peripheral device) to control the peripheral device and provide information related to the control command. For example, the electronic device may display an object for a control command (e.g., "lighting") to control the peripheral device on the display or may output audio information through the audio module.

Referring to FIG. 18, the electronic device may display an object 1811 (e.g., a voice command, "lighting," to turn off living room lights) indicating the control command on the display 1810, extract an object related to the control command, and display the extracted object, e.g., a bulb image 1813, a current state 1815 of the peripheral device, or the position 1817 (e.g., a living room) of the peripheral device.

According to an embodiment of the present disclosure, in step 1707 in FIG. 17, the electronic device may identify the position where the control command has been inputted and may move the display towards the identified position (e.g., the first direction). Further, the electronic device may identify the external object (e.g., a user) having entered the input information and relocate the display towards the position of the identified external object, e.g., in the direction (e.g., a second direction) where it faces the user's face. The electronic device may identify the external object using at least one of the user's facial recognition, fingerprint recognition, iris recognition, authentication information (e.g., a password), authentication, or voice recognition.

If the display of the electronic device is stationary, and the display panel is formed to surround the circular supporting member, the electronic device, in step 1707, may move at least one object, which is omni-directionally displayed, to the display area which is positioned towards the identified external object and display the object.

In step 1709, the electronic device may transmit a control signal containing the command for controlling the peripheral device to the peripheral device through a network (e.g., home network communication or short-range wireless communication).

Referring to FIG. 18, as per the above-described operational procedure, the electronic device, e.g., upon determining that the user's voice input is an input for turning off living room lights, may display an object 1811 for the user's control command, an object 1813 representing a bulb image, and an object 1817 indicating the place (e.g., the living room) related to the control command. Further, the electronic device may display an object 1815 indicating whether the peripheral device, the target for control, lights on or off. Thereafter, the electronic device may identify the current state of the peripheral device by receiving a response signal from the peripheral device to which the control signal has been sent or using information sensed through at least one sensor (e.g., an illumination sensor) and display, on the display 1810, an object related to actual light control while providing information of a change in the identified information, i.e., the on-off state, to the off state (OFF).

Figure 19:
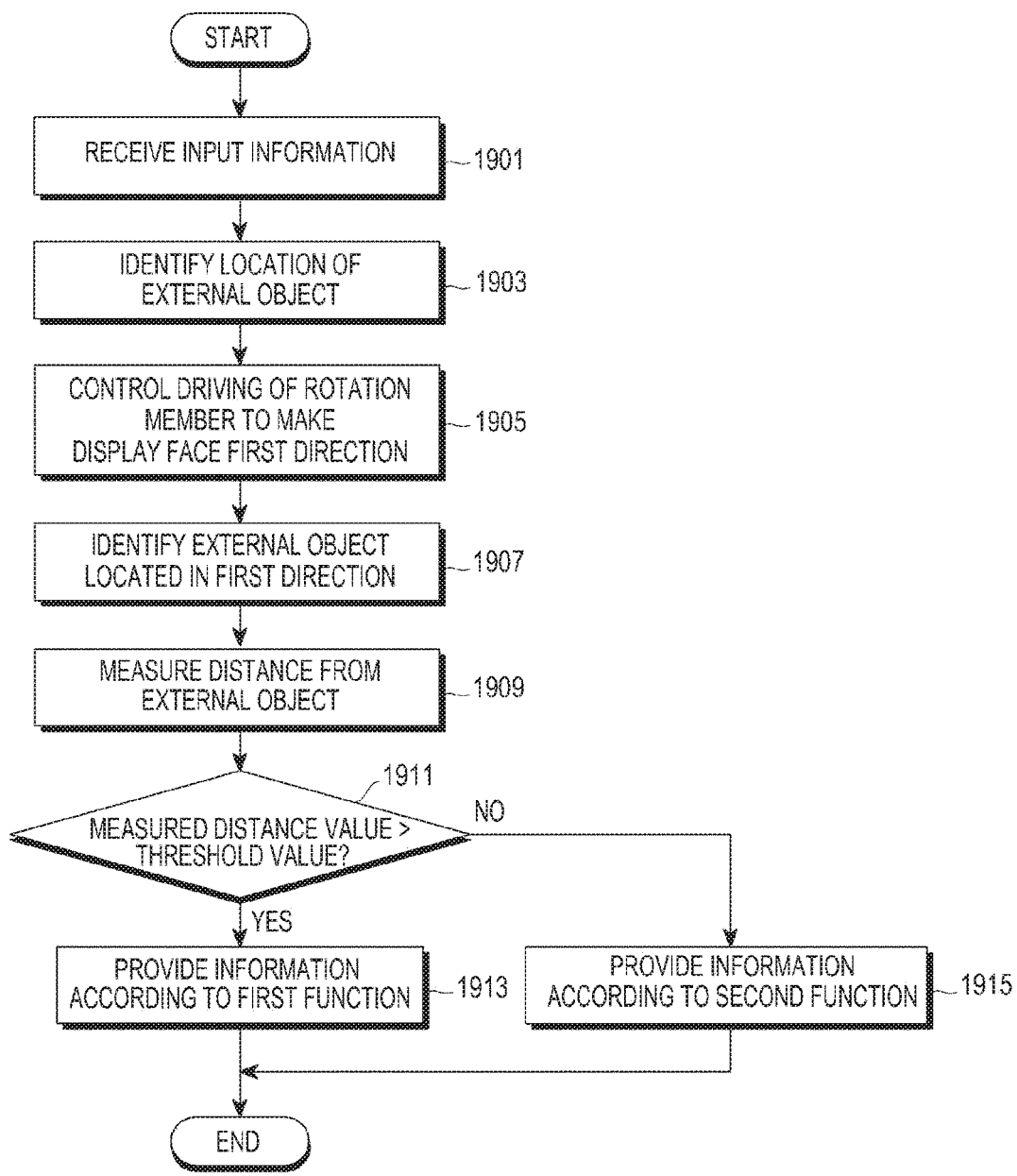
FIG. 19 is a flowchart of a method of an electronic device according to an embodiment of the present disclosure.
Figure 20A:
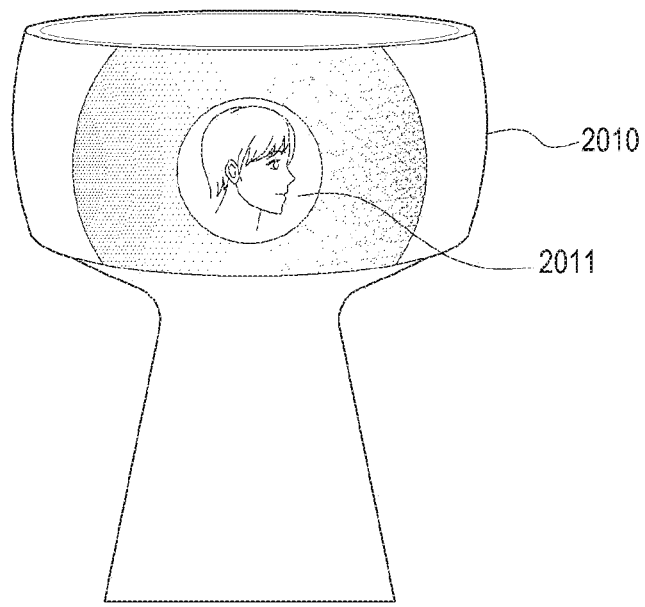
FIGS. 20A and 20B are views illustrating examples of display screens of an electronic device according to various embodiments of the present disclosure.
Figure 20B:
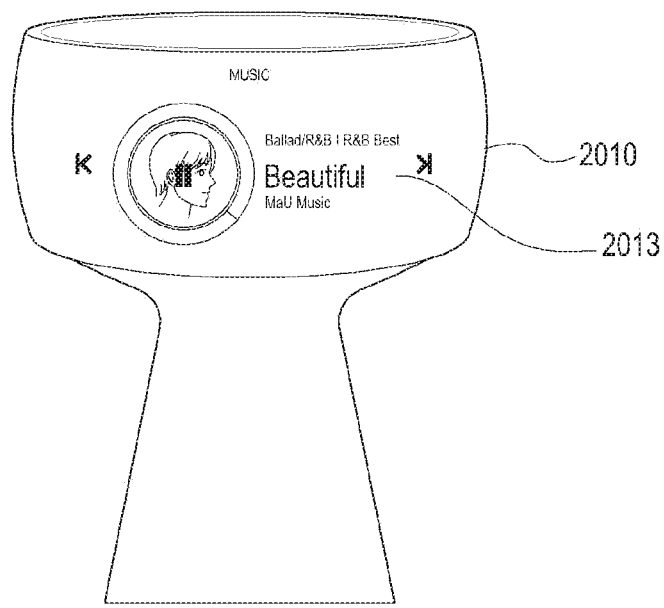

FIG. 19 is a flowchart of a method of an electronic device according to an embodiment of the present disclosure. FIGS. 20A and 20B are views illustrating an example of a display screen of an electronic device according to an embodiment of the present disclosure.

Referring to FIG. 19, the electronic device (e.g., the electronic device 101 of FIG. 1 or the electronic device 200 of FIG. 2) may receive input information for initiating an interaction and analyze the received input information in step 1901. Here, the input information may include voice information of the external object (e.g., a user or thing), information entered from the external object through a button or touchpad, information sensed for a certain movement of the external object, and information received through an external network.

Upon sensing the reception of input information in the standby state, the electronic device may switch into an active state and run an interaction means, e.g., a music playing application, according to the result of the analysis of the input information. The electronic device may display an object of an initial screen for the music playing application currently running on the display. Then, the display may provide the initial screen for the music playing application at the position first set up and may output, through the audio module, voice information according to the running of the music playing application.

In step 1903, the electronic device may identify the position of an external object that has entered the input information through an algorithm for tracing the position of the external object.

In step 1905, the electronic device may control the driving of the rotation supporting member coupled with the display to move the display in a direction (the first direction) corresponding to the identified position of the external object. According to an embodiment of the present disclosure, if the display of the electronic device is stationary, and the display panel is formed to surround the circular supporting member, the electronic device, in step 1903, may move at least one object, which is displayed at the position first set up, to the display area which is positioned towards the identified external object and display the object.

In step 1907, the electronic device may identify the external object (e.g., a user) having entered the input information. Then, the electronic device may move the display in the direction for interaction with the identified external object, e.g., in the direction (e.g., a second direction) that it faces the user's face. The electronic device may identify the external object using at least one of the user's face recognition, fingerprint recognition, iris recognition, authentication information (e.g., a password), authentication, or voice recognition.

In step 1909, the electronic device may measure the distance from the identified user.

In step 1911, the electronic device may determine whether the measured distance is greater than a preset threshold. If the measured distance is determined to be greater than the preset threshold, the electronic device may perform step 1913, and if the measured distance is equal to or less than the threshold, the electronic device may perform step 1915.

In step 1913, if the measured distance is larger than the preset threshold, the electronic device may provide a first function of the music playing application. As illustrated in FIG. 20A, the electronic device may determine that it is position far away from the identified external object and configure and provide an object for the first function on the display 2010 so that the object 2011 may intuitively be identified from far away. For example, an image-type object or audio information may be provided as the object 2011 displayed on the display 2010. If a character is displayed according to a function, the displayed character may be magnified and displayed. Here, if the electronic device is positioned at a preset distance or more from the user, the user may not enter a physical input. Thus, the first function may be a function activated only for an input through a gesture or voice. For example, the touchpad may be deactivated.

In step 1915, if the measured distance is less than or equal to the preset threshold, the electronic device may provide a second function of the music playing application. As shown in FIG. 20B, the electronic device may determine that the distance from the identified external object is small and provide an object 2013 for the second function to the display 2010. For example, the electronic device may display, on the display 2010, objects although the objects are ones that should be displayed in a smaller size. The electronic device may configure and display a screen containing an object that enables the user to directly control a physical command, not a voice command. Here, the second function may be a function enabling the user to make physical entry.

Figure 21:
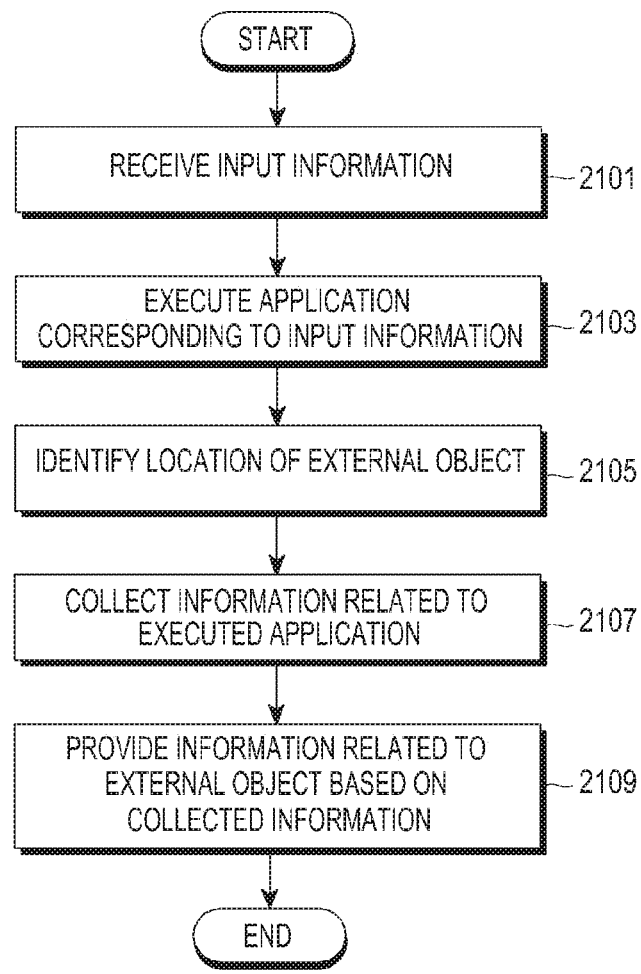
FIG. 21 is a flowchart of a method of an electronic device according to an embodiment of the present disclosure.

FIG. 21 is a flowchart of a method of an electronic device according to an embodiment of the present disclosure.

Referring to FIG. 21, the electronic device (e.g., the electronic device 101 of FIG. 1 or the electronic device 200 of FIG. 2) may receive input information for an interaction with a user and analyze the received input information in step 2101. Here, the input information may include voice information of the external object (e.g., a user), information entered from the external object through a button or touchpad, information sensed for a certain movement of the external object, and information received through an external network.

In step 2103, upon sensing the reception of input information in the standby state, the electronic device may switch into an active state and activate the interaction means according to the result of analysis of the input information. For example, the electronic device may run an application for providing recipe information as the interaction means. The electronic device may display an object of an initial screen for the application currently running on the display. At this time, the electronic device may output voice information as per the running application through the audio module.

In step 2105, the electronic device may identify the position of an external object that has entered the input information through an algorithm for tracing the position of the external object. The electronic device may control the driving of the rotation supporting member coupled with the display to move the display in a direction (e.g., a first direction) corresponding to the identified position of the external object. If the display of the electronic device is stationary, and the display panel is formed to surround the circular supporting member, the electronic device, in step 2105, may move at least one object, which is displayed at the position first set up, to the display area which is positioned towards the identified external object and display the object.

Further, the electronic device may identify the external object (e.g., a user) having entered the input information. Then, the electronic device may move the display in the direction for interaction with the identified external object, e.g., in the direction (e.g., second direction) that it faces the user's face. The electronic device may identify the external object using at least one of the user's face recognition, fingerprint recognition, iris recognition, authentication information (e.g., a password), authentication, or voice recognition.

In step 2107, the electronic device may gather information related to the running application. The electronic device may gather information (e.g., information related to food ingredients reserved in the Edge, a recipe, or cooking program) from peripheral devices that communicate over a home network.

In step 2109, the electronic device may provide appropriate information about the running application to the identified external object, i.e., the user, using the gathered information.

FIGS. 22A to 22D are views illustrating examples of display screens of an electronic device according to various embodiments of the present disclosure.

Figure 22A:
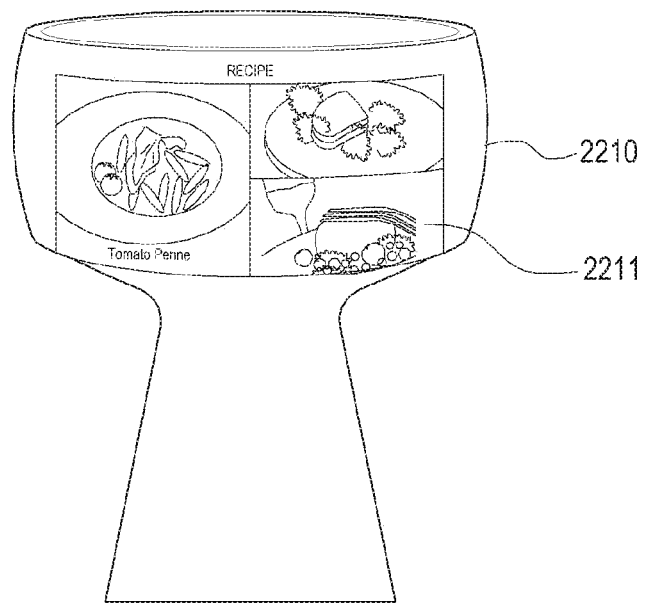
FIGS. 22A, 22B, 22C, and 22D are views illustrating examples of display screens of an electronic device according to various embodiments of the present disclosure.

Referring to FIG. 22A, the electronic device may run an interaction means as per input information received, e.g., an application for providing cooking information and display an object 2211 related to the running application on the display 2210.

Figure 22B:
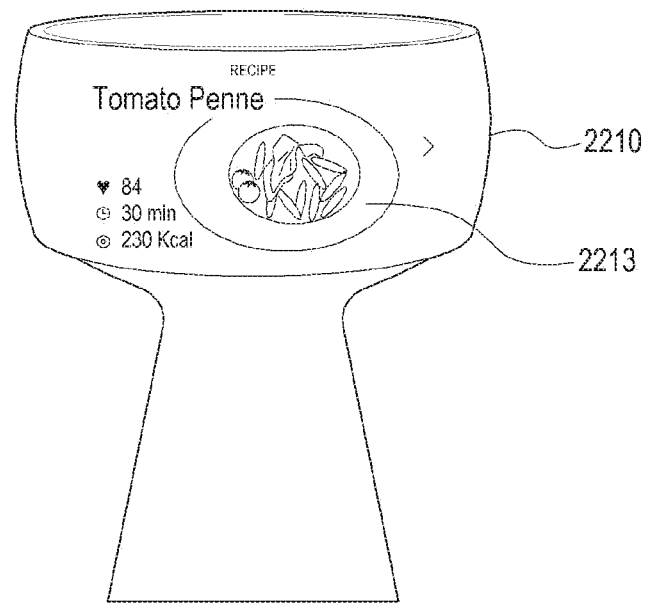

Referring to FIG. 22B, the electronic device may display, on the display 2210, an object 2213 related to the cooking information suitable for the identified user. For example, if the user chooses at least one from among foods provided on the screen of the running application, the electronic device may provide information related to the chosen food by exchanging information with a plurality of electronic devices in the house. According to an embodiment of the present disclosure, the electronic device may selectively provide cooking information suitable for the user by comprehensively utilizing user information present in the house and weather and food ingredients currently present in the house by exchanging information with a server or a plurality of electronic devices in the house.

If providing the cooking information, the electronic device may further provide additional information, such as a description and image of a corresponding food, time taken to cook the food, and calorie of the food. If displaying the time taken to cook the food, the electronic device may further determine the degree of skill of the user depending on who is the recognized user and provide a distinct cooking time to the user depending on the determined result. The electronic device may also provide different recipes depending on the user's health conditions by adding or removing necessary food ingredients depending on additional information, drug administration information, health information, or context information about the identified user.

Figure 22C:
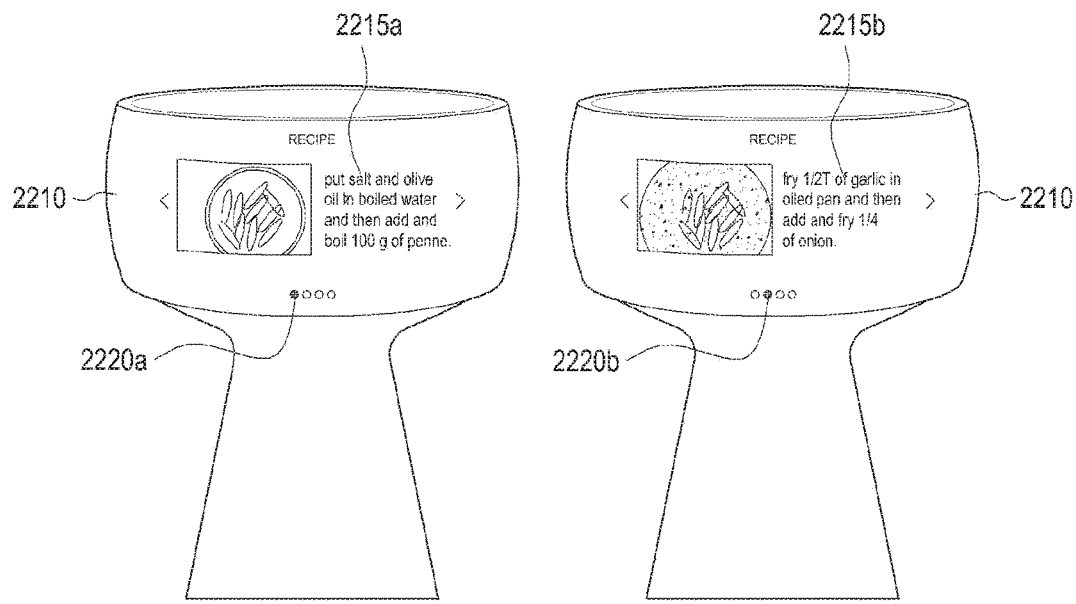
Figure 22D:
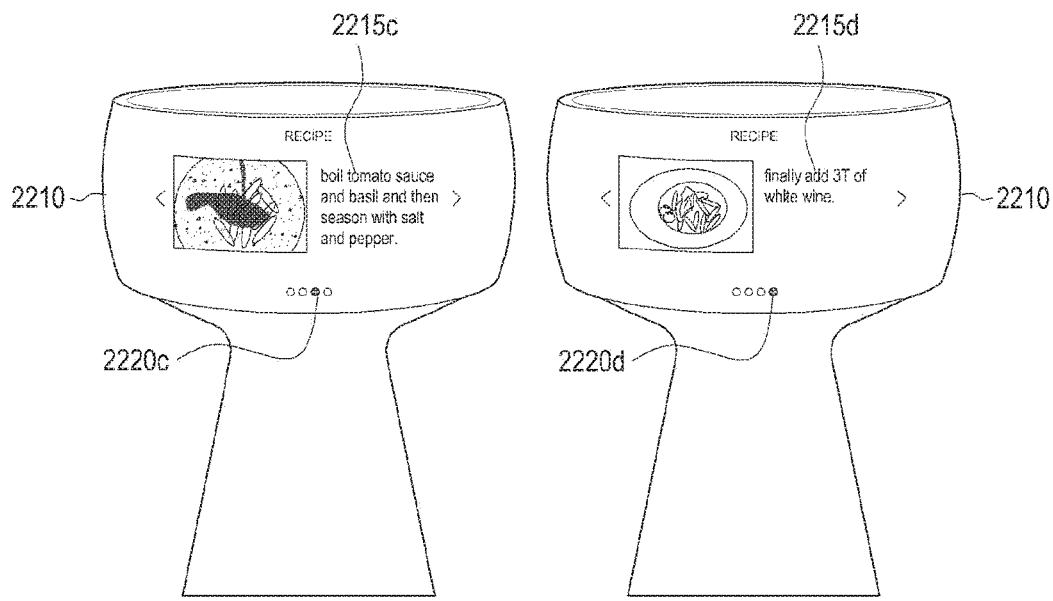

Referring to FIGS. 22C and 22D, according to an embodiment of the present disclosure, if providing a recipe that includes a plurality of pages 2215a, 2215b, 2215c, or 2215d containing at least one or more pieces of information, the electronic device may provide pages showing per-stage images of cooking and their appropriate recipe. Then, the electronic device may sequentially or non-sequentially display, on the display 2210, the plurality of pages according to the user's gesture or voice command or according to the time set per cooking step or entry of preset particular information on each page. Further, the electronic device may display, on the display 2210, an object 2220a, 2220b, 2220c, or 2220d indicating the page being currently shown.

The electronic device may output, in audio information, information related to the plurality of pages for the recipe. The electronic device may receive information obtained by capturing an external object (e.g., a user) through an image sensor and determine based on the received information whether the user operates as per the information provided from the page being currently displayed. Accordingly, upon determining that the user operates as per the information being currently provided, the electronic device may automatically turn pages and display the next page on the display 2210. If the electronic device sequentially or non-sequentially displays the plurality of pages 2215a, 2215b, 2215c, or 2215d containing at least one or more pieces of information, the user may, e.g., move while cooking as per the page being currently displayed. In this case, the electronic device may sense the user's move, and as per sensing the move, the electronic device may control the rotating member to rotate towards the user. Accordingly, if the display 2210 coupled with the rotating member moves, the electronic device may control the display of at least one piece of information (e.g., object) on the display 2210 in association with the movement of the display 2210. For example, as illustrated in FIGS. 15A and 15B, the electronic device may determine parameters for displaying the object and change the position of the displayed object and display the object based on the determined parameters, presenting such an effect as if the display moves after the user and the object moves in association with the movement of the display. Thus, the user may quickly identify cooking information on the display although taking no other actions to do so even under the circumstance where the user is on the move while cooking, as in the embodiments set forth above.

Figure 23A:
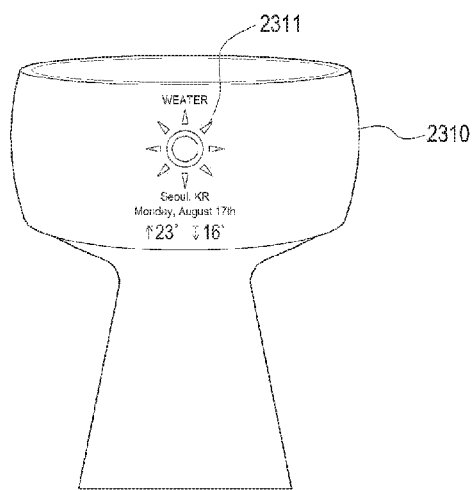
FIGS. 23A and 23B are views illustrating examples of display screens of an electronic device according to various embodiments of the present disclosure.
Figure 23B:
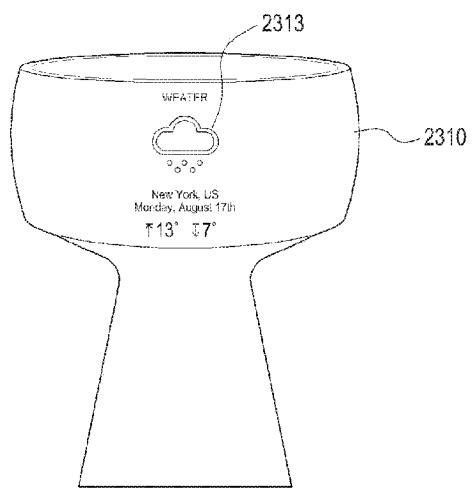

FIGS. 23A and 23B are views illustrating examples of display screens of an electronic device according to an embodiment of the present disclosure.

Referring to FIG. 23A, the electronic device may provide weather information 2311 and 2313 suitable for an identified external object (e.g., a user) based on the operational procedure of FIG. 21. According to an embodiment of the present disclosure, if the identified user enters input information, "weather," the electronic device may display an object 2311 for information about the weather in the user's current place or may output the same in audio information through the audio module.

Referring to FIG. 23B, as shown in FIG. 23A, after providing the weather information about the current place, the electronic device may display, on the display 2310, an object 2313 for weather information about other regions (e.g., New York) or output the same in audio information through the audio module according to a condition set by the user or information received through interaction with the user.

Figure 24:
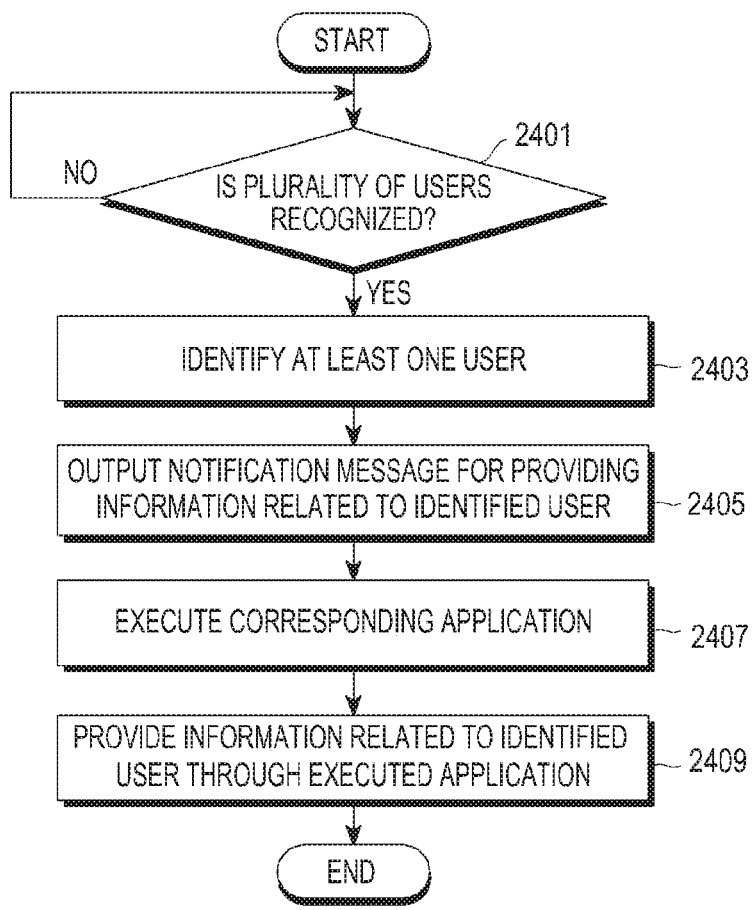
FIG. 24 is a flowchart of a method of an electronic device according to an embodiment of the present disclosure.

FIG. 24 is a flowchart of a method of an electronic device according to an embodiment of the present disclosure.

Referring to FIG. 24, the electronic device (the electronic device 101 of FIG. 1 or the electronic device 700 of FIG. 7) may determine whether a plurality of users are present in one space in step 2401. If the electronic device determines that there are a plurality of users, the electronic device may perform step 2403, and if not, the electronic device may re-perform step 2401 while remaining in the standby state.

In step 2403, if a plurality of users are positioned in the direction that the display currently faces, the electronic device may identify at least one users of the plurality of users. The user identifying operation may be the same or similar to that described above in connection with the embodiments. Upon sensing a plurality of users based on the received information, the electronic device may determine one who has an intention among the plurality of users and control the rotating member to rotate in the direction where the determined user is positioned.

In step 2405, the electronic device may display on the display, or output in audio information, a guide message for indicating to provide information related to the identified user.

In step 2407, the electronic device may choose and run, as an interaction means, an application previously set by the identified user or an application of interest that is obtained using gathered information.

In step 2409, the electronic device may provide information related to the identified user through a function of the application currently running.

Figure 25:
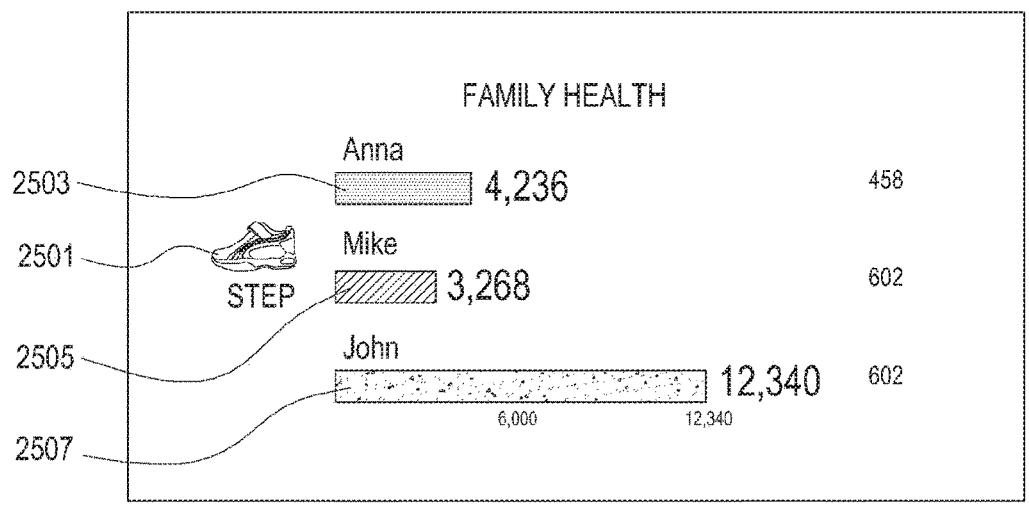
FIGS. 25 and 26 are views illustrating examples of display screens of an electronic device according to various embodiments of the present disclosure.
Figure 26:
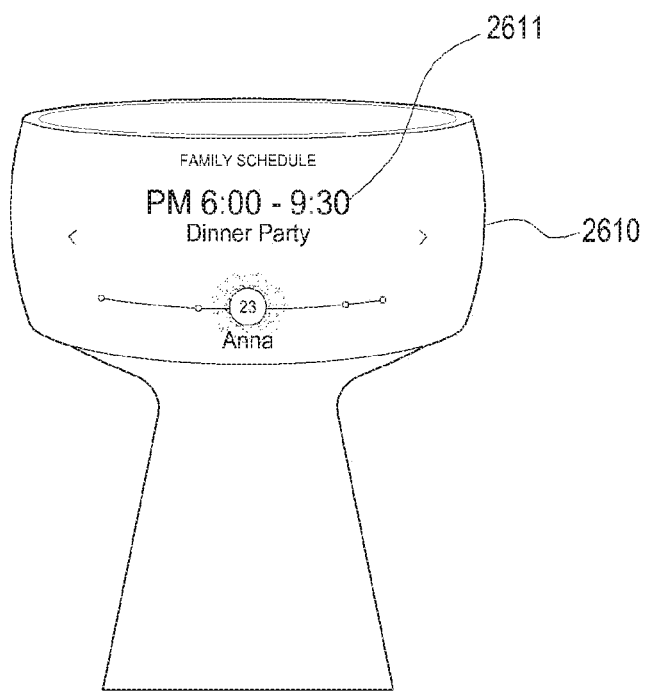

FIGS. 25 and 26 are views illustrating examples of display screens of an electronic device according to an embodiment of the present disclosure.

Based on the operational procedure of FIG. 24 described above, the electronic device may identify at least one of a plurality of users and provide information related to the identified user. Referring to FIG. 25, if the identified user (e.g., Mike) enters input information, e.g., "health," the electronic device may run a function 2501 (e.g., step) of the application corresponding to the input information. The electronic device may obtain family information related to the identified user (e.g., Mike) for the running function 2501 of the application and provide health information 2505 about the identified user (e.g., Mike) and family members (e.g., Anna and John) based on the obtained family information.

According to an embodiment of the present disclosure, upon identifying a plurality of users based on the operational procedure of FIG. 24 described above, the electronic device may sequentially or simultaneously provide weather information using the information of interest for each identified user. The electronic device may connect with the electronic devices of the plurality of users or gather information about the plurality of registered users from a server, and the electronic device may update, in real-time, information about the plurality of registered users using the gathered information. The electronic device may sequentially or non-sequentially provide the information related to the plurality of users. The electronic device may configure and display the information related to the plurality of users in a single screen, or the electronic device may configure and display the respective pages of the users. The electronic device may trace the position of each user who is on the move, move information related to a corresponding user to a display area facing the position, and display the information.

Based on the operational procedure of FIG. 24 described above, the electronic device may provide schedule information 2611 to the identified user as shown in FIG. 26. The electronic device may recognize another electronic device in connection or the user's voice, store schedule information about at least one or more users, and provide the information to a corresponding user. The electronic device may recognize a certain user (e.g., Anna) while in operation, identify whether there is a schedule supposed to be provided in connection with the recognized user (e.g., Anna), and if there is a schedule supposed to be provided, display the identified schedule information 2611 on the display 2610. The electronic device may also output the identified schedule information in audio information.

Figure 27:
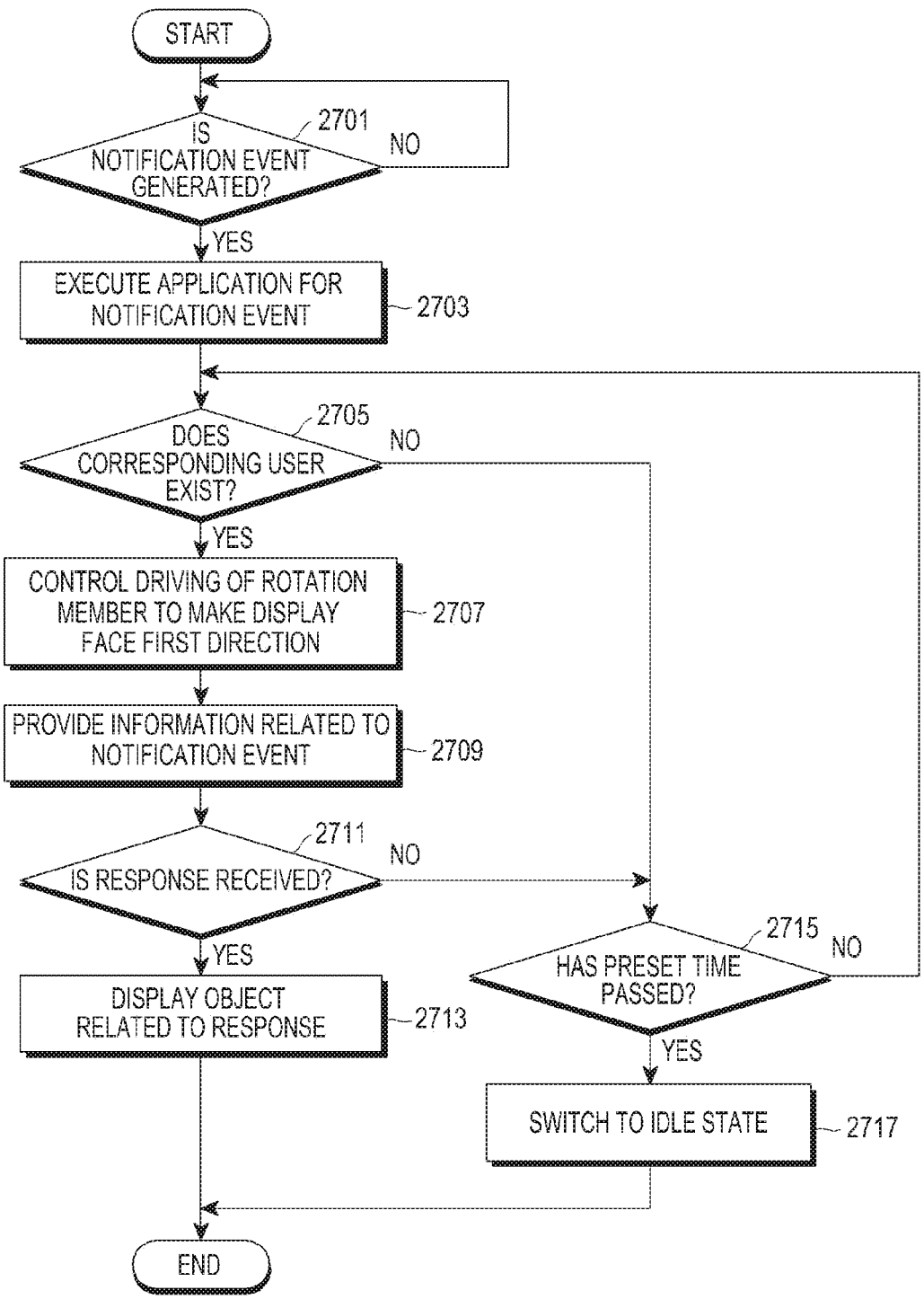
FIG. 27 is a flowchart of a method of an electronic device according to an embodiment of the present disclosure.
Figure 28:
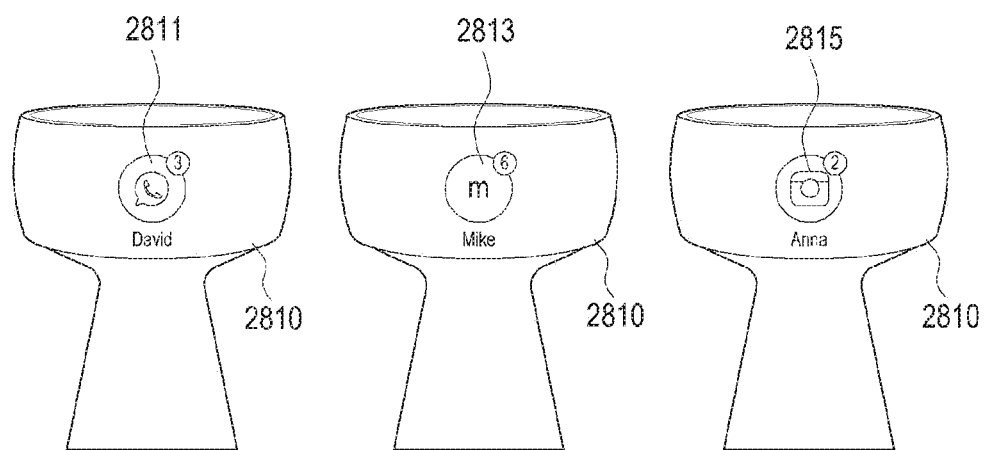
FIGS. 28, 29A, and 29B are views illustrating examples of display screens of an electronic device according to various embodiments of the present disclosure.

FIG. 27 is a flowchart of a method of an electronic device according to an embodiment of the present disclosure. FIG. 28 is a view illustrating an example of a display screen of an electronic device according to an embodiment of the present disclosure.

Referring to FIGS. 27 and 28, the electronic device (e.g., the electronic device 101 of FIG. 1 or the electronic device 200 of FIG. 2) may identify whether an event for which a notification needs to be provided occurs in step 2701. When such a notification event is identified to occur, the electronic device may perform step 2703. The electronic device may identify whether such an event occurs as receives a message in various communication schemes regardless of a request from an external object positioned in the house. For example, the received message may be a message received by a voice call, video call, messenger service, or short message service (SMS).

In step 2703, if a notification event arises in the standby state, the electronic device may run an application for the notification event that arises. The electronic device may display on the display, or output in audio information through the audio module, an object for indicating that the notification event occurs through the running application.

In step 2705, the electronic device may determine whether there is a user to whom the notification event generated is supposed to be provided. If no corresponding user is determined to be present, the electronic device may perform step 2715, and if there is any corresponding user, the electronic device may perform step 2707.

In step 2707, the electronic device may trace the position where the corresponding user is present and move the display in the first direction where the user is positioned. The electronic device may control the driving of the rotation supporting member coupled with the display to move the display in a direction (e.g., a first direction) corresponding to the identified position of the external object. To identify the user, the electronic device may relocate the display in the direction (e.g., a second direction) facing the user. The electronic device may identify the external object using at least one of the user's face recognition, fingerprint recognition, iris recognition, authentication information (e.g., a password), authentication, or voice recognition.

In step 2709, the electronic device may provide information related to the notification event. If the display of the electronic device is stationary, and the display panel is formed to surround the circular supporting member, the electronic device may move the information related to the notification event to the display area which is directed towards the identified external object and display the object. According to an embodiment of the present disclosure, the electronic device may display objects 2811, 2813, and 2815 on the display 2810 in such a form as to represent icons of an application for the notification event and additional information to the icons. The electronic device may provide user information (e.g., a name) related to the generated notification event, along with the displayed icon objects 2811, 2813, and 2815.

In step 2711, the electronic device may determine whether a response is received from the user. When no response is received, the electronic device may perform step 2715, and if a response is received, the electronic device may perform step 2713.

In step 2713, the electronic device may display an object related to the received response information and display, or output in audio information, detailed information about the notification event.

In step 2715, the electronic device may determine whether a preset time elapses after the notification event occurs. If no response is determined to be received from the user until the preset time elapses, i.e., upon determining that no interaction selection is received or that it fails to identify the user, the electronic device may turn to the standby state, waiting to receive the notification event or input information from the external object in step 2717. For example, if the user takes a motion to go away from the electronic device although the user identifies the display, the electronic device may stop the event notification without providing additional information to the user. In such case, the electronic device may also store the information about the notification event. When recognizing the user later, the electronic device may trace the position of the recognized user, and if the user is identified, the electronic device may move the display or object to face the identified user and provide guide information or detailed information about the stored notification event.

Figure 29A:
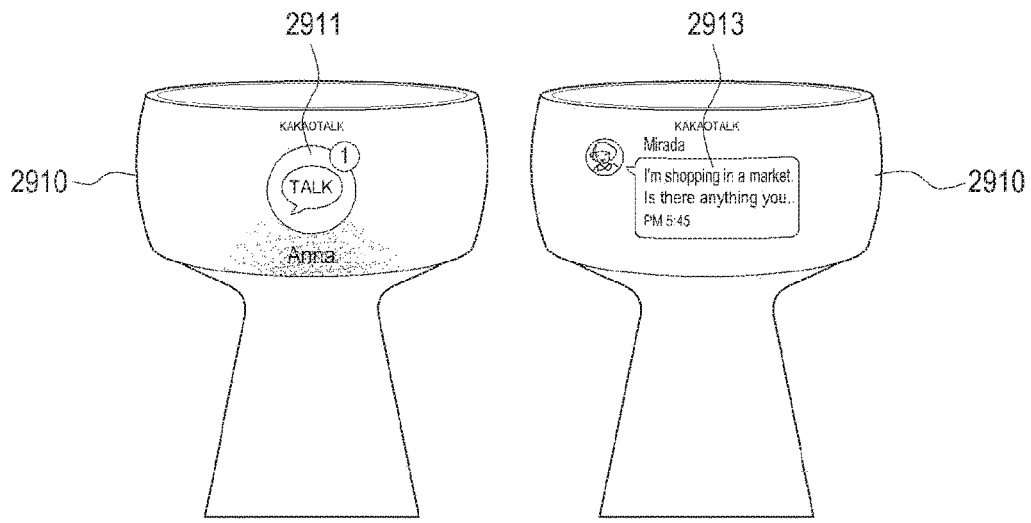
Figure 29B:
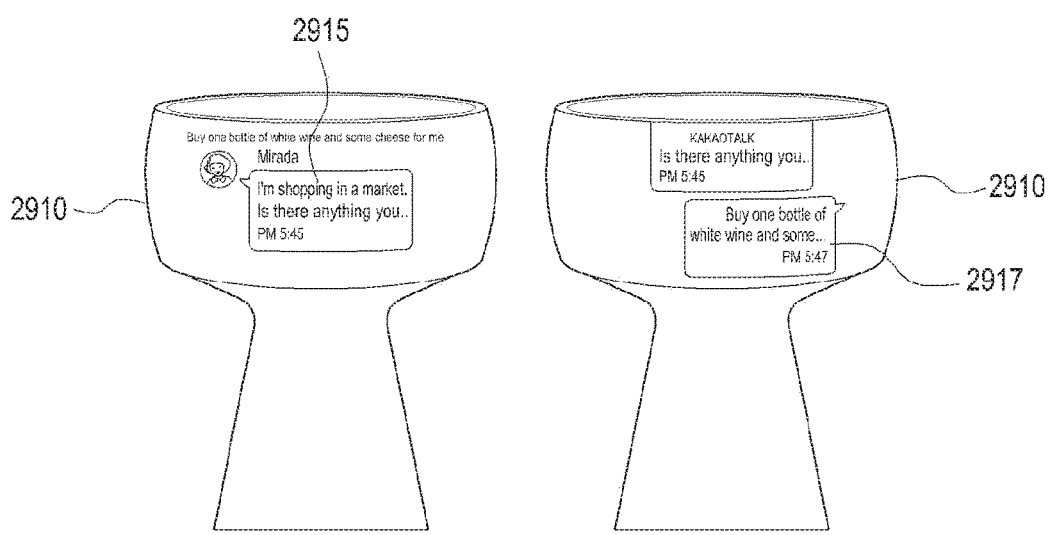

FIGS. 29A and 29B are views illustrating examples of display screens of an electronic device according to an embodiment of the present disclosure.

Based on the operational procedure of FIG. 27 described above, the electronic device may output, through the audio module, a voice speaking, "You have a text message from Anna," or display an object 2911 for the notification information on the display 2910 according to the occurrence of the notification event as shown in FIG. 29A, according to an embodiment of the present disclosure. At this time, upon sensing a response, i.e., interaction, such as if the user makes an additional command, e.g., "show me" or "read it," if the user approaches the electronic device, the electronic device may provide detailed information 2913 about the related event to the user in a voice or through the display 2910.

Referring to FIG. 29B, after the interaction selection that the user responds and if receiving a response message (voice information or text input information) 2915 for the notification event from the user, the electronic device may transmit the received response message. The electronic device may also display, on the display 2910, an object 2917 according to the result of transmission of the response message. At this time, where the electronic device can directly perform communication for a messenger service, the electronic device may directly transmit the response message entered by the user to the opposite party. Unless the electronic device can directly perform communication for the messenger service, the electronic device may deliver the entered response message to an external electronic device conducting the messenger service to request it to transmit the message to the opposite party.

Figure 30A:
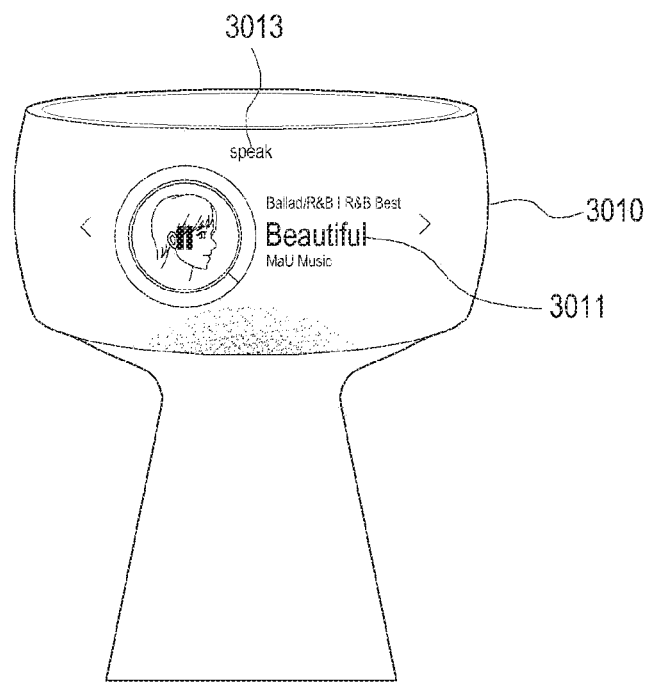
FIGS. 30A and 30B are views illustrating examples of display screens of an electronic device according to various embodiments of the present disclosure.
Figure 30B:
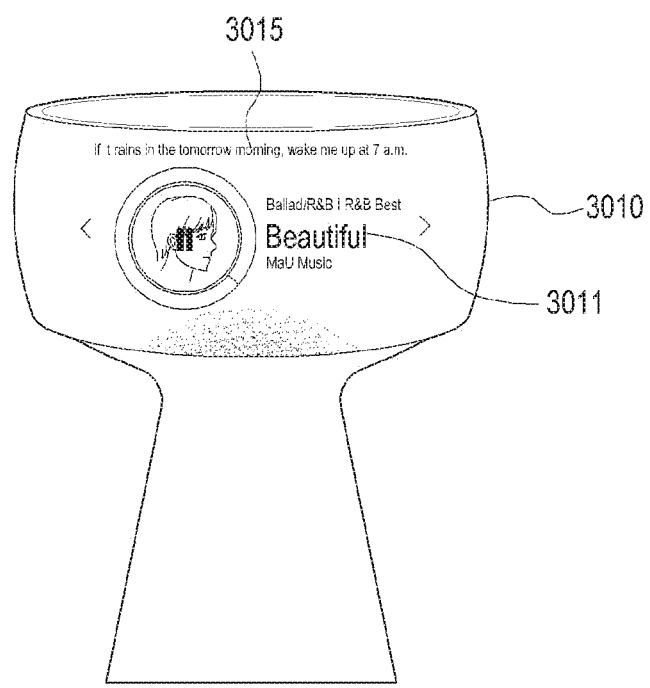

FIGS. 30A and 30B are views illustrating examples of display screens of an electronic device according to an embodiment of the present disclosure.

Referring to FIGS. 30A and 30B, if the electronic device performing a particular function 3011 receives a request for another function, the electronic device may display an object 3013 for the other function, e.g., the user's additional voice command, on the display screen that is displaying an object 3011 for the particular function. Upon receiving a voice input (e.g., saying "Hey Buddy") from the user while playing (3011) music through a music player program, the electronic device may activate a function for voice recognition while a particular operation is performed and display, on part of the screen of the music player, an additional object 3013 saying "Say something" while a module for voice recognition is activated. Thereafter, if the user makes a voice saying "Wake me up at 7 AM tomorrow if it rains," the electronic device may additionally display a screen recognizing the voice on the current music player 3011. If a result of the process needs to be provided to the user, the electronic device may configure and provide a screen for the result on top of the current music player screen.

A method for providing information in an electronic device including a rotation supporting member, a supporting member supporting the rotation supporting member, and a rotating member movably coupled with the rotation supporting member may comprise, upon receiving input information, controlling the driving of the rotating member so that a display (or a screen of the display) coupled to the rotating member corresponding to the received input information faces in a first direction, identifying an external object positioned in the first direction using at least one sensor, and providing at least one function related to the identified external object.

The method may further comprise, if the display moves to face in the first direction, controlling the driving of the rotating member so that the display faces in a second direction to identify the external object. If the display is positioned to face the external object in the second direction, the external object may be identified.

The method may further comprise, if the display faces in the first direction, enabling an object of a first page for the function currently displayed on the display to disappear in the first direction at a user's request, and if the display returns to the first direction, displaying, on the display, an object of the second page to be shown in an opposite direction of the first direction.

The method may further comprise, if the input information is a control command, running an application for the control command and transmitting control information to control a peripheral electronic device corresponding to the control command through the running application.

Providing at least one function related to the identified external object may include measuring the distance from the identified external object, if the measured distance is larger than a preset threshold, providing a first function related to the identified external object, and if the measured distance is not larger than the preset threshold, providing a second function related to the identified external object.

Providing at least one function related to the identified external object may include, if a notification event occurs while the function related to the external object is provided, determining a target external object of the notification event and controlling the rotating member to move the display in the direction where the determined target external object is positioned.

Providing at least one function related to the identified external object may further include, upon receiving response information from the target external object, providing a function corresponding to the received response information.

A method for providing information in an electronic device including a rotation supporting member, a supporting member supporting the rotation supporting member, and a rotating member movably coupled with the rotation supporting member may comprise, upon receiving input information, controlling the driving of the rotating member so that a display coupled to the rotating member corresponding to the received input information faces in a first direction, if the display moves to face in the first direction, controlling the driving of the rotating member so that the display faces in a second direction to identify the external object, if the display is positioned to face the external object in the second direction, identifying the external object, and displaying, through the display, information about at least one function run in relation to the identified external object.

The method may further comprise, if the display moves in the first direction or second direction corresponding to the driving of the rotating member with previous information displayed on the display in relation with the external object, changing the position of display of at least one object for the previous information so that at least one object of the displayed previous information is displayed while being moved in a set direction as the display moves, and if the movement of the display stops, changing the position of display of the at least one object back to the original position.

The method may further comprise, if the display moves in a third direction after information about the executed function is displayed on the display, changing the position of display of the at least one object so that the at least one object of the information about the executed function is displayed while being moved in a set direction as the display moves, and if the movement of the display stops, changing the position of display of the at least one object back to the original position.

The method may further comprise, in a case where the information about the at least one function includes multiple pages, if the display is moved at a requested direction according to a request for switching the displayed page, changing the position of display of the first page so that the first, page displayed on the display disappears in the requested direction, and if the display returns to the first direction, changing the position of display of a second page so that the second page slides in from an opposite direction of the requested direction on the display.

The method may further comprise, if the input information is a control command, running an application for the control command and transmitting, to the peripheral electronic device, control information to control a peripheral electronic device corresponding to the control command through the running application.

Displaying, through the display, the information about the at least one function executed in relation to the identified external object may include measuring the distance from the identified external object, if the measured distance is larger than a preset threshold, providing a first function related to the identified external object, and if the measured distance is not larger than the preset threshold, providing a second function related to the identified external object.

Displaying, through the display, the information about the at least one function executed in relation to the identified external object may include, if a notification event occurs while the function related to the external object is provided, determining a target external object of the notification event, controlling the driving of the rotating member so that the display moves in the direction where the determined target external object is positioned, and upon receiving response information from the target external object, providing the information about the executed function corresponding to the received response information.

Figure 31:
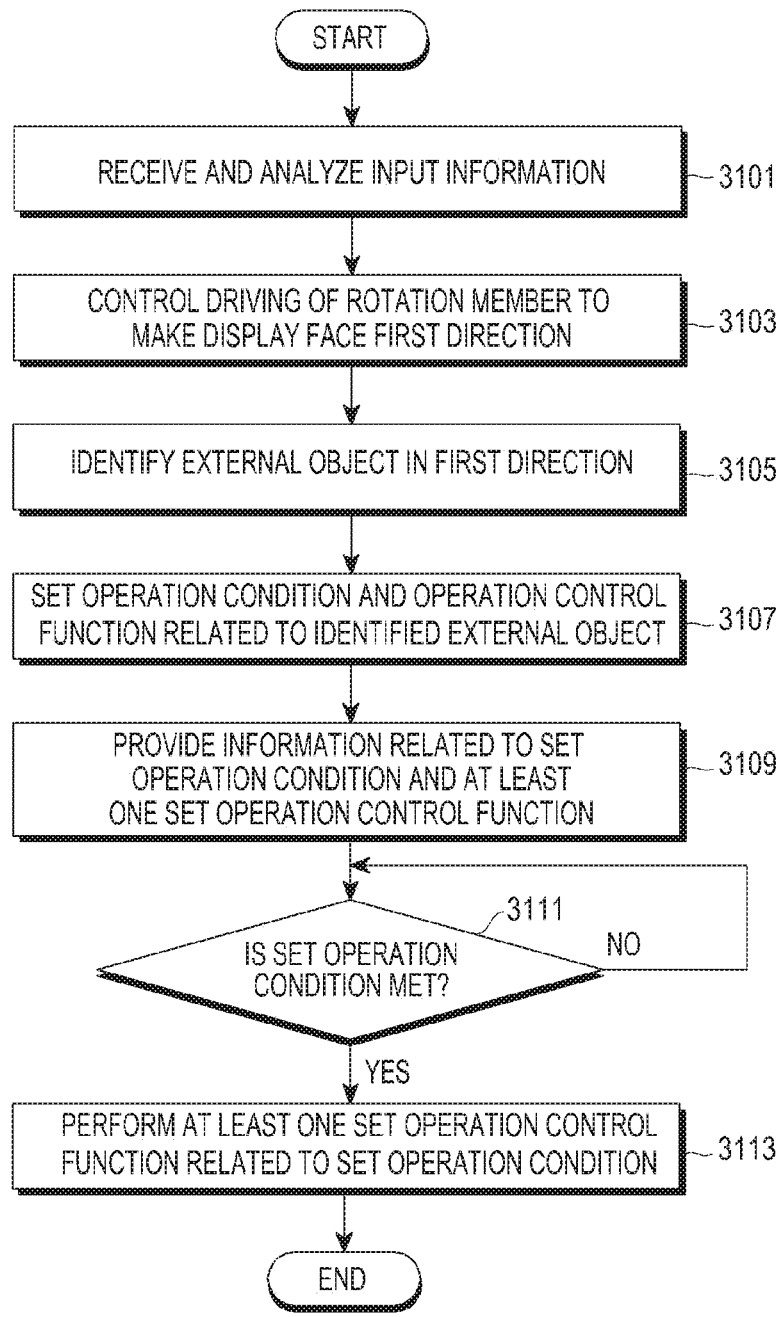
FIG. 31 is a flowchart of a method of an electronic device according to an embodiment of the present disclosure.

FIG. 31 is a flowchart of a method of an electronic device according to an embodiment of the present disclosure.

Referring to FIG. 31, the electronic device (the electronic device 101 of FIG. 1 or the electronic device 700 of FIG. 7) may receive input information for initiating an interaction with a user in step 3101. Here, the input information may include voice information of the external object (e.g., a user or thing), information entered from the external object through a button or touchpad, information sensed for a certain movement of the external object, and information received through an external network. The electronic device may analyze the received input information and run a corresponding application as per the result of analysis. For example, upon receiving the input information in the standby state, the electronic device may turn to the active state and run an application corresponding to the received input information. The electronic device may display an object related to the running of the application on the display.

In step 3103, if the input information is received and its corresponding application runs, the electronic device may determine the direction of the movement of the display, i.e., the first direction, based on the received input information and control the driving of the rotating member so that the display faces in the first direction.

In step 3105, the electronic device may identify the external object positioned in the first direction using at least one sensor. The electronic device may receive the user's facial image captured by an image recognizing module (e.g., a camera), analyze the received facial image, extract information corresponding to the analyzed information from information from the external object previously registered and stored, and identify the user. The electronic device may identify the external object using at least one of the user's face recognition, fingerprint recognition, iris recognition, authentication information (e.g., a password), authentication, or voice recognition.

In step 3107, the electronic device may configure an operational condition and operation control function related to the identified external object. The electronic device may output voice information related to the configured operational condition and configured operation control function through the audio module. Here, the configured operation control function may be configured in association with the operational condition and may include a function to control the operation of at least one external electronic device positioned around the electronic device or the operation for at least one application running on the electronic device.

In step 3107, if the information received from the external object is, e.g., voice information, the electronic device may extract a sentence containing a word related to a condition or control from the received voice information through a voice analyzing algorithm. The electronic device may set an operational condition based on the extracted sentence for condition and set an operation control function based on the extracted sentence for control.

In step 3107, the electronic device may generate condition objects for configuring the operational condition or objects related to the function for configuring the operation control function based on context information gathered through context recognition in relation to the identified external object and may display the generated condition objects or function-related objects on the display. The electronic device may choose at least one from among the condition objects or function-related objects displayed on the display and configure an operational condition based on the chosen condition object or an operation control function based on the chosen function-related object.

In step 3109, the electronic device may provide information related to the configured operational condition and the at least one configured operation control function associated with the operational condition. The electronic device may display, on the display, an object (e.g., an operational condition card) for the configured operational condition and an object (e.g., an operation control function card) for the configured operation control function. The electronic device may output voice information related to the configured operational condition and configured operation control function through the audio module. The electronic device may generate a command card as an integrated command obtained by associating the configured operational condition with the at least one configured operation control function and may store the generated command card as command information for the identified external object. The electronic device may display, or output in voice information, the generated command card. Here, the external object may request to change the operational condition and operation control function contained in the command card or to add a new operational condition or operation control function by identifying the command card displayed or outputted. Upon receiving the request, the electronic device may update the command card as per the request.

In step 3111, the electronic device may determine whether to meet the configured operational condition. Upon meeting the configured operational condition, the electronic device may perform step 3133. Unless the configured operational condition is met, the electronic device may repeat step 3111.

In step 3133, the electronic device may run at least one operation control function configured in association with the configured operational condition.

Before performing the operation control function (step 3133), the electronic device may grasp the current position of the external object, and unless the external object is located in a nearby area (e.g., in the house), the electronic device may restrict the running of the configured operation control function.

FIGS. 32A to 32D are views illustrating examples of display screens of an electronic device according to various embodiments of the present disclosure.

An example for providing information related to an operational condition and operation control function generated based on the operational procedure of the electronic device as described above in connection with FIG. 31 is described below with reference to FIGS. 32A to 32D. Here, the external object is, e.g., a user for description purposes.

Figure 32A:
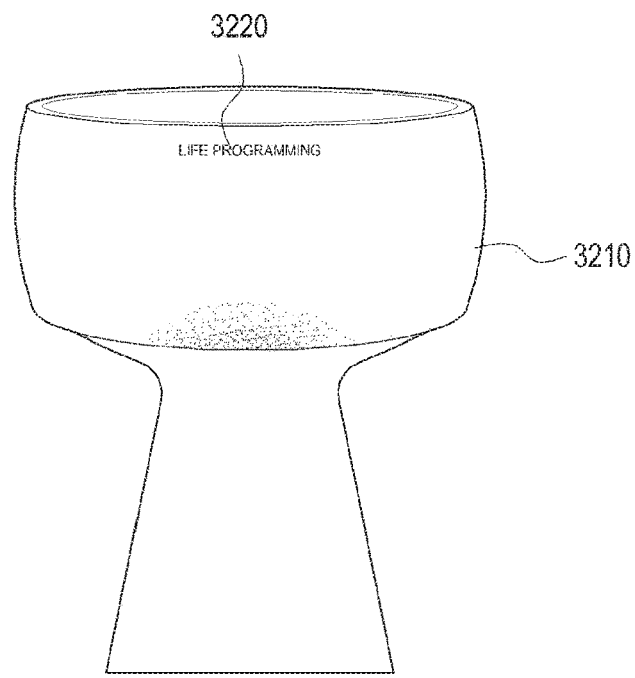
FIGS. 32A, 32B, 32C, and 32D are views illustrating examples of display screens of an electronic device according to various embodiments of the present disclosure.

Referring to FIG. 32A, upon receiving input information for initiating an interaction from the user in the standby state, the electronic device may run an application for configuring and running an operational condition and operation control function and display an object 3220 related to the running application on the display 3210. The electronic device may also wait for an interaction with the user.

Figure 32B:
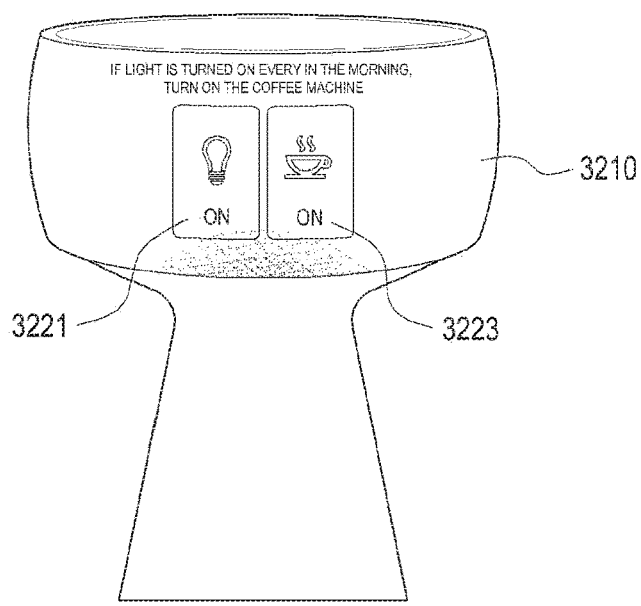

Referring to FIG. 32B, if an interaction with the identified user occurs, e.g., upon entering voice information, e.g., saying "Turn on the coffee maker if lights turn on every morning," the electronic device may display the entered voice information on the current screen of the display 3210. The electronic device may analyze the voice information and extract a condition or control command. The electronic device may provide information about the extracted condition or information about the extracted control command as information related to the identified user. For example, the electronic device may generate an operational condition card 3221 (e.g., an object indicating that Mike's room light turns on) indicating the information about the extracted condition and an operation control function card 3223 (e.g., an object indicating to operate the coffee maker) indicating the information about the extracted control command. The electronic device may display the generated operational condition 3221 and the generated operation control function card 3223 on the display 3210.

Figure 32C:
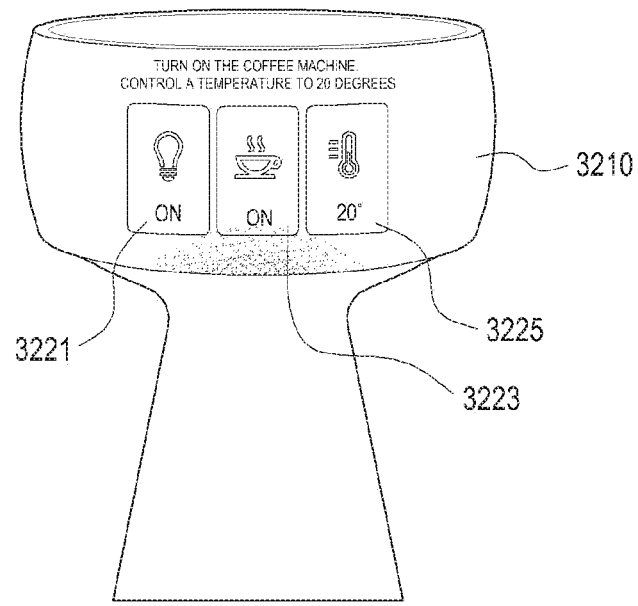

Referring to FIG. 32C, the electronic device may provide the generated operational condition card 3221 and operation control function card 3223 as shown in FIG. 23B. Then, if information about an additional control command occurs, the electronic device may generate an additional operation control function card 3225 indicating the generated information about the additional control command and display the generated additional operation control function card 3225 on the display 3210.

Figure 32D:
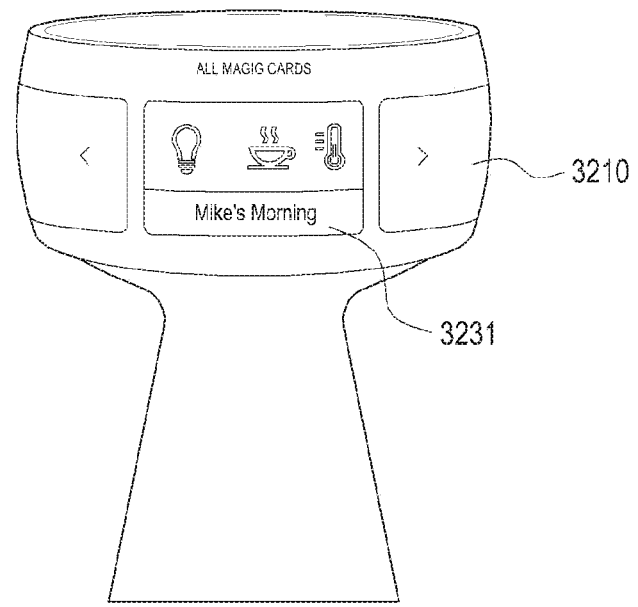

Referring to FIG. 32D, the electronic device may configure integrated command information by associating the generated operational condition card 3221 with the operation control function cards 3223 and 3225 as shown in FIGS. 23B and 23C and may display a command card 3231 indicating the configured command information on the display 3210.

Figure 33:
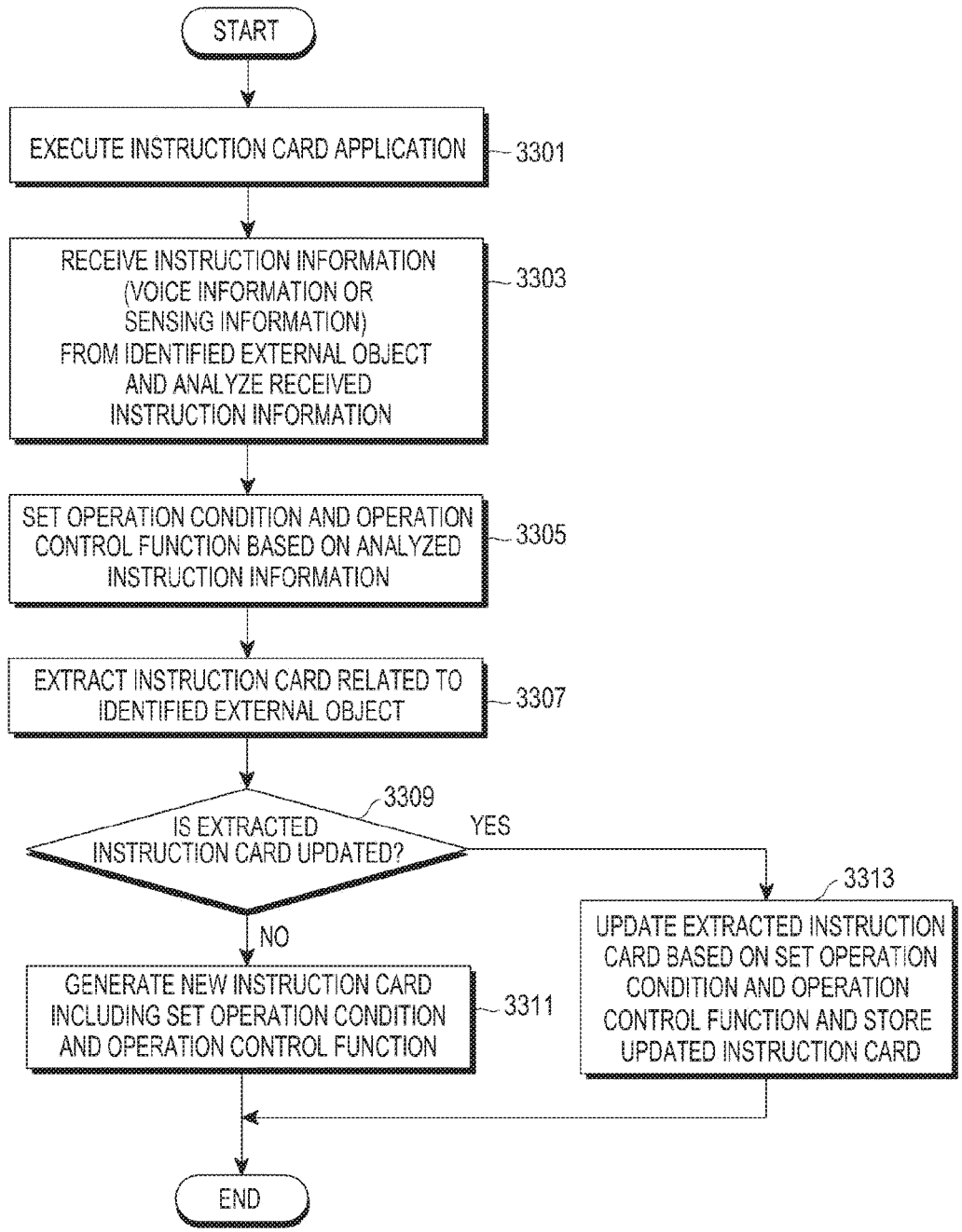
FIG. 33 is a flowchart of a method of an electronic device according to an embodiment of the present disclosure.

FIG. 33 is a flowchart of a method of an electronic device according to an embodiment of the present disclosure.

Referring to FIG. 33, the electronic device may receive input information for initiating an interaction and may accordingly run an application (e.g., a command card application) for configuring command information in step 3301.

In step 3303, the electronic device may receive interaction information for generating a command card through interaction with an identified external object, analyze the received interaction information, and extract information about a condition and/or control command from the interaction information. For example, the interaction information may be (sensing) information sensed by at least one sensor or voice information received from the external object.

In step 3305, the electronic device may configure an operational condition and operation control function based on the extracted information about the condition and/or control command. Step 3305 may be the same or similar in detailed description to step 3107 of FIG. 31 for configuring the operational condition and operation control function.

In step 3307, the electronic device may search at least one command card previously generated in association with the identified external object. Upon searching the at least one command card previously generated, the electronic device may search a command card containing the same or similar information to at least one of the configured operational condition or configured operation control function.

In step 3309, the electronic device may determine whether to update the found command card. Upon determining to update the command card, the electronic device may perform step 3313. Upon determining not to update the command card, the electronic device may perform step 3311.

In step 3311, the electronic device may generate and store a command card indicating command information obtained by integrating the configured operational condition and operation control function in association therebetween and provide the generated command card.

In step 3313, the electronic device may update the found command card with the configured operational condition and operation control function and store the updated command card in the memory.

Figure 34:
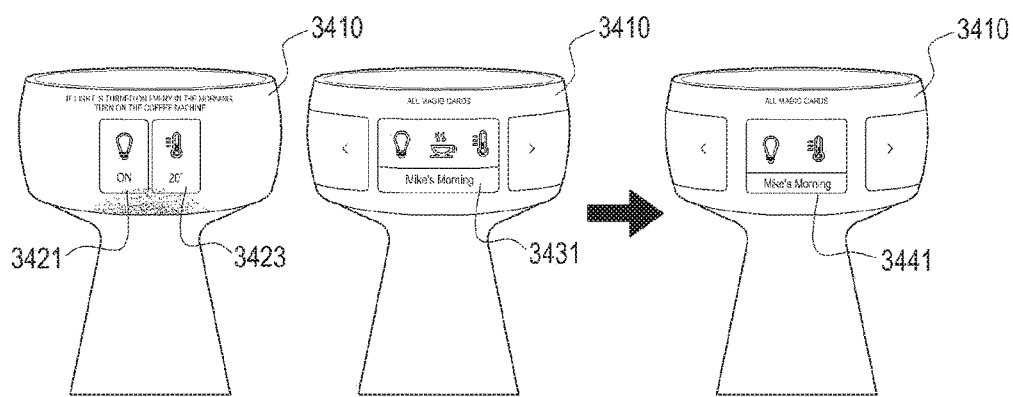
FIG. 34 is a view illustrating an example of a display screen of an electronic device according to an embodiment of the present disclosure.

FIG. 34 is a view illustrating an example of a display screen of an electronic device according to an embodiment of the present disclosure.

An example for providing information related to an operational condition and operation control function generated based on the operational procedure of the electronic device as described above in connection with FIG. 33 is described below with reference to FIG. 34. Here, the external object is, e.g., a user for description purposes.

Referring to FIG. 34, according to an embodiment of the present disclosure, the electronic device may receive, e.g., from a user, voice information, as interaction information and generate an operational condition card 3421 (e.g., an object indicating that Mike's room light turns on) indicating the information about the extracted condition and an operation control function card 3423 (e.g., an object indicating to adjust the temperature to 20° C.) indicating the information about the extracted control command. The electronic device may display the generated operational condition 3421 and the generated operation control function card 3423 on the display 3410.

The electronic device may search a command card associated with at least one of the generated operational condition card 3421 or the generated operation control function card 3423 and display the found command card 3431 on the display 3410. Upon displaying the found command card 3431, the electronic device may enable the displayed operational condition card 3421 and operation control function card 3423 to move and disappear to give a page shifting effect as shown in FIG. 34 or may display the operational condition card 3421 and operation control function card 3423 on a display area that is positioned away from the display area that is in the current direction (e.g., the first direction). Then, the electronic device may display the found command card 3431 on the display area that is in the current direction.

The electronic device may identify that the operational condition contained in the found command card 3431 complies with the operational condition card 3421, change the operation control function associated with the contained operational condition to the generated operation control function card 3423, configure reintegrated command information, and update the found command card 3441 by including the configured command information.

Figure 35:
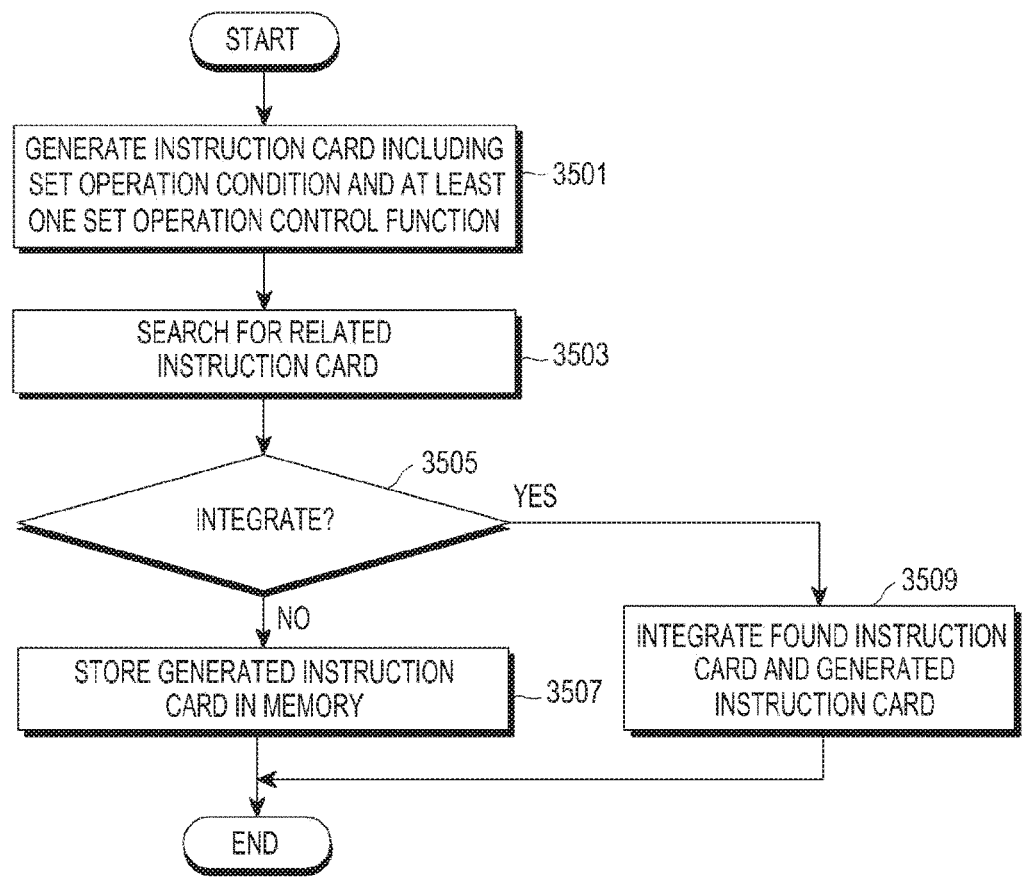
FIG. 35 is a view illustrating an example of a method of an electronic device according to an embodiment of the present disclosure.

FIG. 35 is a flowchart of a method of an electronic device according to an embodiment of the present disclosure.

If receiving interaction information upon running an application (e.g., a command card application) for configuring command information, the electronic device may extract information about a condition and/or control command from the received interaction information and configure an operational condition and operation control function based on the extracted information about the condition and/or control command (which is the same or similar to, e.g., steps 3301 to 3305).

Referring to FIG. 35, the electronic device may generate a command card including the configured operational condition and the at least one configured operation control function in step 3501. The electronic device may configure command information by integrating the configured operational condition and the operation control function associated with the operational condition and generate a command card (hereinafter, a "first command card") containing the configured command information.

In step 3503, the electronic device may search at least one command card (hereinafter, a "second command card") previously generated in association with the identified external object. Upon searching a second command card, the electronic device may search a second command card containing the same or similar information to at least one of the operational condition or operation control function contained in the first command card.

In step 3305, the electronic device may determine whether to merge the generated first command card and the found second command card. Upon determining not to merge the two command cards, the electronic device may perform step 3507, and upon determining to merge the two command cards, the electronic device may perform step 3509.

In step 3507, the electronic device may store the first command card, as it is, as command information for the identified external object, in the memory.

In step 3509, the electronic device may merge the first command card and the second command card to generate a third command card that is a new card and may store the generated third command card, as command information for the identified external object, in the memory. Here, the electronic device may abstain from storing the first command card and delete, or maintain, as it is, the second command card.

Figure 36:
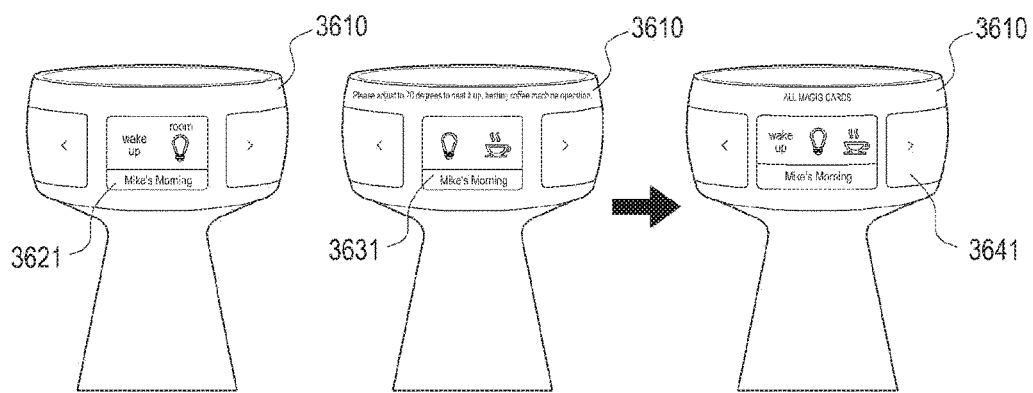
FIG. 36 is a view illustrating an example of a display screen of an electronic device according to an embodiment of the present disclosure.

FIG. 36 is a view illustrating an example of a display screen of an electronic device according to an embodiment of the present disclosure.

An example for providing information related to an operational condition and operation control function generated based on the operational procedure of the electronic device as described above in connection with FIG. 35 is described below with reference to FIG. 36. Here, the external object is, e.g., a user for description purposes.

Referring to FIG. 36, according to an embodiment of the present disclosure, the electronic device may receive, e.g., from a user, voice information, as interaction information, configure command information by integrating an operational condition (e.g., an object indicating Mike's wakeup alarm) indicating information about a condition extracted from the voice information and an operation control function (e.g., an object indicating to turn on the room light) indicating information about control information extracted from the voice information in association therebetween, and generate a first command card 3621, which is in the form of a card, using the configured command information. The electronic device may display the generated first command card 3621 on the display 3610.

The electronic device may search a command card related to an identified external object. The electronic device may search a second command card related to at least one of the operational condition or the operation control function included in the first command card 3621. The electronic device may display at least one found second command card 3631 on the display 3610. If a plurality of second command cards 3631 are found, the electronic device may display the plurality of second command cards 3631 to present a page shifting effect as shown in FIG. 36.

Referring to FIG. 36, the electronic device may generate a third command card 3641, which is a new one, by integrating the operational condition and operation control function contained in the first command card 3621 and the operational condition (e.g., an object indicating a condition under which Mike's room light turns on) or operation control function (e.g., an object indicating to operate the coffee maker) contained in the found second command card 3631. As the operation control function (e.g., an object indicating to turn on the room light) contained in the first command card 3621 is the same or similar, the electronic device may set the operational condition (e.g., an object indicating a condition under which Mike's wakeup alarm goes off) of the first command card as an operational condition of the third command card 3641 and configure an operation control function associated with the operational condition as set. Here, the electronic device may configure operation control functions associated with the set operational condition by integrating the operation control function (e.g., an object indicating to turn on the room light) of the first command card 3621 and the operation control function (e.g., an object indicating to operate the coffee maker) of the second command card 3631. The electronic device may configure command information containing the configured operational condition and the operation control functions associated with the operational condition and display the third command card 3641, which is generated in the form of a card using the configured command information, on the display 3610.

Figure 37:
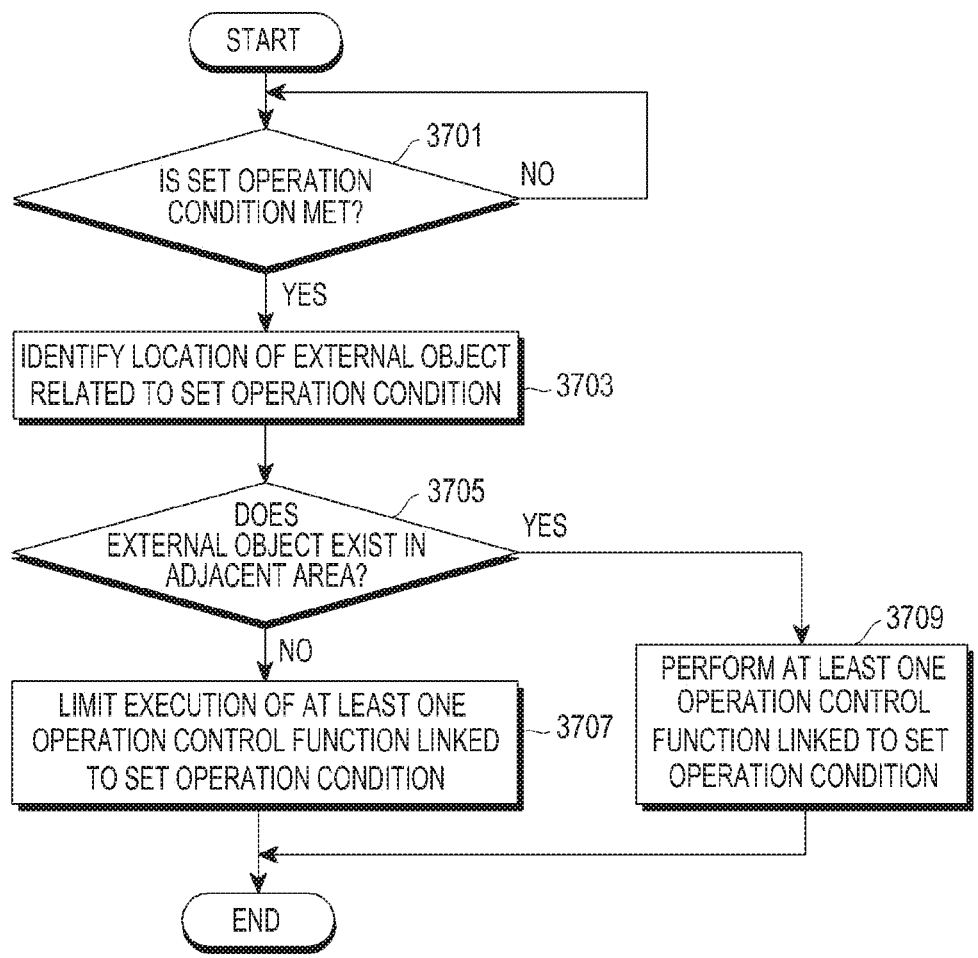
FIG. 37 is a flowchart of a method of an electronic device according to an embodiment of the present disclosure.

FIG. 37 is a flowchart of a method of an electronic device according to an embodiment of the present disclosure.

Referring to FIG. 37, the electronic device, in step 3701, may identify whether the operational condition configured in at least one operational procedure of those shown in FIGS. 31, 33, and 35 is met. If the configured operational condition is identified to be met, the electronic device may perform step 3703. Unless the configured operational condition is met, the electronic device may repeat step 3701.

In step 3703, if the configured operational condition is met, the electronic device may determine an external object corresponding to the configured operational condition and trace the position of the determined external object. Here, the electronic device may identify the external object using information sensed by at least one sensor or gathered context information.

In step 3705, the electronic device may determine whether the external object is positioned within a nearby area (e.g., in the house). Unless the external object is determined to be present within the nearby area, the electronic device may perform step 3707, and if the external object is present within the nearby area, the electronic device may perform step 3709.

In step 3707, as the electronic device determines that the external object is not positioned within the nearby area, the electronic device may restrict the running of at least one operation control function associated with the configured operational condition. Here, the electronic device may display an indication that it cannot run the operation control function contained in the command card while displaying the command card containing the configured operational condition on the display, and after a predetermined time elapses, the electronic device may switch into the standby state. At this time, the electronic device may transmit, to the external object, a guide message indicating that the command card or the operation control function contained in the command card is not run. For example, where the external object is a user, the electronic device may send the guide message to the user's portable device. According to an embodiment of the present disclosure, where interaction with another external object is underway, the electronic device may abstain from displaying the command card for the configured operational condition and relevant objects.

In step 3709, as the electronic device determines that the external object is positioned within the nearby area, the electronic device may run at least one operation control function associated with the configured operational condition. Here, the electronic device may display, on the display, the command card containing the configured operational condition and objects related to the running of the operation control function or may output audio information.

A method for providing information in an electronic device including a rotating member, a rotation supporting member supporting the rotating member, and a driving module moving the rotating member may comprise controlling a movement of the rotating member so that a display coupled onto a surface of the rotating member or a screen of the display faces in a first direction where an external object is positioned, identifying the external object positioned in the first direction using at least one sensor, configuring an operational condition related to the identified external object and at least one operation control function based on information received according to an interaction with the identified external object, and providing information related to the configured operational condition and the at least one configured operation control function.

The method may further comprise, if the configured operational condition is met, running the at least one configured operation control function according to the configured operational condition.

Identifying the external object may include, if the display moves to face in the first direction, controlling the movement of the rotating member so that the display faces in a second direction to identify the external object and, if the display faces in the second direction, identifying the external object facing the display using at least one sensor.

Configuring the operational condition related to the identified external object and the at least one operation control function may include receiving voice information from the identified external object, obtaining a condition sentence containing a word related to a condition from the received voice information, configuring the operational condition based on the obtained condition sentence, obtaining a control sentence containing a word related to control from the received voice information, and configuring the at least one operation control function based on the obtained control sentence.

Configuring the operational condition related to the identified external object and the at least one operation control function may include gathering context information through context recognition in relation to the identified external object, generating condition objects for configuring the operational condition or objects related to a function for configuring the operation control function based on the gathered context information, and displaying the generated condition objects or the function-related objects on the display.

Configuring the operational condition related to the identified external object and the at least one operation control function may include choosing at least one condition object from among the condition objects for configuring the operational condition displayed on the display and setting a condition indicated by the chosen condition object as the operational condition.

Configuring the operational condition related to the identified external object and the at least one operation control function may include choosing at least one object from among the function-related objects for configuring the operation control function displayed on the display and setting a function indicated by the chosen object as the operation control function.

Providing the information related to the configured operational condition and the at least one configured operation control function may include configuring command information by integrating the configured operational condition and the at least one configured operation control function in association therebetween, generating a card-type command card containing the configured command information, and displaying the generated command card on the display.

Providing the information related to the configured operational condition and the at least one configured operation control function may include searching at least one command card related to the configured operational condition or the configured operation control function and updating the found command card based on the configured operational condition or the configured operation control function.

The operation control function may include a function for controlling an operation of at least one external electronic device positioned around the electronic device or controlling an operation for at least one application running on the electronic device.

Figure 38:
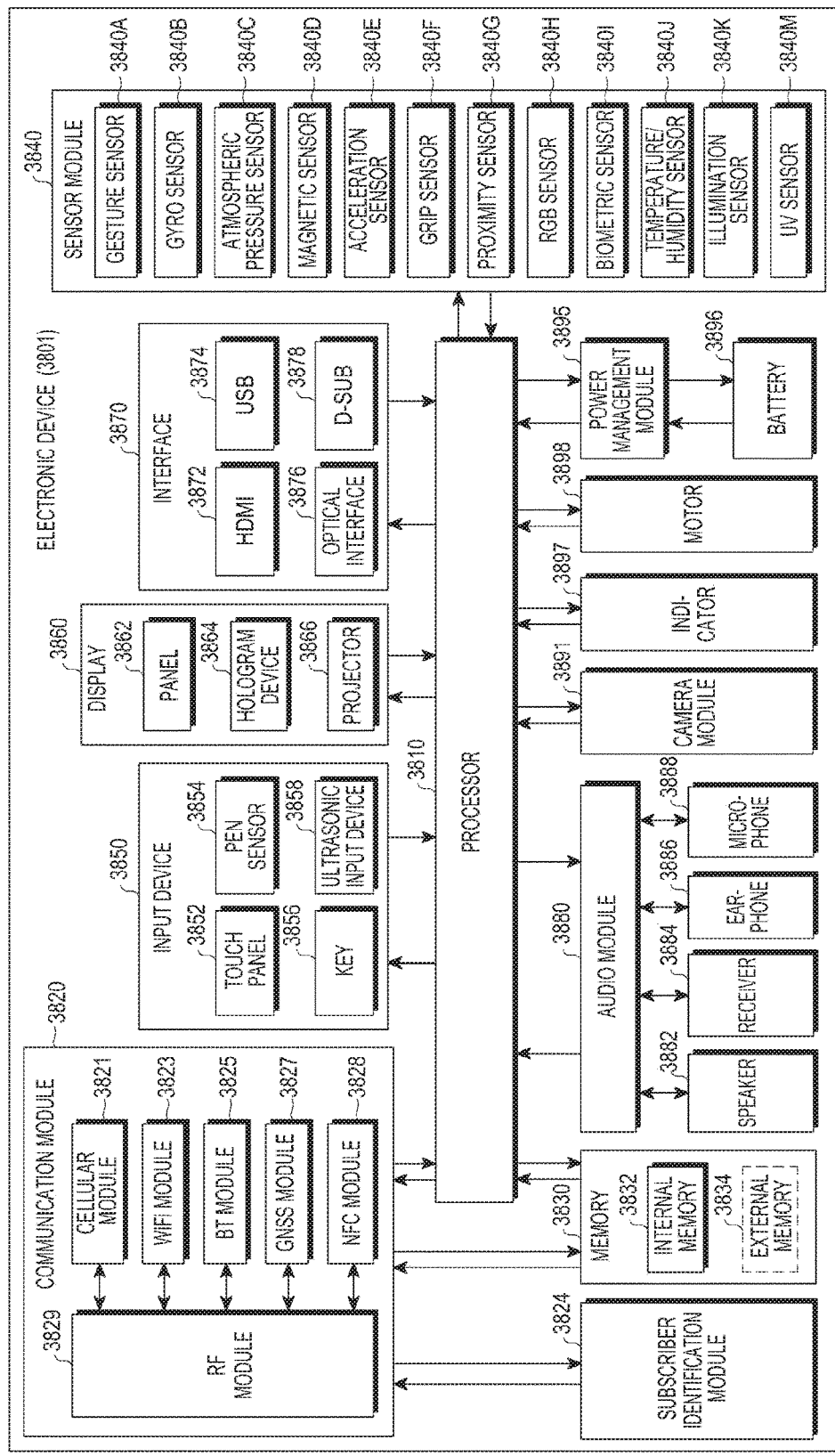
FIG. 38 is a block diagram of an electronic device according to an embodiment of the present disclosure.

FIG. 38 is a block diagram of an electronic device according to an embodiment of the present disclosure. The electronic device 3801 may include the whole or part of the configuration of, e.g., the electronic device 101 shown in FIG. 1. The electronic device 3801 may include one or more processors (e.g., application processors (APs)) 3810, a communication module 3820, a subscriber identification module (SIM) 3824, a memory 3830, a sensor module 3840, an input device 3850, a display 3860, an interface 3870, an audio processor 3880, a camera module 3891, a power management module 3895, a battery 3896, an indicator 3897, and a motor 3898.

The processor 3810 may control multiple hardware and software components connected to the processor 3810 by running, e.g., an operating system or application programs, and the processor 210 may process and compute various data. The processor 3810 may be implemented in, e.g., a system on chip (SoC). The processor 3810 may further include a graphic processing unit (GPU) and/or an image signal processor. The processor 3810 may include at least some (e.g., the cellular module 3821) of the components shown in FIG. 38. The processor 3810 may load a command or data received from at least one of other components (e.g., a non-volatile memory) on a volatile memory, process the command or data, and store various data in the non-volatile memory.

The communication module 3820 may have the same or similar configuration to the communication interface 170 of FIG. 1. The communication module 3820 may include, e.g., a cellular module 3821, a Wi-Fi module 3823, a Bluetooth module 3825, a GNSS module 3827 (e.g., a GPS module, a Glonass module, a Beidou module, or a Galileo module), an NFC module 3828, and a radio frequency (RF) module 3829.

The cellular module 3821 may provide voice call, video call, text, or Internet services through, e.g., a communication network. The cellular module 3821 may perform identification or authentication on the electronic device 3801 in the communication network using a subscriber identification module 3824 (e.g., the SIM card). The cellular module 3821 may perform at least some of the functions providable by the processor 3810. The cellular module 3821 may include a communication processor (CP).

The Wi-Fi module 3823, the Bluetooth module 3825, the GNSS module 3827, or the NFC module 3828 may include a process for, e.g., processing data communicated through the module. At least some (e.g., two or more) of the cellular module 3821, the Wi-Fi module 3823, the Bluetooth module 3825, the GNSS module 3827, or the NFC module 3828 may be included in a single integrated circuit (IC) or an IC package.

The RF module 3829 may communicate data, e.g., communication signals (e.g., RF signals). The RF module 3829 may include, e.g., a transceiver, a power amplifier module (PAM), a frequency filter, a low noise amplifier (LNA), or an antenna. According to an embodiment of the present disclosure, at least one of the cellular module 3821, the Wi-Fi module 3823, the Bluetooth module 3825, the GNSS module 3827, or the NFC module 3828 may communicate RF signals through a separate RF module.

The subscription identification module 3824 may include, e.g., a card including a subscriber identification module and/or an embedded SIM, and may contain unique identification information (e.g., an integrated circuit card identifier (ICCID) or subscriber information (e.g., an international mobile subscriber identity (IMSI)).

The memory 3830 (e.g., the memory 130) may include, e.g., an internal memory 3832 or an external memory 3834. The internal memory 3832 may include at least one of, e.g., a volatile memory (e.g., a dynamic RAM (DRAM), a static RAM (SRAM), a synchronous dynamic RAM (SDRAM), etc.) or a non-volatile memory (e.g., a one-time programmable ROM (OTPROM), a programmable ROM (PROM), an erasable and programmable ROM (EPROM), an electrically erasable and programmable ROM (EEPROM), a mask ROM, a flash ROM, a flash memory (e.g., a NAND flash, or a NOR flash), a hard drive, or solid state drive (SSD)).

The external memory 3834 may include a flash drive, e.g., a compact flash (CF) memory, a secure digital (SD) memory, a micro-SD memory, a min-SD memory, an extreme digital (xD) memory, a multi-media card (MMC), or a memory stick. The external memory 3834 may be functionally and/or physically connected with the electronic device 3801 via various interfaces.

For example, the sensor module 3840 may measure a physical quantity or detect a motion state of the electronic device 3801, and the sensor module 240 may convert the measured or detected information into an electrical signal. The sensor module 3840 may include at least one of, e.g., a gesture sensor 3840A, a gyro sensor 3840B, an air pressure sensor 3840C, a magnetic sensor 3840D, an acceleration sensor 3840E, a grip sensor 3840F, a proximity sensor 3840G, a color sensor 384011 such as an red-green-blue (RGB) sensor, a bio sensor 38401, a temperature/humidity sensor 3840J, an illumination sensor 3840K, or an ultra violet (UV) light sensor 3840M. Additionally or alternatively, the sensing module 3840 may include, e.g., an electronic nose (e-nose) sensor, an electromyography (EMG) sensor, an electroencephalogram (EEG) sensor, an electrocardiogram (ECG) sensor, an infrared (IR) sensor, an iris sensor, or a finger print sensor. The sensor module 3840 may further include a control circuit for controlling at least one or more of the sensors included in the sensing module. The electronic device 3801 may further include a processor configured to control the sensor module 3840 as part of the processor 3810 or separately from the processor 3810, and the electronic device 2701 may control the sensor module 3840 while the processor 210 is in a reduced power or sleep mode.

The input unit 3850 may include, e.g., a touch panel 3852, a (digital) pen sensor 3854, a key 3856, or an ultrasonic input device 3858. The touch panel 3852 may use at least one of capacitive, resistive, infrared, or ultrasonic methods. The touch panel 3852 may further include a control circuit. The touch panel 3852 may further include a tactile layer and may provide a user with a tactile reaction.

The (digital) pen sensor 3854 may include, e.g., a part of a touch panel or a separate sheet for recognition. The key 3856 may include e.g., a physical button, optical key or key pad. The ultrasonic input device 3858 may sense an ultrasonic wave generated from an input tool through a microphone (e.g., the microphone 3888) to identify data corresponding to the sensed ultrasonic wave.

The display 3860 (e.g., the display 160) may include a panel 3862, a hologram device 3864, or a projector 3866. The panel 3862 may have the same or similar configuration to the display 160 of FIG. 1. The panel 3862 may be implemented to be flexible, transparent, or wearable. The panel 3862 may also be incorporated with the touch panel 3852 in a module. The hologram device 3864 may make three dimensional (3D) images (holograms) in the air by using light interference. The projector 3866 may display an image by projecting light onto a screen. The screen may be, for example, located inside or outside of the electronic device 3801. The display 3860 may further include a control circuit to control the panel 3862, the hologram device 3864, or the projector 3866.

The interface 3870 may include e.g., a high definition multimedia interface (HDMI) 3872, a USB 3874, an optical interface 3876, or a D-subminiature (D-sub) 3878. The interface 3870 may be included in e.g., the communication interface 170 shown in FIG. 1. Additionally or alternatively, the interface 3870 may include a mobile high-definition link (MHL) interface, a secure digital (SD) card/multimedia card (MMC) interface, or infrared data association (IrDA) standard interface.

The audio processing unit 3880 may convert a sound into an electric signal or vice versa, for example. At least a part of the audio processing unit 3880 may be included in e.g., the input/output interface 150 as shown in FIG. 1. The audio processing unit 3880 may process sound information input or output through e.g., a speaker 3882, a receiver 3884, an earphone 3886, or a microphone 3888.

For example, the camera module 3891 may be a device for recording still images and videos, and may include one or more image sensors (e.g., front and back sensors), a lens, an ISP, or a flash such as an light emitting diode (LED) or xenon lamp.

The power manager module 3895 may manage power of the electronic device 3801, for example. The power manager module 3895 may include a power management IC (PMIC), a charger IC, or a battery gauge. The PMIC may have a wired and/or wireless recharging scheme. The wireless charging scheme may include e.g., a magnetic resonance scheme, a magnetic induction scheme, or an electromagnetic wave based scheme, and an additional circuit, such as a coil loop, a resonance circuit, a rectifier, or the like may be added for wireless charging. The battery gauge may measure an amount of remaining power of the battery 3896, a voltage, a current, or a temperature while the battery 296 is being charged. The battery 3896 may include, e.g., a rechargeable battery or a solar battery.

The indicator 3897 may indicate a particular state of the electronic device 3801 or a part (e.g., the processor 3810) of the electronic device, including e.g., a booting state, a message state, or recharging state. The motor 3898 may convert an electric signal to a mechanical vibration and may generate a vibrational or haptic effect. A processing unit for supporting mobile TV, such as a GPU may be included in the electronic device 3801. The processing unit for supporting mobile TV may process media data conforming to a standard for digital multimedia broadcasting (DMB), digital video broadcasting (DVB), or mediaFlo™.

Each of the aforementioned components of the electronic device may include one or more parts, and a name of the part may vary with a type of the electronic device. The electronic device may include at least one of the aforementioned components, omit some of them, or include other additional component(s). Some of the components may be combined into an entity, but the entity may perform the same functions as the components may do.

Figure 39:
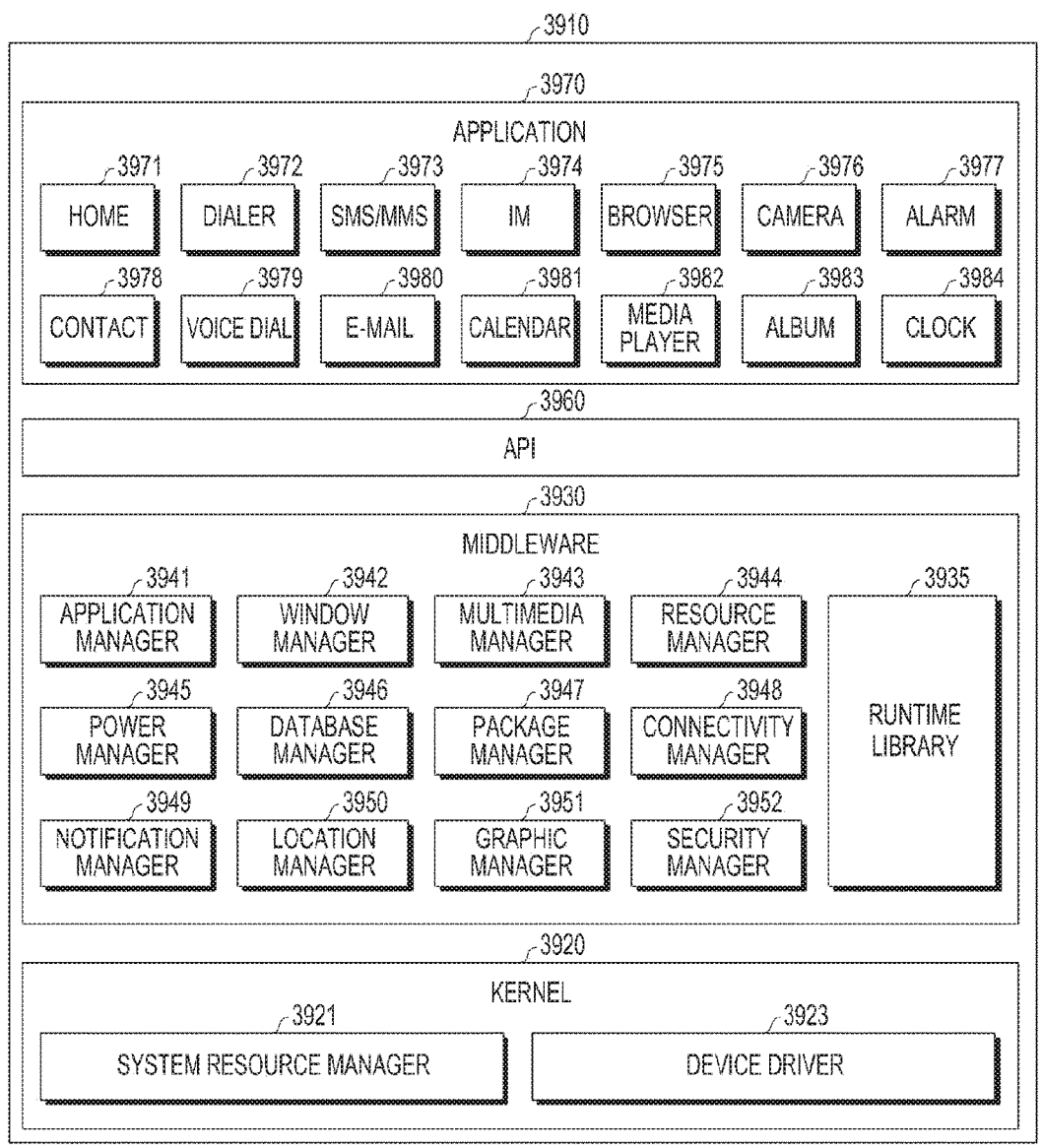
FIG. 39 is a block diagram of a program module according to an embodiment of the present disclosure.

FIG. 39 is a block diagram illustrating a program module according to an embodiment of the present disclosure. According to an embodiment of the present disclosure, the program module 3910 (e.g., the program 140) may include an OS controlling resources related to the electronic device (e.g., the electronic device 101) and/or various applications (e.g., the application processor 147) driven on the operating system. The OS may include, e.g., Android®, iOS®, Windows®, Symbian®, Tizen®, or Bada®.

The program 3910 may include, e.g., a kernel 3920, middleware 3930, an API 3960, and/or an application 3970. At least a part of the program module 3910 may be preloaded on the electronic device or may be downloaded from an external electronic device (e.g., the electronic devices 102 and 104 or server 106).

The kernel 3920 (e.g., the kernel 141) may include, e.g., a system resource manager 3921 and/or a device driver 3923. The system resource manager 3921 may perform control, allocation, or recovery of system resources. The system resource manager 3921 may include a process managing unit, a memory managing unit, or a file system managing unit. The device driver 3923 may include, e.g., a display driver, a camera driver, a Bluetooth driver, a shared memory driver, a USB driver, a keypad driver, a Wi-Fi driver, an audio driver, or an inter-process communication (IPC) driver.

Middleware 3930 may provide various functions to the application 3970 through the API 3960 so that the application 3970 may efficiently use limited system resources in the electronic device or provide functions jointly required by applications 3970. Middleware 3930 (e.g., the middleware 143) may include at least one of a runtime library 3935, an application manager 3941, a window manager 3942, a multimedia manager 3943, a resource manager 3944, a power manager 3945, a database manager 3946, a package manager 3947, a connectivity manager 3948, a notification manager 3949, a location manager 3950, a graphic manager 3951, or a security manager 3952.

The runtime library 3935 may include a library module used by a compiler in order to add a new function through a programming language while, e.g., the application 3970 is being executed. The runtime library 3935 may perform input/output management, memory management, or operation on arithmetic functions.

The application manager 3941 may manage the life cycle of at least one application of, e.g., the applications 3970. The window manager 3942 may manage GUI resources used on the screen. The multimedia manager 3943 may grasp formats necessary to play various media files and use a codec appropriate for a format to perform encoding or decoding on media files. The resource manager 3944 may manage resources, such as source code of at least one of the applications 3970, memory or storage space.

The power manager 3945 may operate together with, e.g., a basic input/output system (BIOS) to manage battery or power and provide power information necessary for operating the electronic device. The database manager 3946 may generate, search, or vary a database to be used in at least one of the applications 3970. The package manager 3947 may manage installation or update of an application that is distributed in the form of a package file.

The connectivity manager 3948 may manage wireless connectivity, such as, e.g., Wi-Fi or Bluetooth. The notification manager 3949 may display or notify an event, such as a coming message, appointment, or proximity notification, of the user without interfering with the user. The location manager 3950 may manage locational information on the electronic device. The graphic manager 3951 may manage graphic effects to be offered to the user and their related user interface.

The security manager 3952 may provide various security functions necessary for system security or user authentication. If the electronic device (e.g., the electronic device 101) has telephony capability, the middleware 3930 may further include a telephony manager for managing voice call or video call functions of the electronic device.

The middleware 3930 may include a middleware module forming a combination of various functions of the above-described components. The middleware 3930 may provide a specified module per type of the operating system in order to provide a differentiated function. Further, the middleware 3930 may dynamically omit some existing components or add new components.

The API 3960 (e.g., the API 145) may be a set of, e.g., API programming functions and may have different configurations depending on operating systems. For example, in the case of Android or iOS, one API set may be provided per platform, and in the case of Tizen, two or more API sets may be offered per platform.

The application 3970 (e.g., the application processor 147) may include one or more applications that may provide functions such as, e.g., a home application 3971, a dialer application 3972, an SMS/MMS application 3973, an instant message (IM) application 3974, a browser application 3975, a camera application 3976, an alarm application 3977, a contact application 3978, a voice dial application 3979, an email application 3980, a calendar application 3981, a media player application 3982, an album application 3983, or a clock application 3984, a health-care application (e.g., measuring the degree of an exercise workout or a blood sugar level), or provision of environmental information (e.g., provision of air pressure, moisture, or temperature information).

Application 3970 may include an application (e.g., "information exchanging application") supporting information exchange between the electronic device (e.g., the electronic device 101) and an external electronic device (e.g., the electronic devices 102 and 104). Examples of the information exchange application may include, but is not limited to, a notification relay application for transferring specific information to the external electronic device, or a device management application for managing the external electronic device.

For example, the notification relay application may include a function for relaying notification information generated from other applications of the electronic device (e.g., the SMS/MMS application, email application, health-care application, or environmental information application) to the external electronic device (e.g., the electronic devices 102 and 104). Further, the notification relay application may receive notification information from, e.g., the external electronic device and may provide the received notification information to the user.

The device management application may perform at least some functions of the external electronic device (e.g., the electronic device 102 or 104) communicating with the electronic device (for example, turning on/off the external electronic device (or some components of the external electronic device) or control of brightness (or resolution) of the display), and the device management application may manage (e.g., install, delete, or update) an application operating in the external electronic device or a service (e.g., call service or message service) provided from the external electronic device.

The application 3970 may include an application (e.g., a health-care application of a mobile medical device) designated according to an attribute of the external electronic device (e.g., the electronic devices 102 and 104). The application 3970 may include an application received from the external electronic device (e.g., the server 106 or electronic devices 102 and 104). The application 3970 may include a preloaded application or a third party application downloadable from a server. The names of the components of the program module 3910 according to the shown embodiment may be varied depending on the type of operating system.

At least a part of the program module 3910 may be implemented in software, firmware, hardware, or in a combination of two or more thereof. At least a part of the programming module 3910 may be implemented (e.g., executed) by e.g., a processor (e.g., the controller 710). At least a part of the program module 3910 may include e.g., a module, program, routine, set of instructions, process, or the like for performing one or more functions.

The term 'module' may indicate a unit including one of hardware, software, and firmware, or a combination thereof. The term 'module' may be interchangeably used with, for example, the terms "unit", "logic", "logical block", "component", or "circuit". The term "module" may indicate a minimum unit or part of an integrated component. The term "module" may be a minimum unit or part of performing one or more functions. The term "module" may indicate a device that may be implemented mechanically or electronically. For example, the term "module" may include at least one of application specific IC (ASIC) chips, field programmable gate arrays (FPGAs), or Programmable Logic Arrays (PLAs) that perform some operations, which are already known or will be developed in the future.

At least a part of the device (e.g., modules or their functions) or method (e.g., operations) may be implemented as instructions stored in a non-transitory computer-readable storage medium e.g., in the form of a program module. The instructions, if executed by a processor (e.g., the processor 120), may enable the processor to carry out a corresponding function. The non-transitory computer-readable storage medium may be. e.g., the memory 130.

The non-transitory computer-readable storage medium may include a hardware device, such as hard discs, floppy discs, and magnetic tapes (e.g., a magnetic tape), optical media such as compact disc ROMs (CD-ROMs) and digital versatile discs (DVDs), magneto-optical media such as floptical disks, ROMs, RAMs, flash memories, and/or the like. Examples of the program instructions may include not only machine language codes but also high-level language codes which are executable by various computing means using an interpreter. The aforementioned hardware devices may be configured to operate as one or more software modules to carry out exemplary embodiments of the present disclosure, and vice versa.

Modules or programming modules in accordance with various embodiments of the present disclosure may include at least one or more of the aforementioned components, omit some of them, or further include other additional components. Operations performed by modules, programming modules or other components in accordance with various embodiments of the present disclosure may be carried out sequentially, simultaneously, repeatedly, or heuristically. Furthermore, some of the operations may be performed in a different order, or omitted, or include other additional operation(s).

There may be provided a non-transitory computer readable recording medium recording a program running on a computer. The program may include executable commands executed by a processor to enable the processor to control a movement of a rotating member supported by a rotation supporting member of an electronic device so that a display coupled onto a surface of the rotating member or a screen of the display faces in a first direction where an external object is positioned, identify the external object positioned in the first direction using at least one sensor, configure an operational condition related to the identified external object and at least one operation control function based on information received according to an interaction with the identified external object, and provide information related to the configured operational condition and the at least one configured operation control function.

As is apparent from the foregoing description, according to embodiments of the present disclosure, an electronic device may identify an external object and control a rotating member coupled with a display so that the display faces the identified external object. Therefore, the electronic device may provide information appropriate for an interest or circumstance of the external object through apparent interactions with the identified external object, as well as experiences intuitive and familiar to the user.

The embodiments disclosed herein are for description and understanding of the disclosed technology and do not limit the scope of the present disclosure. Accordingly, it is intended that the present disclosure include all modifications or various other embodiments within the scope of the present disclosure, as defined by the appended claims and their equivalents.

What is claimed is:
1. An electronic device, comprising:
a main body including a rotating member, a rotation supporting member supporting the rotating member, and a driving device moving the rotating member;
a display coupled onto a surface of the rotating member;
a processor electrically connected to the driving device and the display in the main body; and a memory configured to store instructions executed by the processor, wherein the processor is configured to:

in response to receiving input information for initiating interaction with a user, change a state of the display from an idle state to an active state for the interaction, control the driving device to move the rotating member in a first direction identified based on the input information so that the display or a screen of the display faces in the first direction where the user is positioned, identify the user positioned in the first direction using at least one sensor, provide an operational condition and at least one operation control function associated with the operational condition corresponding to voice information received from the user by the interaction with the identified user, control the display to display a first object corresponding to the operational condition and a second object corresponding to the at least one operation control function, and control to store, in the memory, command information for the user including the operational condition and the at least one operation control function.

2. The electronic device of claim 1, wherein when the operational condition is met, the processor is further configured to run the at least one operation control function according to the operational condition.

3. The electronic device of claim 1, wherein when the display moves to face in the first direction, the processor is further configured to control the movement of the rotating member so that the display faces in a second direction to identify the user, and if the display faces in the second direction, identify the user facing the display using at least one sensor.

4. The electronic device of claim 1, wherein the command information is provided as a card-type command card.

5. The electronic device of claim 1, wherein the processor is further configured to:

when receiving the voice information from the identified user, obtain a condition sentence containing a word related to a condition from the received voice information, provide the operational condition based on the obtained condition sentence, obtain a control sentence containing a word related to control from the received voice information, and provide the at least one operation control function based on the obtained control sentence.

6. The electronic device of claim 1, wherein the processor is further configured to provide condition objects for providing the operational condition or objects related to a function for providing the operation control function based on context information gathered through context recognition in relation to the identified user and display the condition objects or the function-related objects on the display.

7. The electronic device of claim 1, wherein the processor is further configured to choose at least one condition object from among condition objects for providing the operational condition displayed on the display and sets a condition indicated by the chosen condition object as the operational condition.

8. The electronic device of claim 1, wherein the processor is further configured to choose at least one object from among function-related objects for configuring the operation control function displayed on the display and set a function indicated by the chosen object as the operation control function.

9. The electronic device of claim 1, wherein the processor is further configured to search at least one command card related to the operational condition or the operation control function and update the found command card based on the operational condition or the operation control function.

10. The electronic device of claim 1, wherein the processor is further configured to, before running the operation control function, identify a current position of the user, and if the external object is not positioned within a nearby area, restrict the running of the operation control function.

11. The electronic device of claim 1, wherein the operation control function includes a function for controlling an operation of at least one external electronic device positioned around the electronic device or controlling an operation for at least one application running on the electronic device.

12. A method for providing information in an electronic device including a rotating member, a rotation supporting member supporting the rotating member, and a driving module moving the rotating member, the method comprising:

in response to receiving input information for initiating interaction with a user, changing, by a processor of the electronic device, a state of a display of the electronic device from an idle state to an active state for the interaction;

controlling, by the processor, the driving device to move the rotating member in a first direction identified based on the input information so that a display coupled onto a surface of the rotating member or a screen of the display faces in the first direction where the user is positioned;

identifying, by the processor, the user positioned in the first direction using at least one sensor;

providing, by the processor, an operational condition and at least one operation control function corresponding to voice information received from the user by an interaction with the identified external object;

controlling, by the processor, the display to display a first object corresponding to the operational condition and a second object corresponding to the at least one operation control function; and controlling, by the processor, to store in a memory of the electronic device command information for the user including the operational condition and the at least one operation control function.

13. The method of claim 12, further comprising, when the operational condition is met, running, by the processor, the at least one operation control function according to the operational condition.

14. The method of claim 12, wherein identifying, by the processor, the external object includes, when the display moves to face in the first direction, controlling, by the processor, the movement of the rotating member so that the display faces in a second direction to identify the user and, if the display faces in the second direction, identifying, by the processor, the user facing the display using at least one sensor.

15. The method of claim 12, wherein providing, by the processor, the operational condition and the at least one operation control function comprises;

receiving, by the processor, the voice information from the identified user, obtaining a condition sentence containing a word related to a condition from the received voice information, providing, by the processor, the operational condition based on the obtained condition sentence, obtaining, by the processor, a control sentence containing a word related to control from the received voice information, and providing, by the processor, the at least one operation control function based on the obtained control sentence.

16. The method of claim 12, wherein configuring, by the processor, the operational condition related to the identified external object and the at least one operation control function comprises;

gathering, by the processor, context information through context recognition in relation to the identified user, providing, by the processor, condition objects for providing the operational condition or objects related to a function for providing the operation control function based on the gathered context information, and displaying, by the processor, the condition objects or the objects related to the function on the display.

17. The method of claim 16, wherein configuring, by the processor, the operational condition related to the identified user and the at least one operation control function includes choosing, by the processor, at least one condition object from among the condition objects for configuring the operational condition displayed on the display and setting, by the processor, a condition indicated by the chosen condition object as the operational condition.

18. The method of claim 16, wherein configuring, by the processor, the operational condition related to the identified user and the at least one operation control function includes choosing, by the processor, at least one object from among the objects related to the function for configuring the operation control function displayed on the display and setting, by the processor, a function indicated by the chosen object as the operation control function.

19. The method of claim 12, wherein the command information is provided as a card-type command card.

20. The method of claim 19, wherein providing, by the processor, the information related to the operational condition and the at least one operation control function includes searching, by the processor, at least one command card related to the operational condition or the operation control function and updating, by the processor, the found command card based on the operational condition or the operation control function.

* * * * *